United States Patent [19]
Johnson

[11] Patent Number: 5,625,776
[45] Date of Patent: *Apr. 29, 1997

[54] ELECTRONIC PROPOSAL PREPARATION SYSTEM FOR SELLING COMPUTER EQUIPMENT AND COPY MACHINES

[75] Inventor: Jerome D. Johnson, North Mankato, Minn.

[73] Assignee: Clear With Computers, Inc., Mankato, Minn.

[*] Notice: The term of this patent shall not extend beyond the expiration date of Pat. No. 5,493,490.

[21] Appl. No.: 268,166

[22] Filed: Jun. 29, 1994

Related U.S. Application Data

[63] Continuation-in-part of Ser. No. 878,602, May 5, 1992, Pat. No. 5,493,490.

[51] Int. Cl.$^6$ .................... G06F 17/30; G06F 17/60
[52] U.S. Cl. ................. 395/227; 395/224; 395/229; 395/615
[58] Field of Search ................. 364/400, 401, 364/402, 403, 408, 419.19; 395/600

[56] References Cited

U.S. PATENT DOCUMENTS

| | | | |
|---|---|---|---|
| 4,149,246 | 4/1979 | Goldman | 364/400 |
| 4,359,631 | 11/1982 | Lockwood et al. | 235/431 |
| 4,553,206 | 11/1985 | Smutek et al. | 395/600 |
| 4,670,798 | 6/1987 | Campbell et al. | 360/12 |
| 4,706,212 | 11/1987 | Toma | 364/419.02 |
| 4,775,935 | 10/1988 | Yourick | 364/401 |
| 4,863,384 | 9/1989 | Slade | 434/107 |
| 4,899,292 | 2/1990 | Montagna et al. | 395/147 |
| 4,899,299 | 2/1990 | MacPhail | 364/570 |
| 4,905,094 | 2/1990 | Pocock et al. | 358/342 |
| 4,926,325 | 5/1990 | Benton et al. | 364/408 |
| 4,947,028 | 8/1990 | Gorog | 235/381 |
| 4,992,939 | 2/1991 | Tyler | 364/401 R |
| 4,992,940 | 2/1991 | Dworkin | 364/401 R |
| 5,041,972 | 8/1991 | Frost | 364/401 |
| 5,053,956 | 10/1991 | Donald et al. | 364/401 R |
| 5,056,029 | 10/1991 | Cannon | 364/479.03 |
| 5,072,536 | 12/1991 | Matthews et al. | 40/587 |
| 5,099,422 | 3/1992 | Foresman et al. | 364/401 R |
| 5,117,354 | 5/1992 | Long et al. | 364/401 R |
| 5,212,634 | 5/1993 | Washizaki et al. | 364/400 |
| 5,241,464 | 8/1993 | Greulich et al. | 364/401 R |
| 5,396,417 | 3/1995 | Burks et al. | 364/401 |
| 5,493,490 | 2/1996 | Johnson | 364/401 R |

FOREIGN PATENT DOCUMENTS

| | | |
|---|---|---|
| 0344976A1 | 12/1989 | European Pat. Off. . |
| 2105075 | 3/1983 | United Kingdom . |
| 2177245 | 1/1987 | United Kingdom . |
| WO85/03152 | 7/1985 | WIPO . |

OTHER PUBLICATIONS

Bob Gatty, "Setting up Shop on Computer Screens", Nation's Business, Mar. 1984, pp. 57–58.

Lois Schneider, "On Your Screen!", EPB, vol. 2, No. 5, Sep. 1984, pp. 14–16.

(List continued on next page.)

*Primary Examiner*—Robert A. Weinhardt
*Assistant Examiner*—Joseph Thomas
*Attorney, Agent, or Firm*—Merchant, Gould, Smith, Edell, Welter & Schmidt, P.A.

[57] ABSTRACT

An electronic system for creating customized product proposals stores a plurality of pictures and text segments to be used as building blocks in creating the proposal. The pictures may include various products, environments in which the products may be used, and available product options. The text segments may include textual descriptions of the product, environments in which the product may be used, and its performance specifications. The system queries a user to determine a customer's needs and interests. Based upon the answers to the queries, the system selects the appropriate picture and text building blocks to fill in proposal templates. The system can print the completed proposal templates to provide the user with a customized, printed proposal that describes features and benefits of a product, in a particular environment, that are of interest to the customer who is to receive the proposal.

63 Claims, 43 Drawing Sheets

OTHER PUBLICATIONS

Miriam Rozen, "Electronic stores sell: shoes to cars", *Dun's Business Month*, vol. 125, Jan. 1985, p. 101.

Larry Riggs, "Direct Marketing Goes Electronic", S&MM, Jan. 14, 1985, pp. 59–60.

"Videodisc Product Serach System Launched for Architects and Interior Designers", *Videodisc and Optical Disk*, vol. 5, No. 4, Jul.–Aug. 1985, pp. 244–247.

"Touchcom™ Interactive Videodisc Catalog Markets Furniture at Dayton's", *Videodisc and Optical Disk*, vol. 5, No. 5, Sep.–Oct. 1985, pp. 343–345.

"Boosting Sales Electronically", Industry Week, Mar. 31, 1986, pp. 33–351 (abstract only provided).

Paul Hurly, *Boosting Sales . . . Electronically*, Industry Week, Mar. 31, 1986, pp. 33–35.

Emily Leinfuss, "'InfoWindow Display' Shown by IBM at NCC", Management Information Systems Week, Jun. 23, 1986, p. 25.

Buick *EPIC* Electronic Products Information Center brochure.

"How to Make the Most of EPIC", user's guide, Electronic Product Information, Buick Motor Division, 902 East Hamilton Avenue, Flint, Michigan 48550.

"EPIC Quick Reference Flip Chart", Buick Motor Division, General Motors Corporation (1986).

Truck Force Tools Sales and Training System Operator's Manual, Ford Trucks, Clear With Computers, 1992.

ISIS Isuzu Sales Information System, Australia, ISIS Operator's Manual, Clear With Computers, 1992.

Detroit Deisel Corporation, Bus Upgrade System Operator's Manual, Clear With Computers, 1990.

WhiteGMC Volvo, TruckMatch Read Me First, TruckMatch, Clear With Computers, 1990.

GM Truck Compass, Read Me First, Operator's Manual, Clear With Computers, 1991.

Mary Beth Vander Schaaf, *Dealing with Dealers*, Automative News, Nov. 21, 1988, p. 67.

Ronnie Telzer, *The 'Silent Salesman'*, Marketing Communications, vol. 14, No. 5, May 1989, pp. 20–24.

CWC Sales and Training Systems, Copyright 1993, Clear With Computers, Inc., 26 pages.

104

PROCESSES AND GENERATES A CUSTOMIZED PRINTED PROPOSAL — 262

QUERIES ACTIVE DATABASE — 264

QUERIES STATIC DATABASE — 266

READS PAGE DESCRIPTION RECORDS — 268

READS PAGE LAYOUT IDENTIFIERS — 270

LOCATES AND RETRIEVES ACTIVE DATA — 272

LOCATES AND RETRIEVES STATIC DATA — 274

PLACES DATA IN FIELDS ON PAGES — 276

PRINTS IN PLURALITY OF COLORS — 278

DEALER PERSONALIZATION — 280

CUSTOMER PERSONALIZATION — 282

LINKS PAGE IDENTIFIERS WITH DATA — 285

QUERIES REPORT DATABASE — 265

QUERIES DIFFERENCE DATABASE — 267

| CONTENTS | |
|---|---|
| TABLE OF CONTENTS — 196 | CURRENT PUBLICATION — 260 |
| INTRODUCTION — 236<br>    COVER PAGE — 250<br>    TABLE OF CONTENTS — 252<br>    LETTER — 254<br>PRODUCT INFORMATION — 238<br>    FEATURES & BENEFITS — 256<br>    SPECIFICATIONS — 258<br>PERFORMANCE — 240<br>TRADE — 242<br>QUOTATION & SIGNATURE — 244<br>PAYMENT SCHED. & TERMS — 246<br>ECONOMICS — 248 | |

FIG. 13

DIFFERENCE DATABASE — 107

- ENVIRONMENT PICTURES — 122
- ENVIRONMENT TEXT — 124
- PRODUCT PICTURES — 126
- PRODUCT TEXT — 128
- PRODUCT SPECIFICATIONS — 121
- PERFORMANCE SPECIFICATIONS — 123
- PRICE SPECIFICATIONS — 125
- TRADEMARK PICTURES — 127
- LIFE CYCLE SPECIFICATIONS — 129
- PRODUCT DESCRIPTIONS — 131

FIG. 14

ELECTRONIC PROPOSAL PREPARATION SYSTEM FOR SELLING COMPUTER EQUIPMENT AND COPY MACHINES

This is a continuation-in-part of application Ser. No. 07/878,602 filed May 5, 1992, U.S. Pat. No. 5,493,490.

FIELD OF THE INVENTION

The present invention relates to a system for creating a customized proposal by linking together product pictures, optional environment pictures showing environments in which the product may be used, and text related to the product. The system includes means for linking together predetermined product pictures, optional environment pictures, and text based upon a potential customer's answers to predetermined queries.

BACKGROUND AND SUMMARY OF THE INVENTION

Many products, such as computers, related peripherals, and copy machines, are illustrated to customers by pre-printed brochures. Computer and copy machine dealers, for example, have glossy brochures that show pictures of computers, peripherals, and copy machines along with generic textual descriptions of such products. A customer may "try out" a particular computer, peripheral, or copy machine of interest. The dealer will also furnish the customer with one of the preprinted brochures of the computer, peripheral, or copy machine. The brochure documents and contains information about the product. The customer may refer to the brochure and potentially be quite influenced by it in making a decision regarding whether to purchase the computer, peripheral, or copy machine.

The generic nature of these preprinted brochures, however, may have a negative impact on the customer's ultimate decision of whether to purchase and thus are often not persuasive. Traditionally, only one brochure is available for each computer, peripheral, or copy machine, for example, and every potential purchaser of that product receives the same brochure. These brochures contain glossy photographs of the product potentially in a variety of predetermined settings. Next to the photographs, the brochures usually contain generic textual descriptions of the computer, peripheral, or copy machine. Finally, the brochures typically contain standard lists of options for the computer, peripheral, or copy machine along with complex pricing charts from which one may calculate a price based on a matrix of options and prices.

The preprinted brochures contain all of these different settings for the computer, peripheral, or copy machine, and generic information in an attempt to appeal to any potential purchaser. For example, one customer may anticipate using a computer for work, and the brochure contains a photograph of the computer used in an office environment in order to appeal to that customer and influence that customer in his or her decision to purchase the computer. Another customer may want to use the computer at home, and the photograph in the brochure of the computer in a home environment is designed to appeal to that customer.

The brochures also contain standard pricing charts. Since every brochure is generic to any customer, however, it must contain complex pricing charts that include a matrix of options and prices. Furthermore, since prices of the computer, for example, or options often change, the information in the brochure can easily be out of date. Also, much of the pricing information is not of interest to a particular customer, since the customer will typically be interested in the price for a single, or relatively few, combinations of options for the computer. The same applies to peripherals and copy machines In containing all of this varied and generic information in an attempt to be "all things to every customer," the preprinted brochures actually are of limited value to any particular customer. The brochures are not customer specific and, therefore, are not particularly appealing or persuasive for any customer. The typical brochure contains much information that is of no value or interest to a particular customer due to the varied and generic nature of the product pictures and textual descriptions. Furthermore, these preprinted brochures are expensive to produce because of the glossy photographs and may be quickly out of date, meaning that either a dealership must discard the brochures or provide customers with "old" brochures.

The present invention solves these problems by utilizing a computer-based system to dynamically create customized, printed proposals for potential purchasers of a product. The system queries a customer to determine his or her interests and desired options. The interests may include a "use" desired by the customer, such as home or office. The interests may also include the type of information, such as technical, that the customer would like in the proposal. The desired options may include the various features of interest to the customer.

Based upon the customer's answers to the queries, the system links product pictures, optional environment pictures, and textual descriptions together in a customized proposal. The system also has the capability to link together other aspects in the proposal, which may include environment text describing the product in a particular setting or environment. The customized proposal, therefore, contains pictures, textual descriptions, and pricing information that is all of interest to and relevant to a specific customer, since all of the pictures and text were linked together based upon the customer's answers.

Since each proposal is customized for a particular customer, each proposal will have a much more persuasive effect in selling the product. Also, if any information about the product changes, such as prices of options, the system information stored in a database may be simply changed in order to accommodate the new information. Additional textual descriptions or pictures may also be added to the system database to be used in linking together information for a proposal.

The quality of the pictures produced in these customized, printed proposals can be made comparable in quality to the glossy photographs in prior art proposals due to recent advances in computer printers. Printers such as the Canon CLC-300 produce color computer print-outs that resemble color photographs. These customized proposals, therefore, need not be inferior to prior art proposals in terms of the quality of available pictures for the proposals.

This system for producing customized, high-quality proposals has many potential applications, such as in the computer, related peripherals, and copy machine industry. A customized proposal generated by the present invention will have a great appeal to each individual customer and will be an asset in selling the product.

BRIEF DESCRIPTION OF THE DRAWINGS

FIG. 10 is a block diagram showing a detailed depiction of the elements in a preferred report generator.

FIG. 13 is a detailed depiction of the elements within the "Contents" selection of the preferred main menu.

FIG. 14 is a block diagram showing the contents of a difference database.

DETAILED DESCRIPTION OF THE PREFERRED EMBODIMENT

The present computer system is preferably implemented using Object Oriented Design (OOD). Because OOD is a fairly new programming method, a brief explanation of OOD design concepts will be offered here in order to ensure a better understanding. The resource used for preparing this explanation is: Grady Booch, Object Oriented Design with Applications (1991) (published by The Benjamin/Cummings Publishing Company, Inc.).

According to Booch, the Object Oriented Design methodology views the "world" as a set of autonomous agents that collaborate to perform higher level behavior. The OOD agents are called objects. Objects can have a state, behavior and identity. A set of objects that share a common structure and common behavior are called a class. A set of objects working together to provide a behavior that satisfies some requirement of a problem is called a mechanism.

The design described herein is an object-oriented design. This design is described using object diagrams which show the interaction of the objects that make up the application. In addition, class diagrams are used to present the architecture of the system.

Unless otherwise stated, all classes making up the architecture of the system preferably are derived from a common base class named CWCObject. Where this is not the case, class diagrams are used.

INTRODUCTION

The proposal system described in the present specification may be used to create proposals for a variety of products.

Computer equipment is an example of the type of product for which the proposal system can generate customized proposals. As used in the present specification and in the claims, "computer equipment" means computers or computer peripherals. Computers include, but are not limited to, mainframes, mini computers, personal computers, laptops, notebooks, and palmtops. Computer peripherals include, but are not limited to, printers, scanners, modems, hard drives, disk drives, CD-ROM drives, optical drives, monitors, keyboards, math coprocessors, cursor control devices, video cards, tape backup units, speakers, sound cards, multi-media devices, barcode readers, pen tablets, memory modules, plotters, digitizers, and projection panels.

Copy machines are another example of the type of product for which the proposal system can generate customized proposals. Appendix A includes an example of a sample customized proposal for selling computers. Appendix B includes an example of a sample customized proposal for selling a computer peripheral (printer) and a copy machine. The product shown in the sample proposal of Appendix B interfaces with a computer in order to function as a printer and may also function as a copy machine.

Figure 1A:
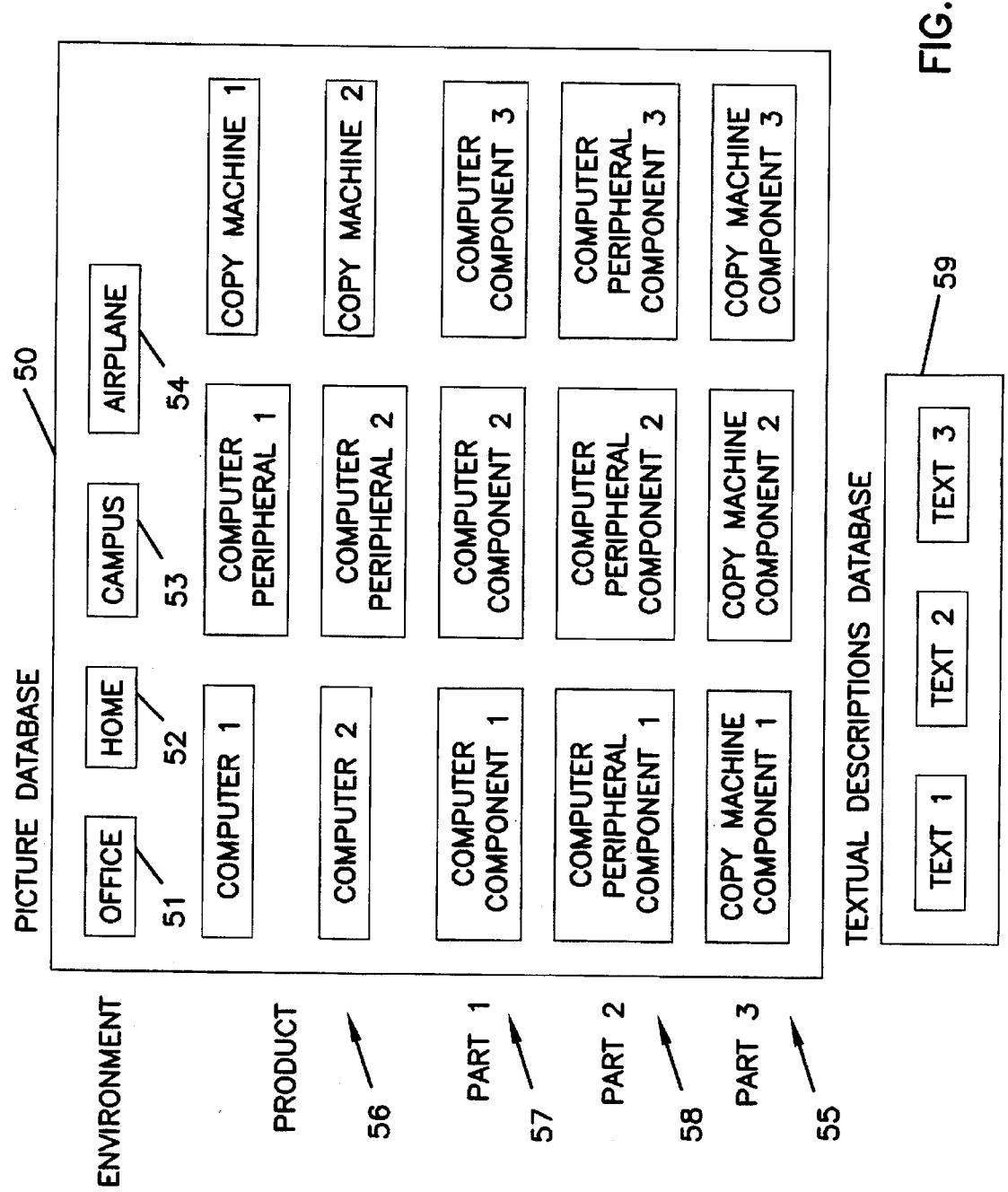
FIG. 1A is a block diagram illustrating conceptually picture and text databases of the computerized proposal system.
Figure 1B:
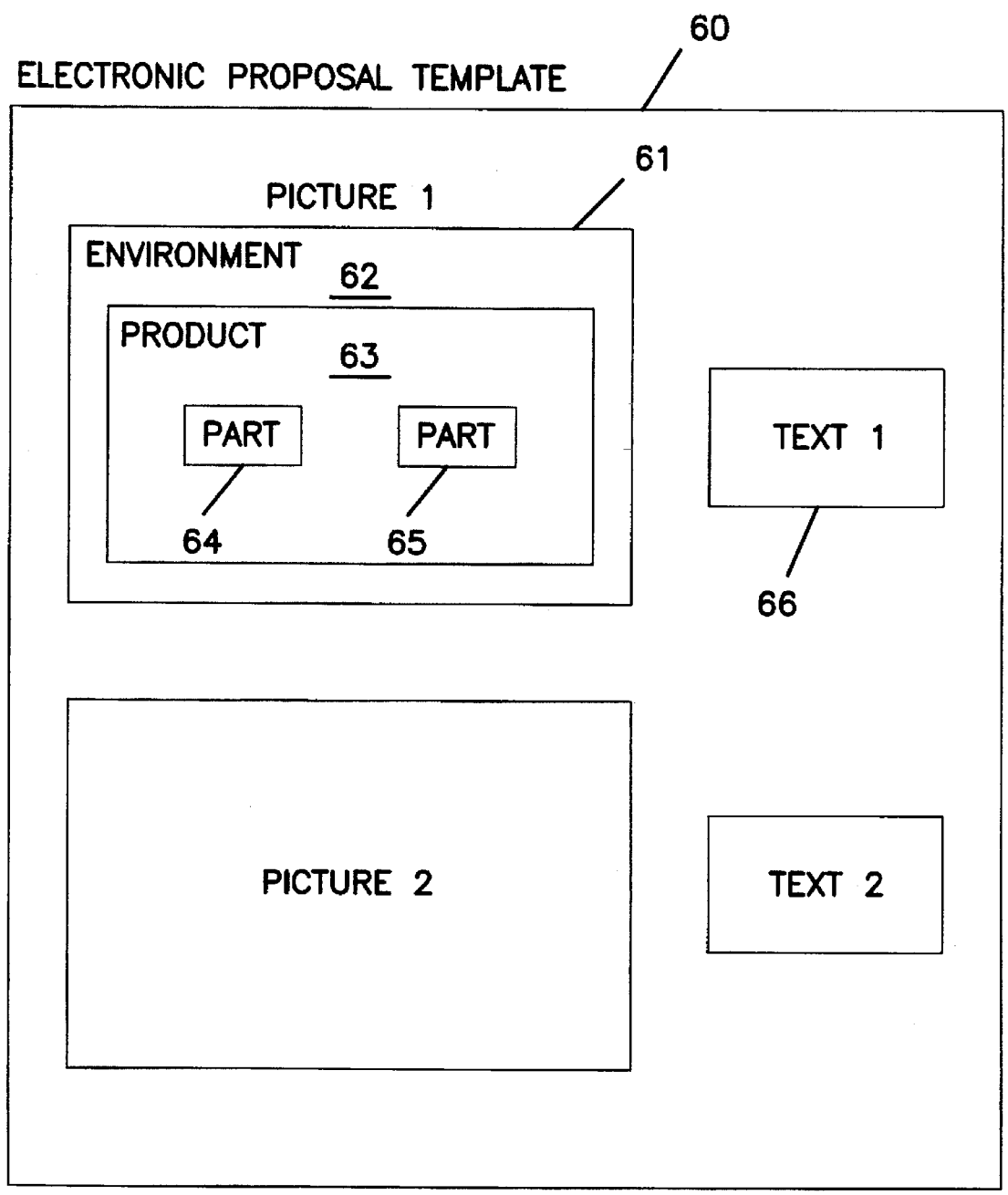
FIG. 1B is a diagram illustrating conceptually an electronic proposal template of the computerized proposal system.

FIGS. 1A and 1B illustrate conceptually a primary feature of the computerized proposal system. The system allows a user to dynamically customize and create a proposal for individual customers. The customized proposal may contain specific items for a particular customer, depending upon the customer's needs and desires. FIG. 1A shows conceptually a database 50 that electronically stores a plurality of pictures. The pictures may include environment pictures 51–54, product pictures 56, and pictures for various parts 55, 57, and 58. A textual descriptions database 59 may store a plurality of text segments that correspond to various pictures in the picture database 50.

FIG. 1B illustrates conceptually an electronic template for creating a page in a customized proposal. The system may query a user to determine a particular customer's needs and interests. Based upon the answers to the queries, the system may "fill in" the template 60 to customize a proposal for the customer. For example, if the customer has an interest in using a computer, computer peripheral, or copy machine for office or home, the system may choose a picture of an office environment 51 or home environment 52 respectively to use as the background or environment 62 in picture 61 of template 60. Likewise, if the customer has an interest in using the computer or computer peripheral for college, the system may choose a campus environment 53. As yet another example, if the customer has an interest in purchasing a laptop for use while traveling, the system may choose an interior airplane environment 54. Within the environment 62, the system places a product 63 by selecting one of the plurality of product pictures 56 based upon the customer's answers.

Each product 63 typically has several options available to the customer, such as various computer components 57, computer peripheral components 58, and copy machine components 55. Based upon the customer's answers, which indicate the customer's desired options, the system may select parts from the picture database 50 for parts 64 and 65 on product 63 in the template. The system may also select one of the plurality of text segments 59 to fill in text frame 66. The text in the text frame 66 would typically correspond to picture 61 and, for example, provide a description of the product or its performance specifications.

Accordingly, the system uses the, stored pictures in the picture database 50 as building blocks for filling in the template. The system establishes a customer profile based on the customer's answers to queries. The system then uses the profile to "build" the empty frames, such as picture 61, in template 60.

The approach of using picture building blocks provides for much versatility and the capability to customize a proposal. Products may be shown in any one of a variety of environments by simply selecting the appropriate picture building blocks. Likewise, any combination of options may be shown on a particular product by selecting the appropriate part picture building blocks. Each combination of pictures for a finished template need not be pre-stored, since the system dynamically builds a template. Also, the system provides further advantages by allowing easy change of options. For example, if a particular type of computer component is no longer available for a particular computer, a user may simpler change the stored picture for that component.

Options may easily be changed by loading and storing new part pictures in the picture database. The system, therefore, provides for customized proposals that are up-to-date and may accommodate changes in available options. For simplicity, the system has been conceptually shown with a product in an environment. One skilled in the art will recognize that the system is capable of creating different types of templates or proposals based on different picture building blocks or different combinations of the building blocks. The system is furthermore not limited to the creation of proposals for computers, computer peripherals, and copy machines. It may be used to create proposals for a variety of products.

OVERVIEW

Figure 2:
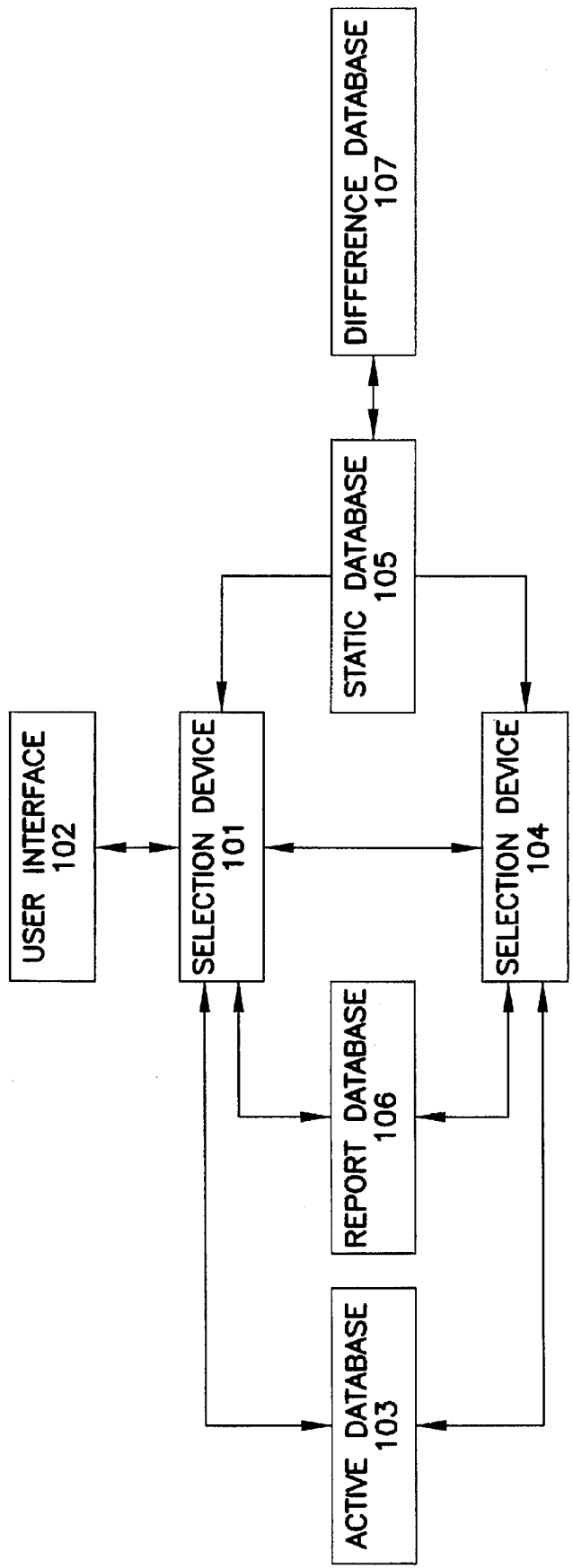
FIG. 2 is a block diagram showing the preferred system.

Referring now to FIG. 2, a computer system 100 is shown. Preferred computer system 100 incorporates an active database 103, a static database 105, a report database 106, a user interface 102, a selection device 101, and a report generator 104. The computer system 100 may also incorporate a difference database 107. The selection device 101 is operatively interconnected to the active database 103, to the report database 106, to the report generator 104, and to the user interface 102. The active database 103, the report database 106, the static database 105, and the difference database 107 are operatively interconnected to the report generator 104.

Figure 3:
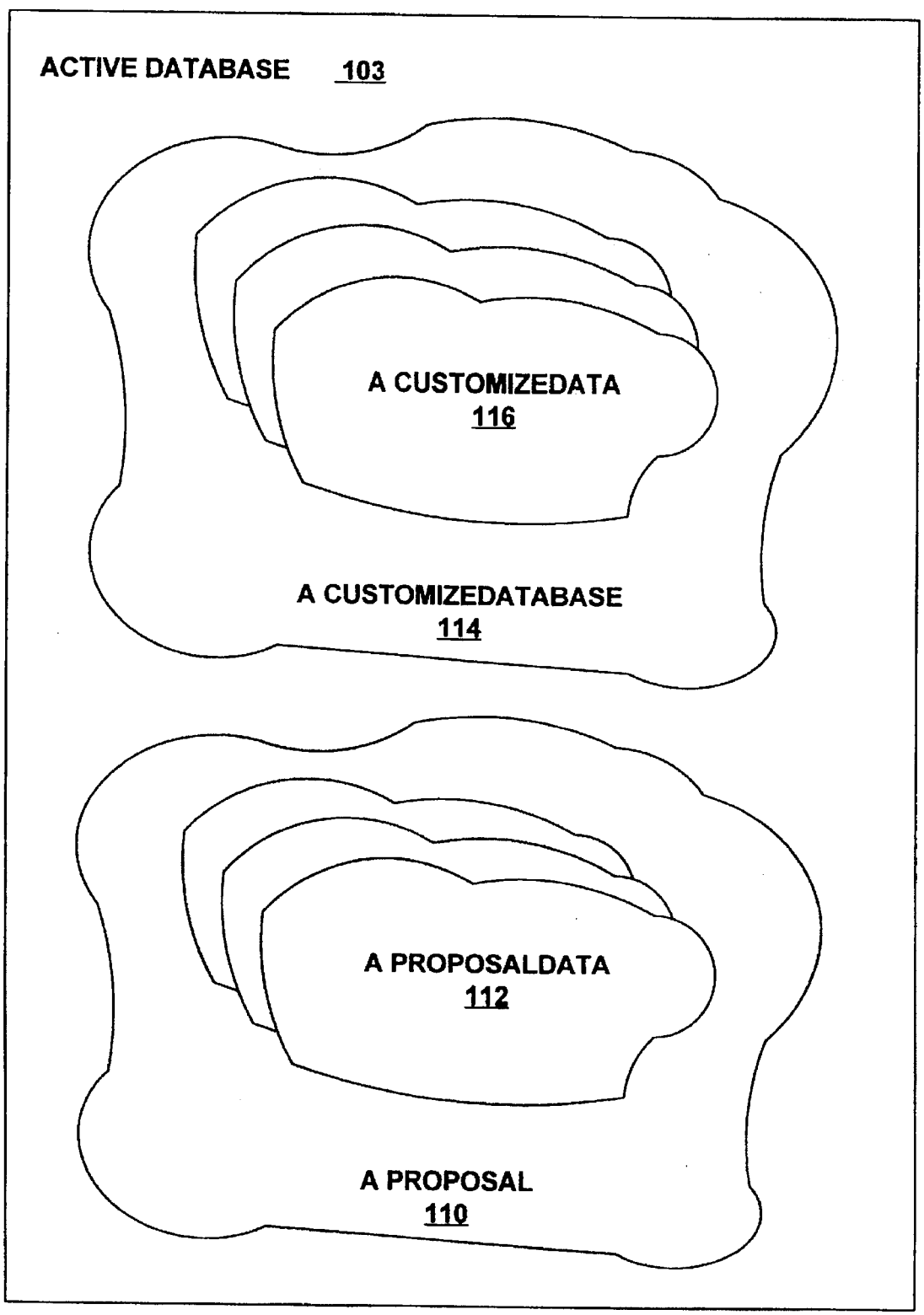
FIG. 3 is an object diagram showing an active database.
Figure 4:
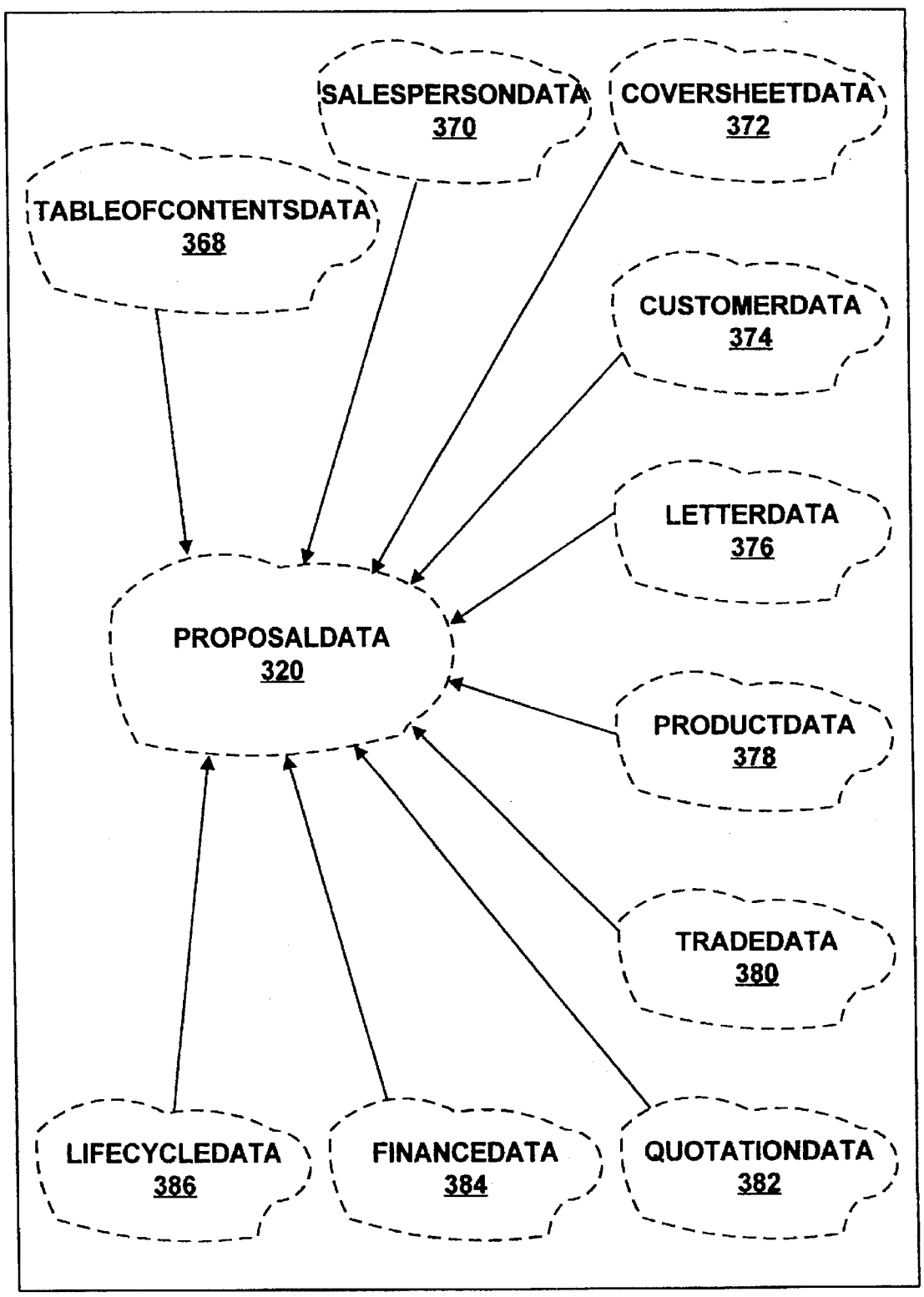
FIG. 4 is a class diagram showing a detailed depiction of the classes in a preferred proposal data class.

Referring now to FIG. 2 in combination with FIG. 3 and FIG. 4, the active database 103 may electronically store proposal-related customer information in the proposal object 110. A proposal object 110 is an instance of the proposal class which is itself derived from the CWCObject class. The active database 103 may contain a plurality of proposal objects 110. Each proposal object 110 may contain a plurality of ProposalData objects 112. The ProposalData objects, 112 may store customer-related information collected by the user. ProposalData objects 112 are instances of the ProposalData class 320 which is derived from the CWCObject class.

Figure 7:
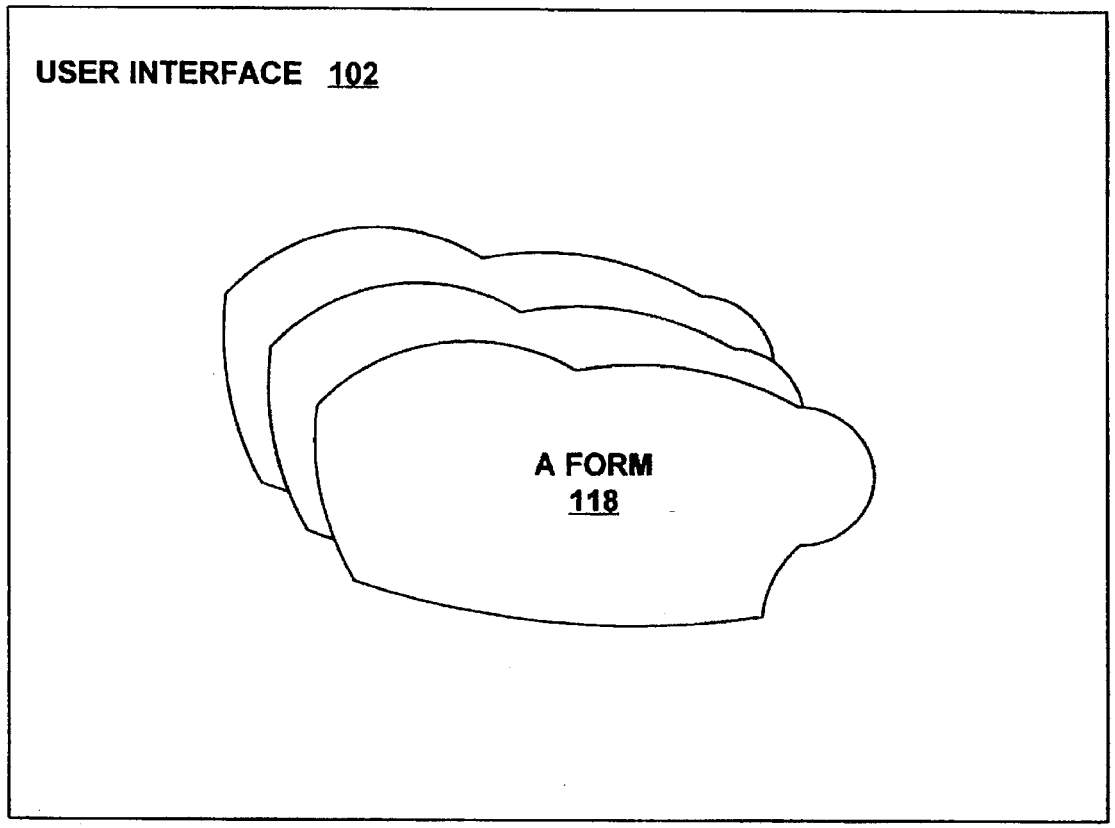
FIG. 7 is an object diagram showing a user interface.

Customer-related information may be entered interactively via the user interface 102 typically beginning at the time the program is first started, and may continue to be entered intermittently throughout the time the program is running. Referring now to FIG. 7, in combination with FIG. 3, FIG. 16, and FIG. 17, the user-entered information may be gathered on one or more of the various Form objects 118, and then stored in one or more of the various ProposalData objects 112 in the proposal 110 in the active database 103.

Table 1 shows how information is stored in a preferred embodiment: the first column indicates the type of information stored; the second column indicates the corresponding object by which a user may enter the information; the third column indicates the corresponding class of which the object is an instance; and the fourth column indicates the corresponding form class from which the class in the third column is derived. The classes are identified in the table by reference numerals and preferably have the same identifying label as the objects to which they correspond. For example, reference numeral 361 in table 1 refers to the TradeForm class 361.

TABLE 1

| Type of Information | Object | Class | Form Class |
|---|---|---|---|
| trade-in product | TradeForm Object 292 | 361 | 340 |
| product price quotation | QuotationForm object 294 | 362 | 340 |
| financing a product | FinanceForm object 296 | 364 | 340 |
| product life cycle cost | LifeCycleForm object 298 | 366 | 340 |
| personalized letter | LetterForm object 288 | 358 | 340 |
| product | ProductForm object 290 | 360 | 340 |
| customer | CustomerForm object 286 | 356 | 340 |
| table of contents | TableOfContentsForm object 284 | 354 | 340 |
| salesperson | ListOfSalesPersonsForm object 310 | 352 | 340 |
| to save a proposal | SaveProposalForm object 308 | 350 | 340 |
| to recall a stored proposal | RecallProposalForm object 306 | 348 | 340 |
| language | LanguageForm object 304 | 346 | 340 |
| dealer | DealerForm object 302 | 344 | 340 |
| password | PasswordForm object 300 | 342 | 340 |

Objects of classes derived from a common base class can be referred to as if they were objects of the common base class due to the principle of polymorphism. The TradeForm object 292 can therefore be treated generically as a Form object 118. The user interface 102 typically comprises a collection of such Form objects 118, each of which can be made to load itself into a window on the computer screen.

Table 2 shows how information gathered by the various objects described above may be stored as data objects in a preferred embodiment: the first column indicates the type of information stored; the second column indicates the corresponding data object in which the information may be stored; the third column indicates the corresponding data class of which the data object is an instance; and the fourth column indicates the corresponding class from which the data class in the third column is derived. The data classes are identified in the table by reference numerals and preferably have the same identifying label as the data objects to which they correspond. For example, reference numeral 380 in Table 2 refers to the TradeData class 380.

Each of the listed data objects in Table 2 may preferably be treated generically as a ProposalData object 112 and stored as one of the various ProposalData objects 112 in the proposal object 110.

TABLE 2

| Type of Information | Data Object | Data Class | Class |
|---|---|---|---|
| trade-in product | TradeData Object 142 | 380 | 320 |
| product price quotation | QuotationData object 144 | 382 | 320 |
| financing a product | FinanceData object 146 | 384 | 320 |

TABLE 2-continued

| Type of Information | Data Object | Data Class | Class |
|---|---|---|---|
| product life cycle cost | LifeCycleData object 148 | 386 | 320 |
| personalized letter | LetterData object 138 | 376 | 320 |
| product | ProductData object 140 | 378 | 320 |
| customer | CustomerData object 136 | 374 | 320 |
| cover sheet | CoverSheetData object 132 | 372 | 320 |
| table of contents | TableOfContentsData object 130 | 368 | 320 |
| salesperson | SalesPersonData object 134 | 370 | 320 |

Referring now to FIG. 2 in combination with FIG. 3, FIG. 6, FIG. 16, and FIG. 17, the active database 103 may electronically store dealer, salesperson, and language information in the customized database 114. A customized database 114 is an instance of the CustomizeDataBase class which is itself derived from the CWCObject class. The active database 103 may contain a plurality of customized database 114. Each customized database 114 may contain a plurality of CustomizeData objects 116. The CustomizeData objects 116 typically store dealer, salesperson, and language information.

Table 3 shows how information gathered by the various objects described above may be stored as data objects in a preferred embodiment: the first column indicates the type of information stored; the second column indicates the corresponding data object in which the information may be stored; the third column indicates the corresponding data class of which the data object is an instance; and the fourth column indicates the corresponding class from which the data class in the third column is derived. The data classes are identified in the table by reference numerals and preferably have the same identifying label as the data objects to which they correspond. For example, reference numeral 390 in Table 3 refers to the DealerData class 390.

Each of the listed data objects in Table 3 may preferably be treated generically as a CustomizeData object 116 and stored as one of the various CustomizeData objects 116 in the customized database 114.

TABLE 3

| Type of Information | Data Object | Data Class | Class |
|---|---|---|---|
| dealer | DealerData object 156 | 390 | 330 |
| salesperson | ListOfSalesPersonsData object 158 | 392 | 330 |
| language | LanguageData object 160 | 394 | 330 |
| password | PasswordData object 164 | 396 | 330 |

The dealer, salesperson and language information may be restricted using a password entry system.

Figure 9:
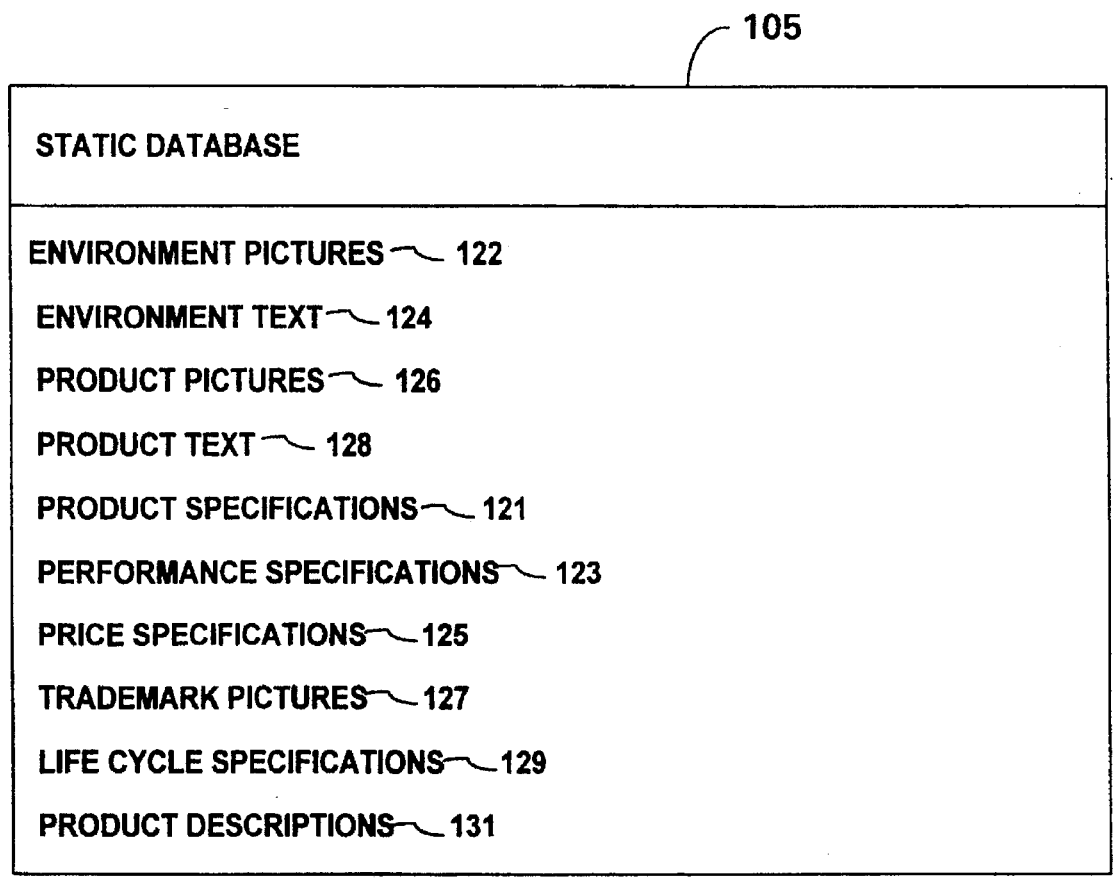
FIG. 9 is a block diagram showing the contents of a static database.

Referring now to FIG. 2 in combination with FIG. 9, the static database 105 may electronically store the following: a plurality of environment pictures 122, and a plurality of environment text 124, both of which are related to the environment in which the product may be used; a plurality of product pictures 126, and a plurality of product text 128, both of which are related to features and benefits of the product; a plurality of product specifications 121 which relate to the technical details of the product; a plurality of price specifications 125 which determine the price of the product; a plurality of performance specifications 123 which represent the performance of the product; a plurality of trademark pictures 127 which identify the product; a plurality of product descriptions 131 which describe the various products; and a plurality of life cycle specifications 129 which determine the projected cost involved in owning the product. The static database 105 may be stored on optical media. The contents of the static database 105 preferably cannot be altered by the user of this application. Changes to the static database 105 may be distributed to some or all of the users of this application on either optical or magnetic media.

Referring now to FIG. 2, in combination with FIG. 14, the difference database 107 may electronically store the updates to the static database 105. If the static database 105 is stored on optical media, a difference database 107, stored on magnetic media, may be used to store information that reflects net changes to the contents of the static database 105. In the event that updates are required for the computer system, these updates are typically stored on magnetic media and sent to all the various owners of the system who will want to update the contents of the static database 105. The difference database 107 may be used to store the updates to the following: the plurality of environment pictures 122; the plurality of environment text 124; the plurality of product pictures 126; the plurality of product text 128; the plurality of product specifications 121; the plurality of price specifications 125; the plurality of performance specifications 123; the plurality of trademark pictures 127; the plurality of product descriptions 131; and the plurality of life cycle specifications 129.

Figure 15:
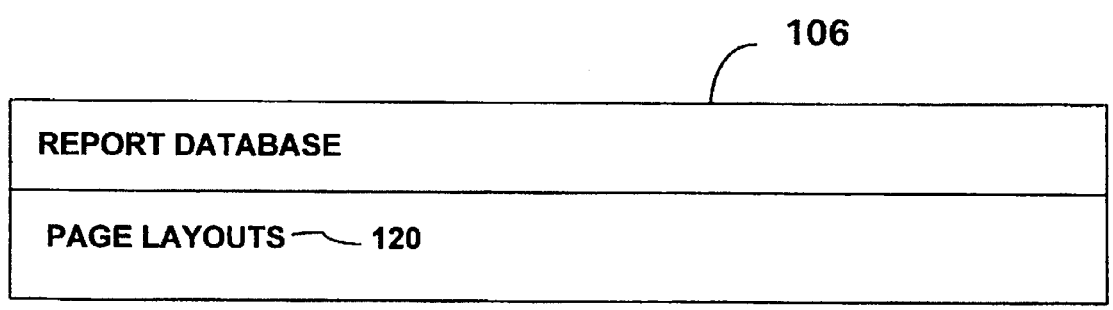
FIG. 15 is a block diagram showing the contents of a report database.

Referring now to FIG. 2, in combination with FIG. 15, the report database 106 may electronically store a plurality of page layouts 120 which are used to format and produce the various pages of information available for inclusion in the printed proposal.

Referring now to FIG. 2, when the user begins a deal with a customer, the user will typically want to gather specific customer and product information regarding this individual customer and the product this customer is interested in purchasing. The user interface 102 is the means by which the user may interactively input predetermined answers to pre-determined queries, the predetermined answers corresponding to the individual customer who is to receive the proposal.

Figure 16:
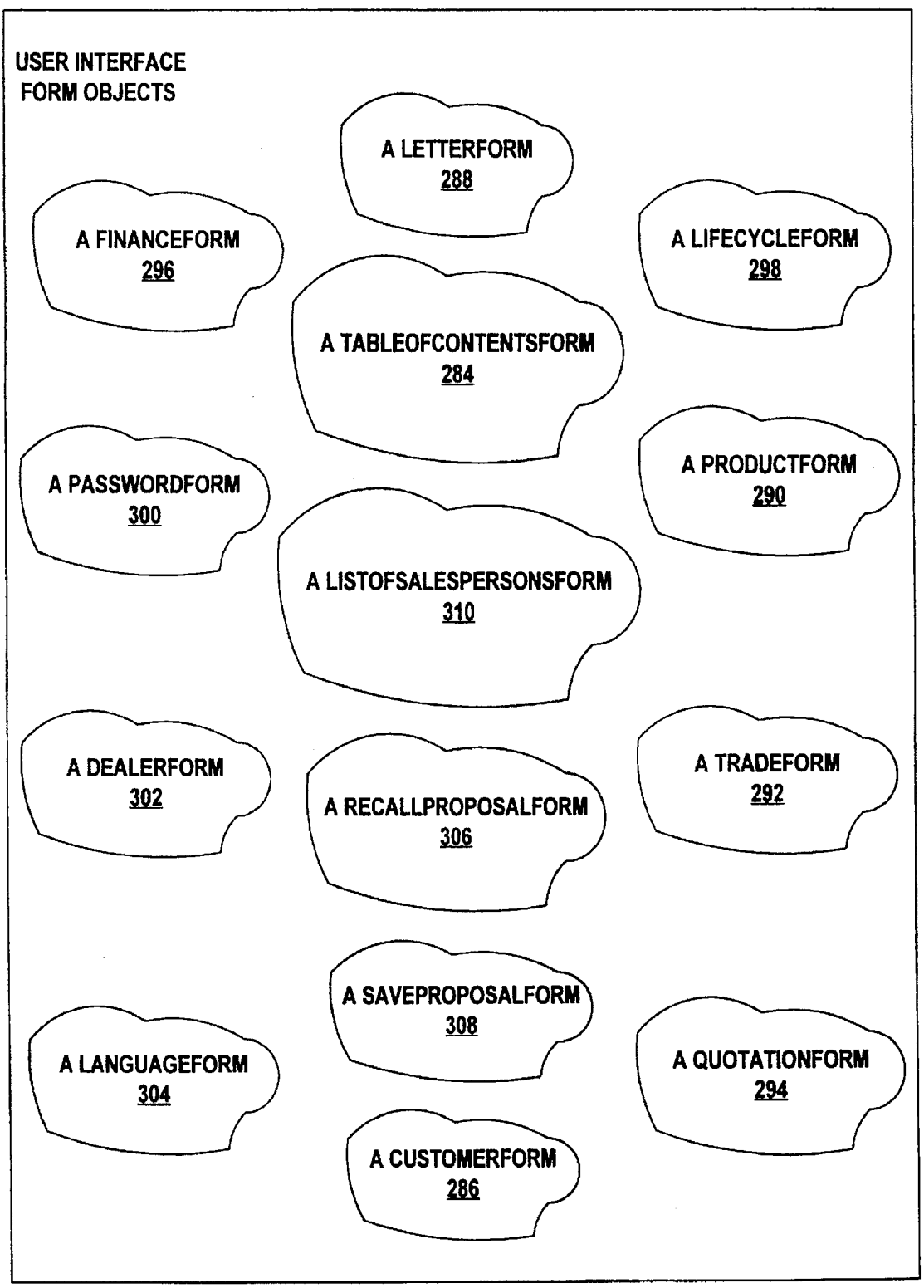
FIG. 16 is an object diagram showing a detailed depiction of the elements in a preferred user interface.

Referring now to FIG. 2 in combination with FIG. 7 and FIG. 16, the user interface 102 typically comprises a collection of Form objects 118 which present a series of predetermined queries related to the varying interests of the different potential customers. The proposal-related information entered interactively by the user on the various Form objects 118 preferably can be altered at any time by the user.

Figure 8:
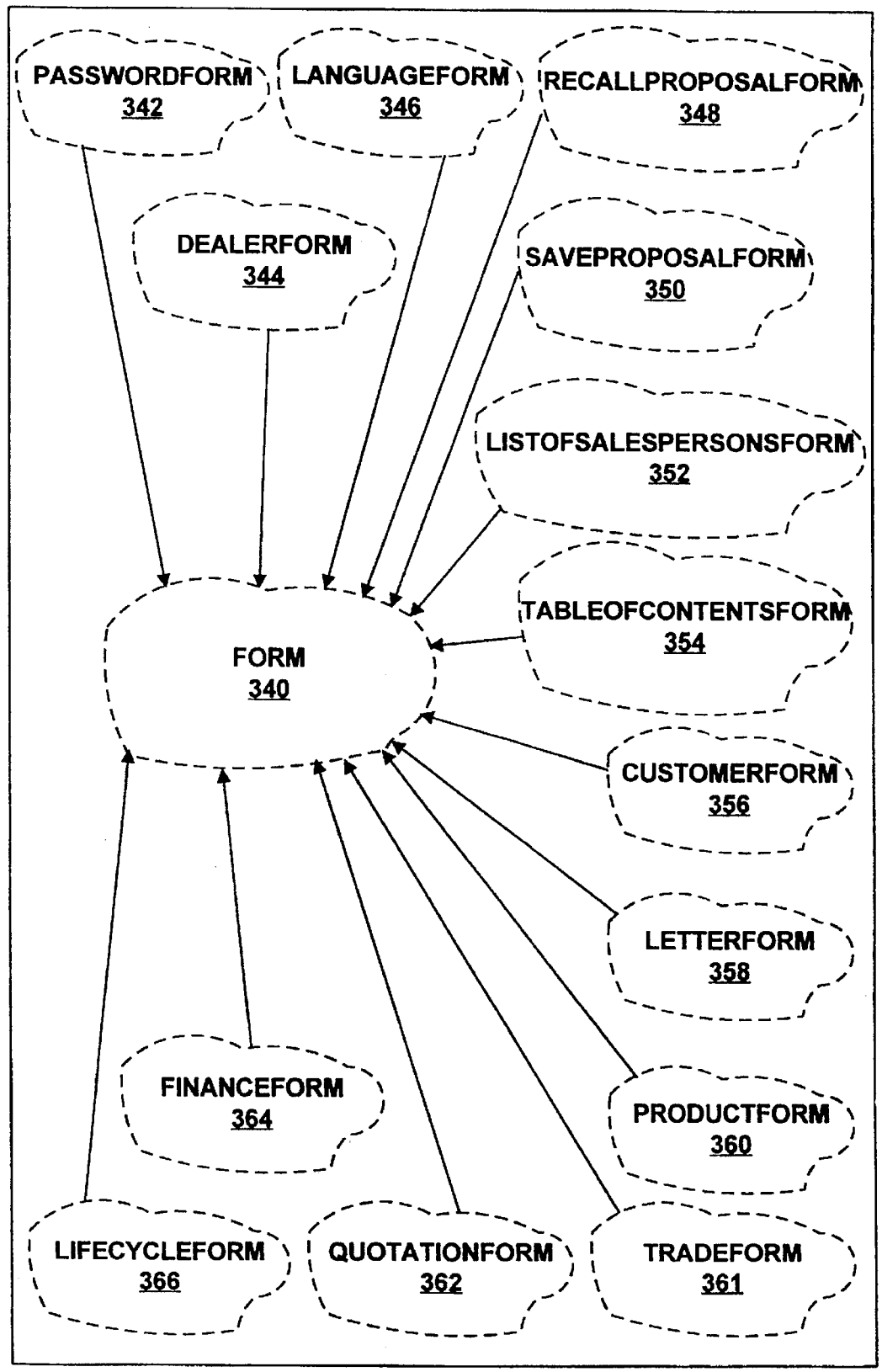
FIG. 8 is a class diagram showing a detailed depiction of the classes in a preferred form class.
Figure 11:
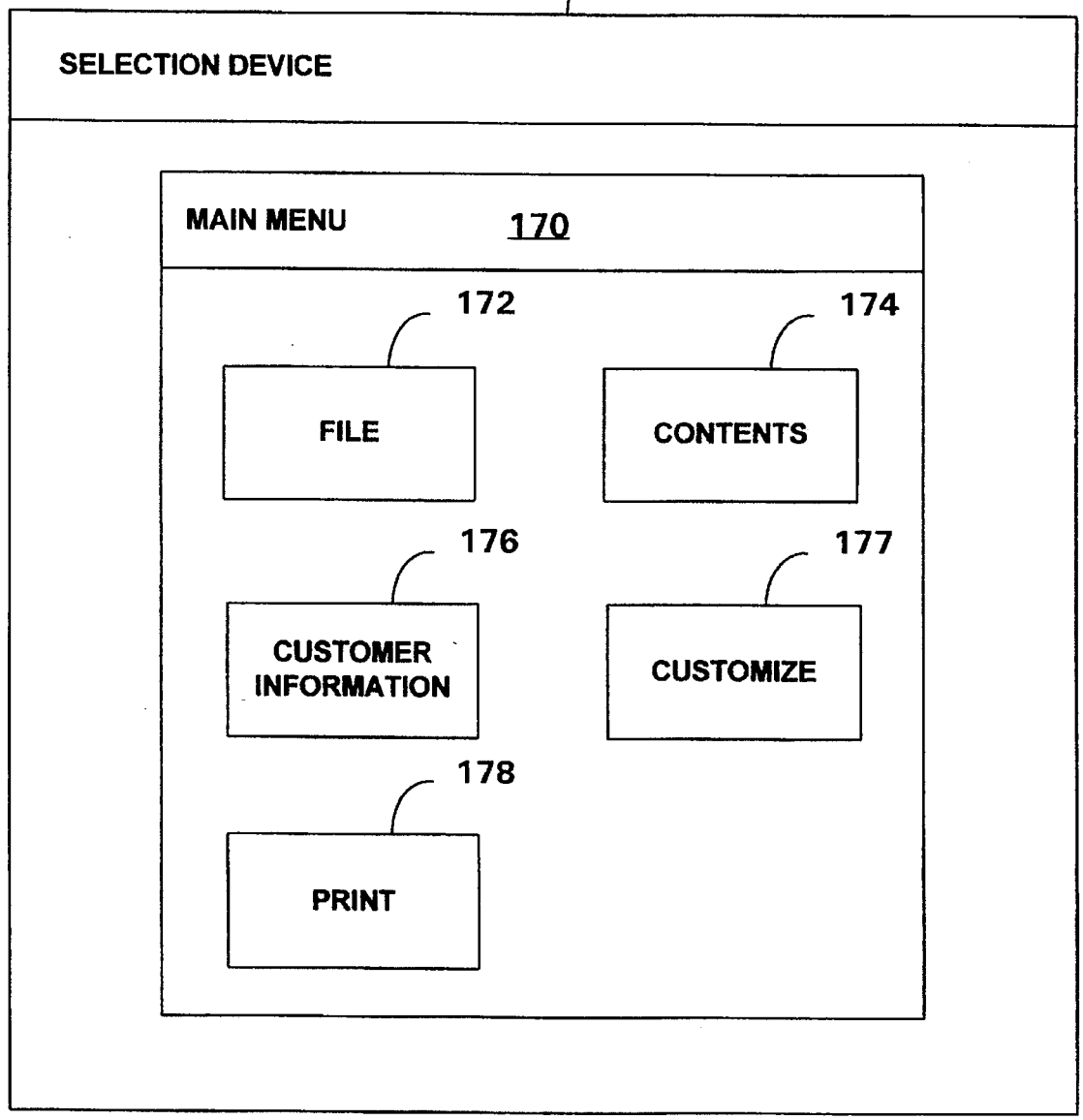
FIG. 11 is a block diagram showing a detailed depiction of the elements in a preferred selection device.

Referring now to FIG. 2, in combination with FIG. 7, FIG. 8, and FIG. 11, the user interface 102 may also control operation of the selection device 101 via the main menu 170 of the selection device. The main menu 170 would typically include choices that prompt the selection device 101 to send a message to a particular Form object 118 requesting that it display itself.

Figure 12:
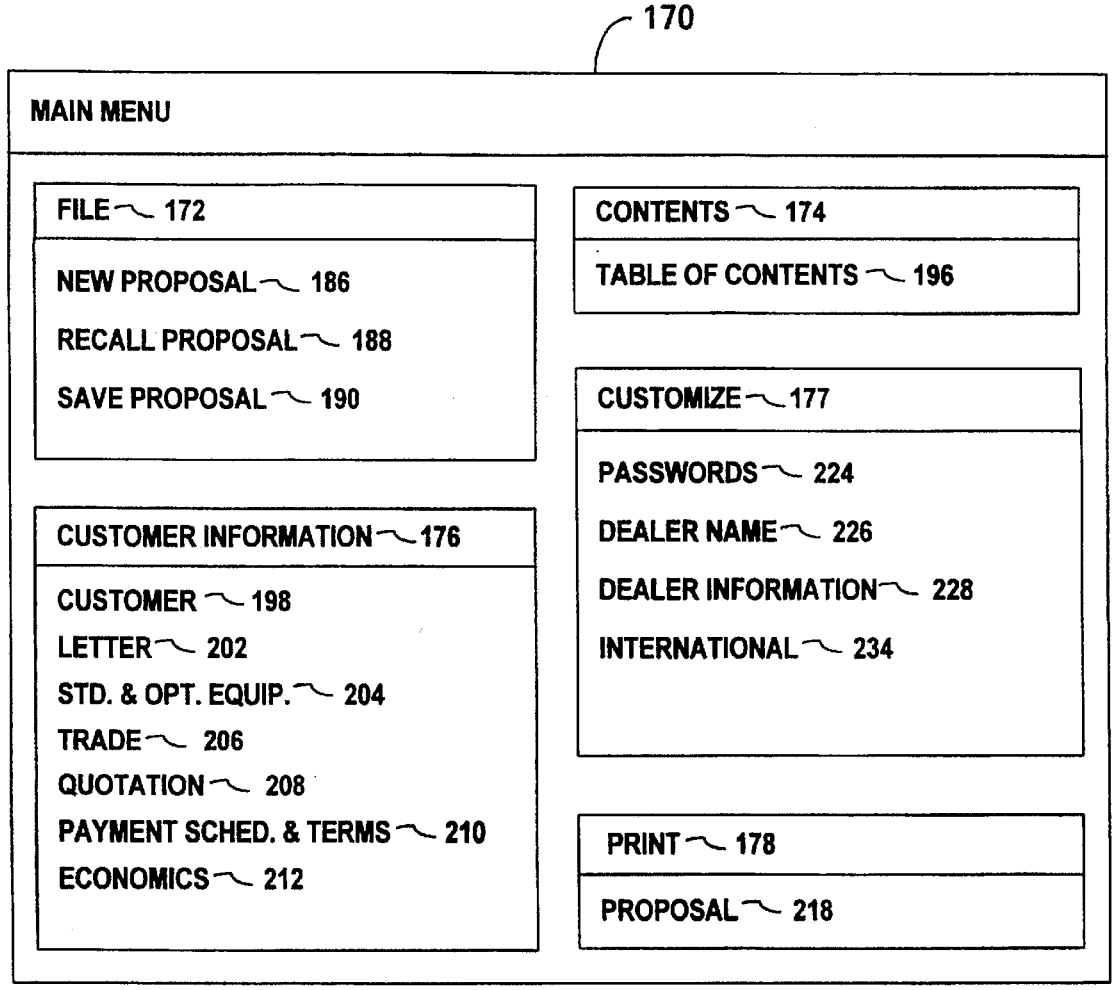
FIG. 12 is a detailed depiction of the elements in a preferred main menu.

Referring now to FIG. 12, when the user is first beginning to deal with a customer, the user will typically need to start a new proposal. The user may select "File" 172 from the main menu 170. Note that labels identifying menu choices may be altered in customized versions of this application designed for different users. The "File" menu 172 contains the option "New Proposal" 186, which the user selects when beginning to deal with a new customer. After the user has begun a new proposal, the information for this new proposal may be stored by selecting "Save Proposal . . ." 190 from the "File" menu 172. After a proposal has been stored, the user can modify the stored proposal by selecting the option "Recall proposal . . ." 188 from the "File" menu 172.

Referring now to FIG. 11 in combination with FIG. 8 and FIG. 12, the user may select "Customer Information" 176 from the main menu 170, which opens a window with choices pertinent to customer and product information. These pertinent choices correspond to the various Form objects 118, upon which the user enters information pertaining to this particular customer and the product the customer is interested in purchasing.

Referring now to FIG. 12 in combination with FIG. 3, FIG. 4, FIG. 7, and FIG. 8, the user may select "Customer Information" 176 from main menu 170, then further select "Customer . . ." 198, which opens the CustomerForm object 286. The user may enter customer information via the CustomerForm object 286, which is then preferably stored in the CustomerData object 136 which is one of the ProposalData objects 112 in the proposal object 110 in the active database 103. The user may select "Letter . . ." 202 from "Customer Information" 176 and then enter information via the LetterForm object 288, which is then preferably stored in a LetterData object 138 as one of the ProposalData objects 112 in the proposal object 110. In this same fashion, the user may select "Standard and Optional Equipment . . ." 204 from "Customer Information" 176, and then enter information via the ProductForm object 290, which is then preferably stored in a ProductData object 140 as one of the ProposalData objects 112 in the proposal object 110. The user may select "Trade . . ." 206 from "Customer Information" 176, and then enter information via the TradeForm object 292, which is then preferably stored in a TradeData object 142 as one of the various ProposalData objects 112 in the proposal object 110. In a similar fashion, the user may select "Quotation . . ." 208 from "Customer Information" 176, and then enter information via the QuotationForm object 294, which is then preferably stored in a QuotationData object 144 as one of the various ProposalData objects 112 in the proposal object 110. The user may select "Payment Schedule & Terms . . ." 210 from "Customer Information" 176, and then enter information via the FinanceForm object 296, which is then preferably stored in a FinanceData object 146 as one of the ProposalDatas objects 112 in the proposal object 110. The user may select "Economics . . ." 212 from "Customer Information" 176, and then enter information via the LifeCycleForm object 298, which is then preferably stored in a LifeCycleData object 148 as one of the various ProposalData objects 112 in the proposal object 110.

Referring now to FIG. 12 in combination with FIG. 3, FIG. 6, FIG. 7, and FIG. 8, the owner of the dealership, for example, may select the "Customize" menu 177 from main menu 170, then further select "Passwords . . ." 224, which opens the PasswordForm object 300. The owner enters dealer and salesperson password information via the PasswordForm object 300, which is then stored in a PassWordData object 164 as one of the various CustomizeData objects 116 in the customized database 114 in the active database 103. The owner may select "Dealer Name . . ." 226 from the customized menu selection 177 and then enter information via the DealerForm object 302, which is then preferably stored in a DealerData object 156 which is one of the CustomizeData objects 116 in the CustomizeDataBase 114. The user may select "Dealer Information . . ." 228 from the customized menu selection 177 and then enter salesperson information via the ListOfSalesPersonsForm object 310, which is then preferably stored in a ListOfSalesPersonsData object 158 which is one of the CustomizeData objects 116 in the CustomizeDataBase 114. In this same fashion, the user may select "International . . ." 234 from the customized menu selection 177, and then choose a language on the LanguageForm object 304, which is then preferably stored in a LanguageData object 160 which is one of the CustomizeData objects 116 in the customized database 114.

Computer system 100 may further be enhanced by the addition of a report generator 104. Referring now to FIG. 2, in combination with FIG. 10, the report generator 104 includes mechanism 262 which comprises means for processing and generating the customized, printed proposal. The report generator 104 may be operatively interconnected to the active database 103, to the static database 105, to the report database 106, to the selection device 101, and to the user interface mechanism 102.

The user may decide to generate a customized, printed proposal to an individual customer relating to the individual customer's interest in a product, the product being characterized by a variety of distinctive features. The customized, printed proposal may include one or more pages comprising the information collected during the process of dealing on the purchase of the product.

Referring now to FIG. 2, in combination with FIG. 10, and FIG. 11, the user may want to generate a printed proposal. In order to do so, the user will typically first need to design a table of contents for the proposal, which entails selecting the individual pages that will be included. Using selection device 101, the user may select "Contents . . .!" 174 from the main menu 170. In response, the selection device 101 preferably sends a load message to the TableOfContentsForm object 284, as shown in FIG. 7, in combination with FIG. 16. On receipt of the load message, the TableOfContentsForm object 284 displays itself within the main window of the selection device 101, as shown in FIG. 13.

Figure 17:
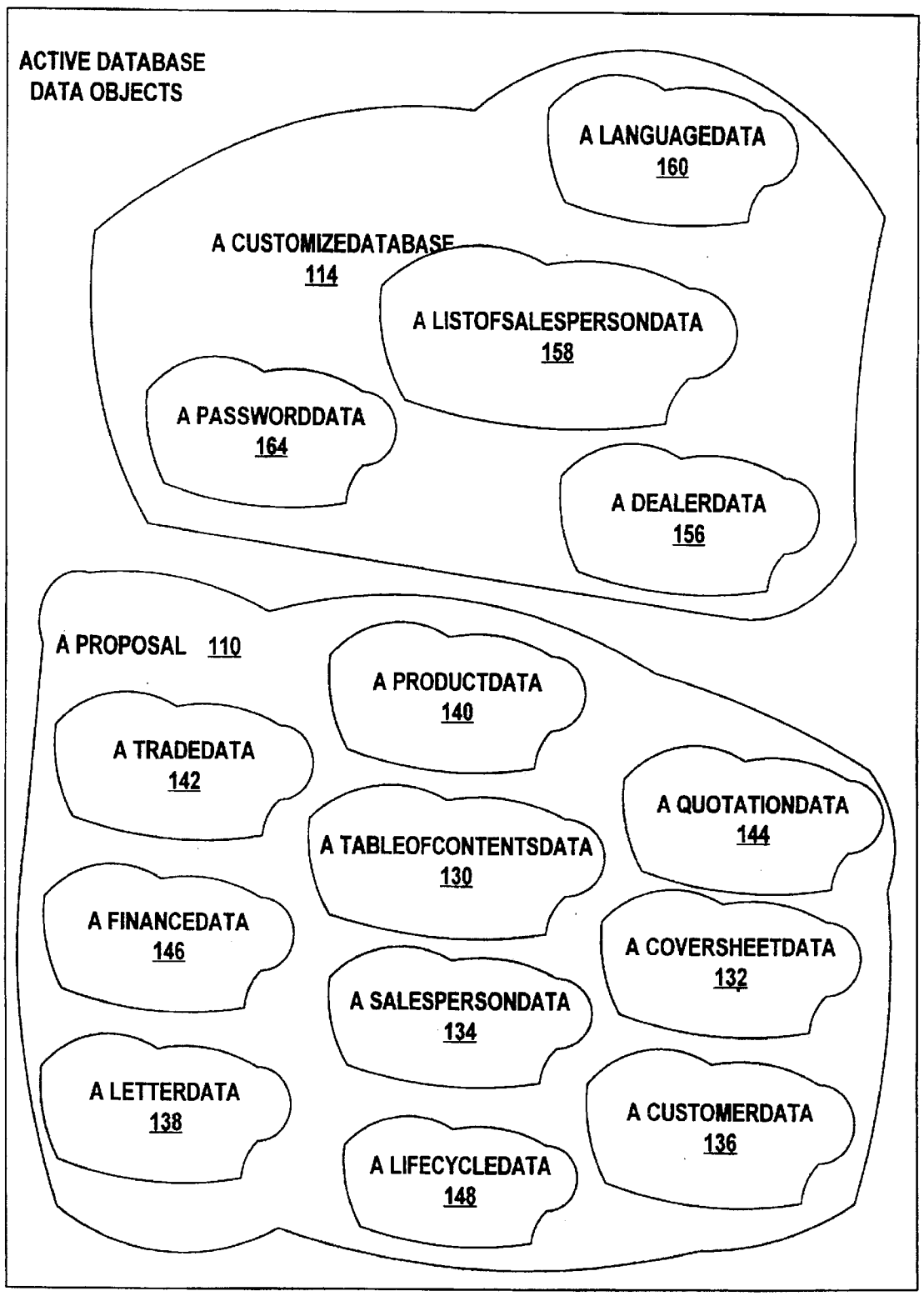
FIG. 17 is an object diagram showing a detailed depiction of the elements in an active database.
Figure 18:
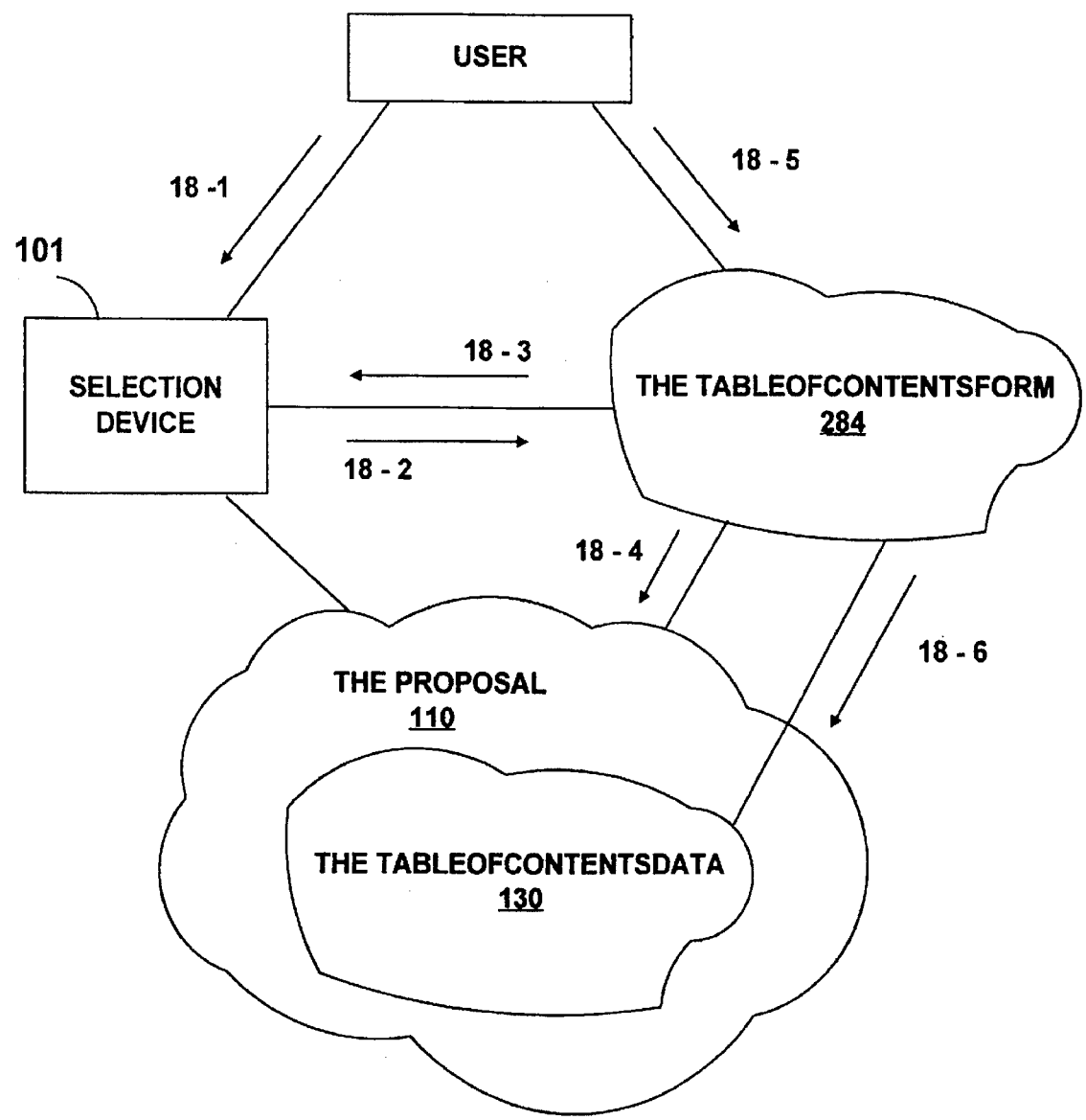
FIG. 18 is an object diagram illustrating a preferred flow of control involved when selecting pages to print.

Referring now to FIG. 16, in combination with FIG. 7, FIG. 3, and FIG. 17, upon loading itself, the TableOfContentsForm object 284 may obtain a pointer to the proposal object 110, from which the TableOfContentsForm object 284 then obtains a pointer to the TableOfContentsData object 130.

Figure 5:
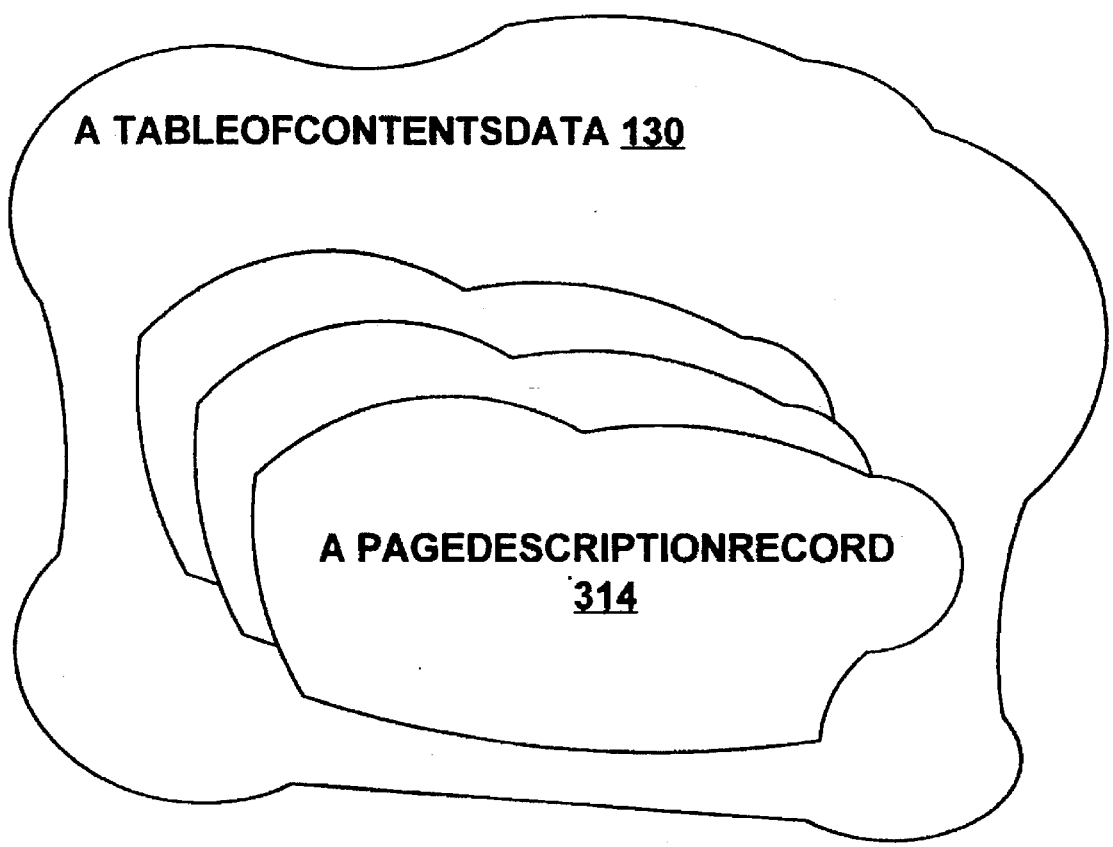
FIG. 5 is an object diagram showing a detailed depiction of a preferred table of contents object.
Figure 6:
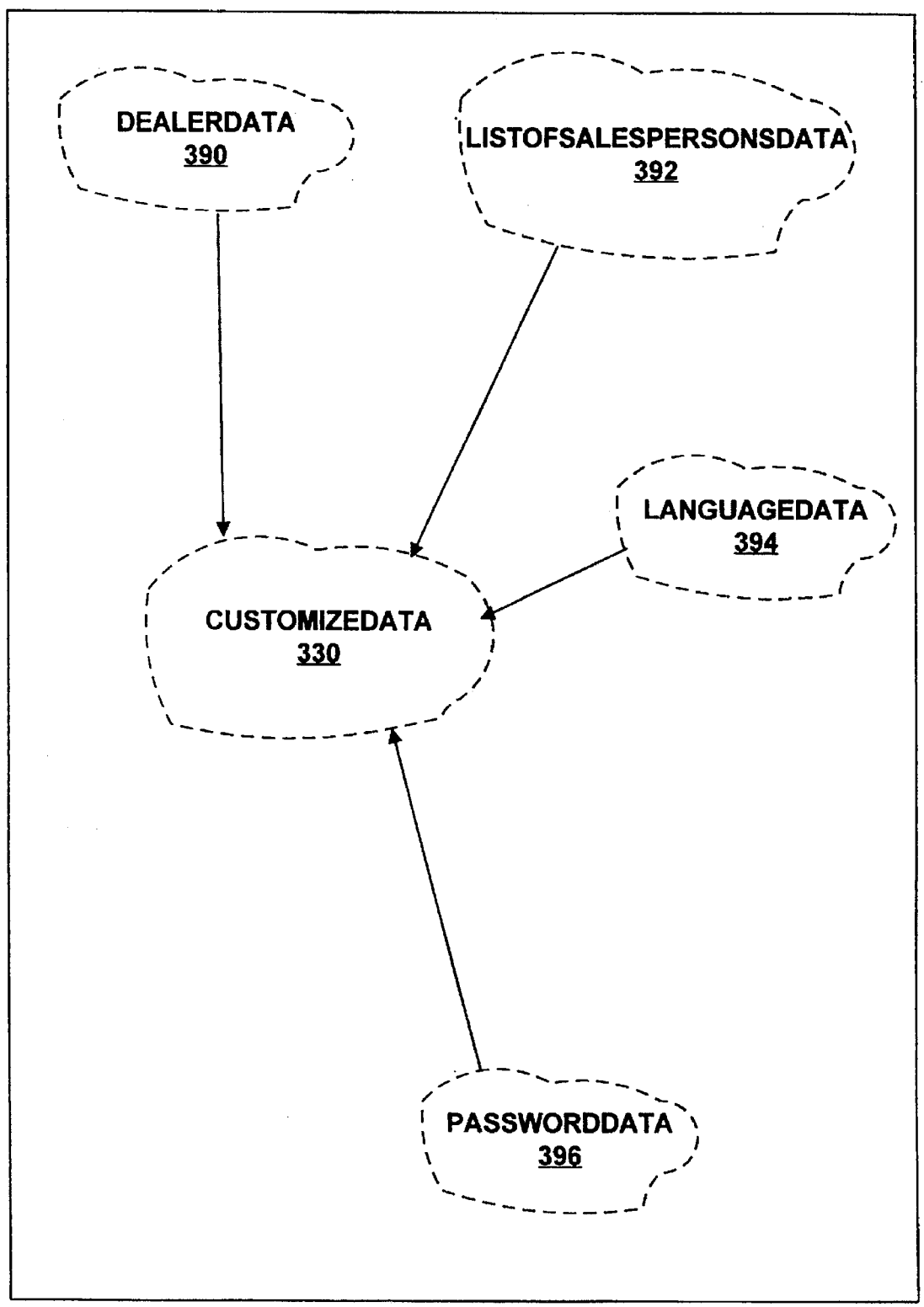
FIG. 6 is a class diagram showing a detailed depiction of the classes in a preferred customize data class.

Referring now to FIG. 13, the user selects the desired proposal pages, referred to as the current publication 260, from a list of pages, referred to on-screen as "Table of Contents" 196, that are available for inclusion in the printed proposal. As the user selects the desired pages from "Table of Contents" 196, these pages then preferably list themselves on-screen under the heading "Current Publication." The selected pages, "Current Publication" 260, may be stored as PageDescription records 314 in the TableOfContentsData object 130, as shown in FIG. 5. (The contents of the pages to be printed are typically not stored; only the page description records describing the pages to be printed are stored.)

Referring now to FIG. 13, in combination with FIG. 15, and FIG. 5, the PageDescription records 314 may each include a field that contains an identifier that indicates which page layout 120 may be used to format each page in the current publication 260. The page layout 120 determines the content and appearance of the final printed page.

Referring now to FIG. 10, in combination with FIG. 15, and FIG. 5, the report generator 104 includes a mechanism 268 for reading the page description records 314. The report generator 104 typically includes a mechanism 270 for reading the page layout identifiers. The page layout identifiers may indicate which page layouts 120 are to be used to format the particular pages. The page layout identifiers may specify which particular data is required, and also specify where that particular data will appear on the printed page. The report generator 104 provides a mechanism 285 for linking the page layout identifiers with the particular data that is to appear on the printed page. The report generator 104 typically includes a mechanism 276 for placing the retrieved data in the appropriate locations on the page as described in the page layout.

Referring now to FIG. 2, in combination with FIG. 12, the user may decide to print the customized proposal for an individual customer. The user preferably selects "Print" 178 from the "File" menu 172, and further selects "Proposal" 218. The selection device 101 then sends a print request to the report generator 104.

Referring now to FIG. 10, in combination with FIG. 2, FIG. 3, and FIG. 9, the report generator 104 may include a mechanism 264, which queries the active database 103. The report generator 104 may include a mechanism 272 for locating and retrieving data from the active database 103. This active data typically includes the customer and product information entered by the user via the user interface 102, the information which comprises the predetermined answers to predetermined questions, the predetermined answers corresponding to the individual customer who is to receive the proposal. The report generator 104 preferably provides a mechanism 285 for linking these predetermined answers (active data) with the predetermined product pictures and text (static data) related to the individual features, benefits and environments that are of particular interest to the individual customer. These predetermined pictures and text may be obtained from the static database 105. The report generator 104 preferably includes the following mechanisms: mechanism 266, which queries the static database 105; mechanism 274 for locating and retrieving data from the static database 105; a dealer personalization mechanism 280 for generating a printed proposal automatically customized for a particular dealer; a customer personalization mechanism 282 for generating a printed proposal automatically personalized for a particular customer; and mechanism 278 for generating a printed proposal in a plurality of colors. For example, a generated printed proposal includes high-resolution graphics printed in real-life, photographic-quality colors, producing a printed picture of a superior nature that enhances the readability as well as the overall appearance of the printed proposal.

The following is a description of a preferred embodiment of the computerized system for generating a customized, printed proposal for an individual customer's purchase of a product. The system as generally described in FIG. 2 through FIG. 17 will further be detailed in the following discussion and FIG. 18 through FIG. 42. In the preferred embodiment discussion that follows, the user may select from several generic types of pages to include in the printed proposal. The types of pages typically include cover sheets, personalized letters, product description pages, product specification pages, performance specification pages, trade;- in specification pages, product Price Quotation pages, Finance plan pages, Life Cycle evaluation pages, Table of Contents pages, and a Signature page. In the preferred embodiment, a Trademark may be printed on any of the pages of the proposal, and the proposal may be printed in any one of a plurality of languages.

Proposal: Cover Sheet

The user may decide to generate a customized, printed proposal that includes a cover sheet 250. To include this cover sheet 250, the user may select "Contents" 174 from the main menu 170 of the selection device 101, as shown by step 18-1 of FIG. 18. In response, the selection device 101 preferably sends a load message to the TableOfContentsForm object, as shown by step 18-2 of FIG. 18. On receipt of the load message, the TableOfContentsForm object displays itself within the main window of the selection device 101. Upon loading itself, the TableOfContentsForm object may obtain a pointer to the proposal object 110, as shown by step 18-3 of FIG. 18. The TableOfContentsForm object then obtains a pointer from the proposal object 110 to the TableOfContentsData object 130, as shown by step 18-4 of FIG. 18. The user may then select the desired "Cover Page" 250 from a list of pages that are available for inclusion in the printed proposal, as shown by step 18-5 of FIG. 18. The selected page may be stored as a PageDescription record in the TableOfContentsData object 130, as shown by step 18-6 of FIG. 18. This PageDescription record may include a field that contains an identifier that indicates which page layout 120 may be used to format the cover sheet 250. The page layout 120 determines the content and appearance of the final printed page. The page layouts 120 may be stored in the report database 106.

Figure 19:
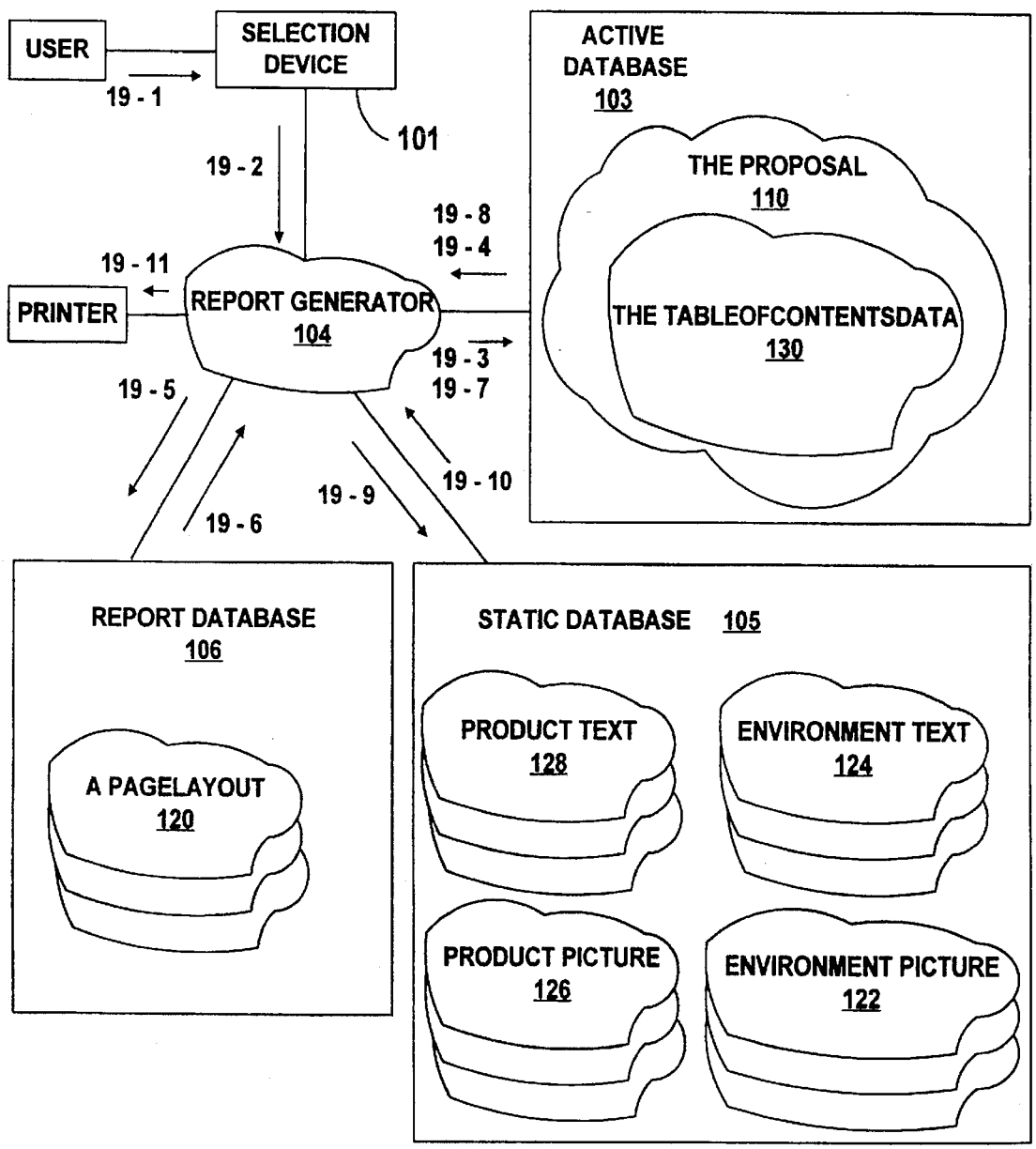
FIG. 19 is an object diagram illustrating a preferred flow of control involved when generating a cover sheet.
Figure 20:
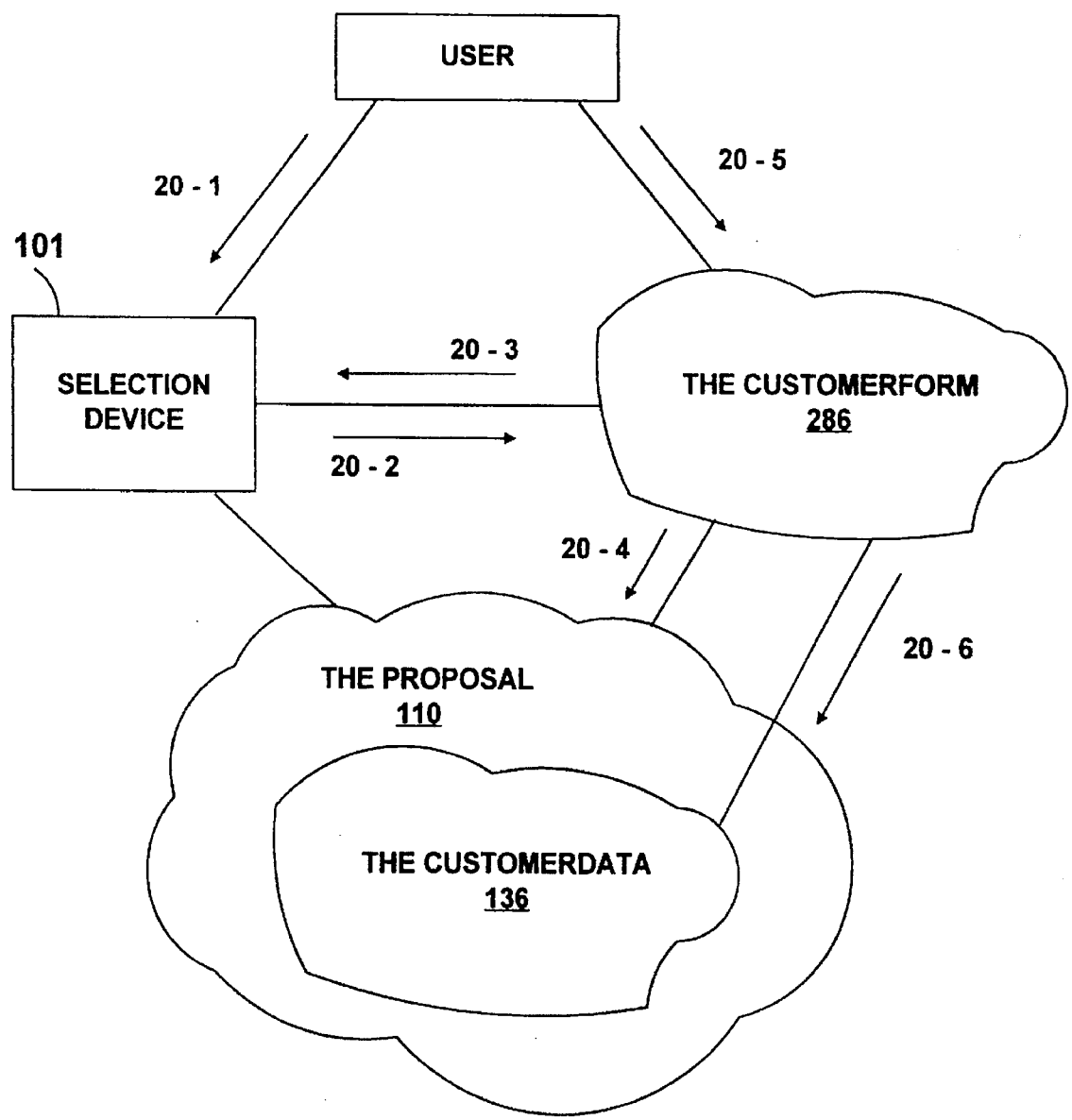
FIG. 20 is an object diagram illustrating a preferred flow of control involved when entering customer identification data.

To initiate the printing of the pages of the cover sheet 250, the user may select "Print" 178 from the main menu 170 of the selection device 101, as shown by step 19-1 of FIG. 19. In response, the selection device 101 preferably sends a print request to the report generator 104, as shown by step 19-2 of FIG. 19. The report generator 104 typically queries the active database 103 for successive page description records that describe the pages of the printed proposal, as shown by step 19-3 of FIG. 19. The active database 103 processes the request by searching the TableOfContentsData object 130 located in the current proposal. If the proposal is to include one or more cover sheet 250 pages comprising predetermined pictures and text related to features, benefits and environments of interest to the customer, the active database 103 preferably queries the TableOfContentsData object 130 for the applicable PageDescriptionRecord 314. The TableOfContentsData object 130 returns the relevant PageDescriptionRecord 314 to the active database 103. The active database 103 may then send the relevant PageDescriptionRecord 314 to the report generator 104, as shown by step 19-4 in FIG. 19. These PageDescriptionRecord 314 may include a field that contains an identifier that indicates which page layouts 120 may be used to format these particular cover sheet 250 pages. The report generator 104 preferably queries the report database 106 for the applicable page layouts 120, as shown by step 19-5 in FIG. 19. The report database 106 may return the relevant page layouts 120 to the report generator 104, as shown by step 19-6 in FIG. 19.

Each page layout 120 typically contains formatting specifications that indicate where specific cover sheet 250 information may appear on the printed page. The report generator 104 reads each format specification to determine the data required at that location on the page.

The report generator 104 retrieves, the text and pictures relating to features, benefits and environments of particular interest to the customer from the static database 105 object, as shown by step 19-9 in FIG. 19. The static database 105 will preferably return this information to the report generator 104, as shown by step 19-10 in FIG. 19. The report generator 104 typically repeats this process for each format specification on the page layout 120, which builds a cover sheet 250 page that may then be sent to the printer, as shown by step 19-11 in FIG. 19. In this fashion, the Report Generator 104 may print one or more customized and individualized cover sheet 250 pages.

The user interface 102 provides means for inputting the customer identification data of the individual customer who is to receive the proposal. The user may select "Customer Information" 176 from the main menu 170 of the selection device 101, as shown by step 20-1 in FIG. 20. In response, the selection device 101 preferably sends a load message to the CustomerForm object 286, as shown by step 20-2 in FIG. 20. On receipt of the load message, the CustomerForm object 286 displays itself in a window within the main window of the selection device 101. The CustomerForm object 286 may request a pointer to the current proposal, as shown by step 20-3 in FIG. 20. The CustomerForm object 286 typically requests from the current proposal a pointer to the CustomerData object 136 for this proposal, as shown by step 20-4 in FIG. 20.

The CustomerForm object 286 presents a user interface 102 typically comprising text entry fields and predetermined questions for the user. The text entry fields allow the user to input the name, address, telephone number and other identification data of the individual customer who is to receive the proposal, as shown by step 20-5 in FIG. 20. The predetermined questions allow the user to select one of a list of predetermined answers that correspond to the individual customer who is to receive the proposal. The customer information gathered by the CustomerForm object 286 may be stored in a CustomerData object 136 within the current proposal, as shown by step 20-6 in FIG. 20.

The cover sheet 250 page layout 120 may specify that the name, address and telephone number or other identification data of the customer appear on the cover sheet 250. The customer information may be stored in the CustomerData object 136 attached to the proposal.

Figure 21:
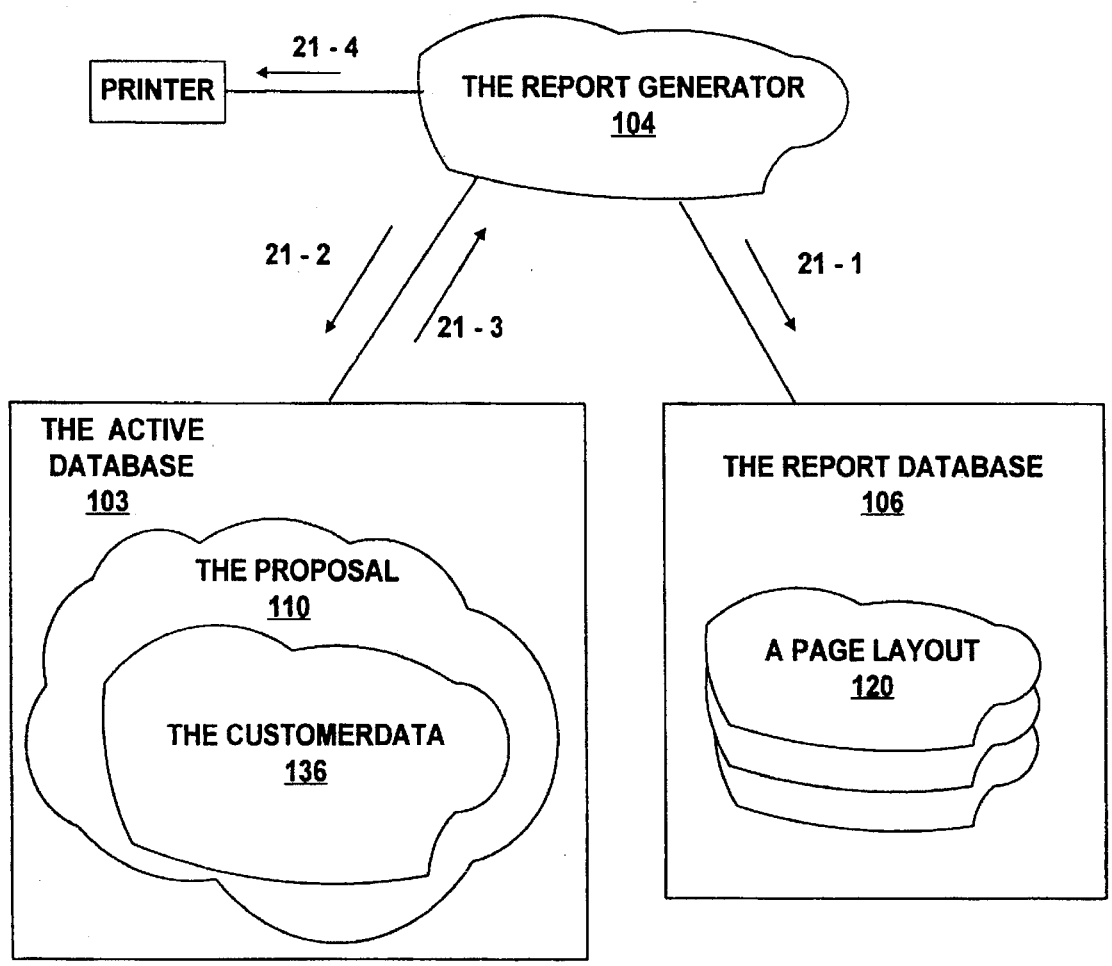
FIG. 21 is an object diagram illustrating a preferred flow of control involved when generating customer identification data.

The report generator 104 preferably reads format specifications from the page layout 120 via the report database 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 110. The active database 103 then returns this information to the report generator 104, as shown by step 21-3 in FIG. 21. The report generator 104 preferably builds the page using this information and sends it to the printer, as shown by step 21-4 in FIG. 21.

The user interface 102 may also provide means for inputting the salesperson identification data of the salesperson who is dealing with the individual customer. When a salesperson first accesses the selection device 101 to begin a proposal for a customer, a PasswordForm object is preferably displayed automatically. The salesperson may enter his/her name and password using the PasswordForm object 300, as shown by step 22-1 in FIG. 22. The PasswordForm object 300 typically requests from the selection device 101 a pointer to the ListOfSalesPersonsData object 158 in the customized database 114, as shown by step 22-2 in FIG. 22. The PasswordForm object 300, using this salesperson's password may locate the name, address, and telephone number of the salesperson, which is stored in the customized database 114, in a ListOfSalesPersons object, as shown by step 22-3 in FIG. 22.

Figure 22:
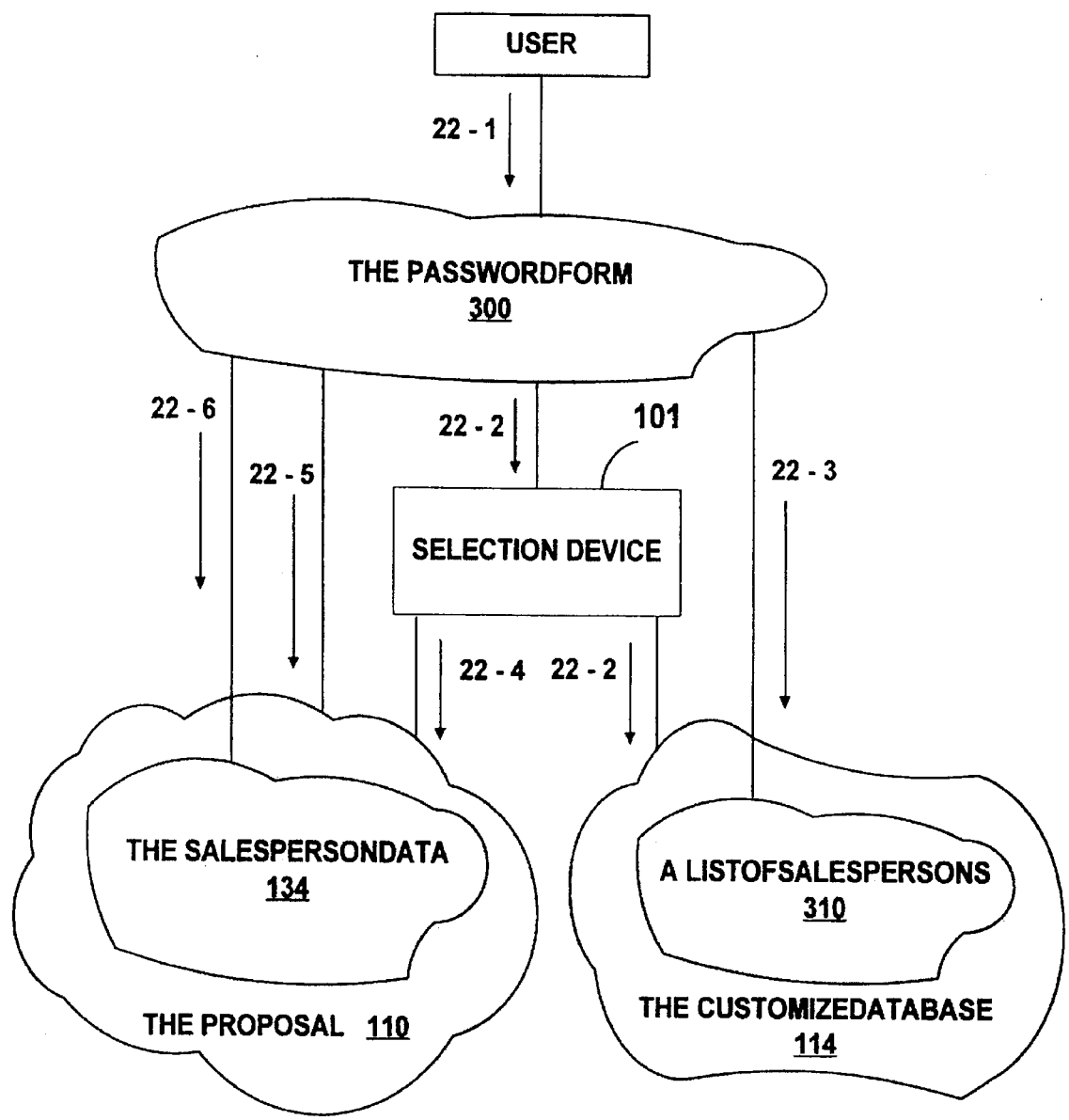
FIG. 22 is an object diagram illustrating a preferred flow of control involved when entering salesperson identification data.

If the salesperson exists in the ListOfSalesPersons object, the selection device 101 will preferably create a new proposal, which will be the current proposal, as shown by step 22-4 in FIG. 22. The PasswordForm object 300 may then obtain a pointer to the SalesPersonData object 134 in the proposal, as shown by step 22-5 in FIG. 22. The salesperson information may be stored in the SalesPersonData object 134 as a part of the current proposal, as shown by step 22-6 in FIG. 22.

Salesperson information for all the employees is preferably stored in the customized database 114 in a ListOfSalesPersons object. The employer may create an individual SalesPerson object for each employee. The ListOfSalesPersons object is a data structure containing a list of SalesPerson objects.

Dealership information may also ba stored in the customized database 114 in the DealerName object. The SalesPerson object and DealerName object can be created by the employer when the system is first purchased. The employer may choose to secure these two databases so that only the employer's master password will allow access. These data structures may be modified by the employer via the customized menu selection 177 in the selection device 101.

The user may choose to modify the name, address, and telephone number of the salesperson who is dealing with the individual customer, if the salesperson information is not as it should appear in the printed proposal. To modify the salesperson information, the user may select the appropriate customized menu selection 177 in the main menu 170 of the selection device 101. However, access to the customized menu selection 177, that allows modification of salesperson information and passwords, may be restricted. If the employer has secured this database, only the employer's master password should allow access to the salesperson information.

The cover sheet 250 page layouts 120 may specify that the name, address and telephone number of the salesperson appear on the cover sheet 250. The salesperson information is typically initially entered by the employer in the ListOfSalesPersonsData object 158 and is stored in the individual salesperson's SalesPersonData object 134 attached to the proposal. (See FIG. 22).

Figure 23:
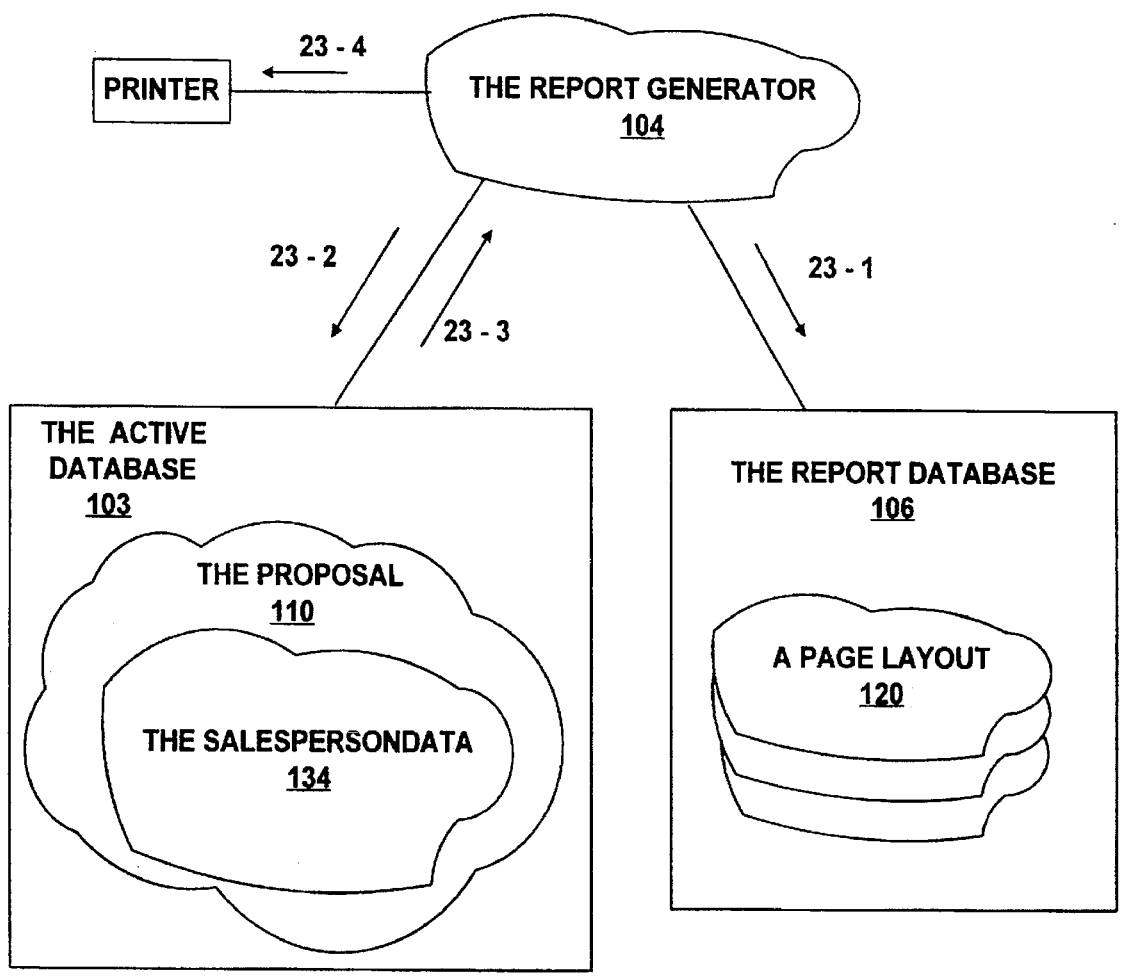
FIG. 23 is an object diagram illustrating a preferred flow of control involved when generating salesperson identification data.

The report generator 104 reads format specifications from the page layout 120 via the report database 106, as shown by step 1-23 in FIG. 23. When the particular format specifiers require the salesperson's name, address and telephone number to be included on a page format, the report generator 104 preferably sends a request to the active database 103 for the specified salesperson information, as shown by step 2-23 in FIG. 23. The active database 103 may obtain this salesperson information from the SalesPersonData object 134 in the proposal and returns this salesperson information to the report generator 104, as shown by step 3-23 in FIG. 23. The report generator 104 preferably builds the page using this salesperson information and sends the page to the printer, as shown by step 4-23 in FIG. 23.

Proposal: Personalized Letter

When the user begins a deal with a customer, the user may want to include a personalized letter 254 in the customized, printed proposal that will be prepared for the customer.

The user interface 102 provides means for presenting a series of predetermined queries related to writing a letter 254 of interest to different potential customers who may purchase a product. The user interface 102 also provides means for inputting individualized answers to the predetermined queries, the individualized answers comprising a personalized letter 254 relating to product configurations that are of particular interest to the individual customer who is to receive the proposal.

Figure 24:
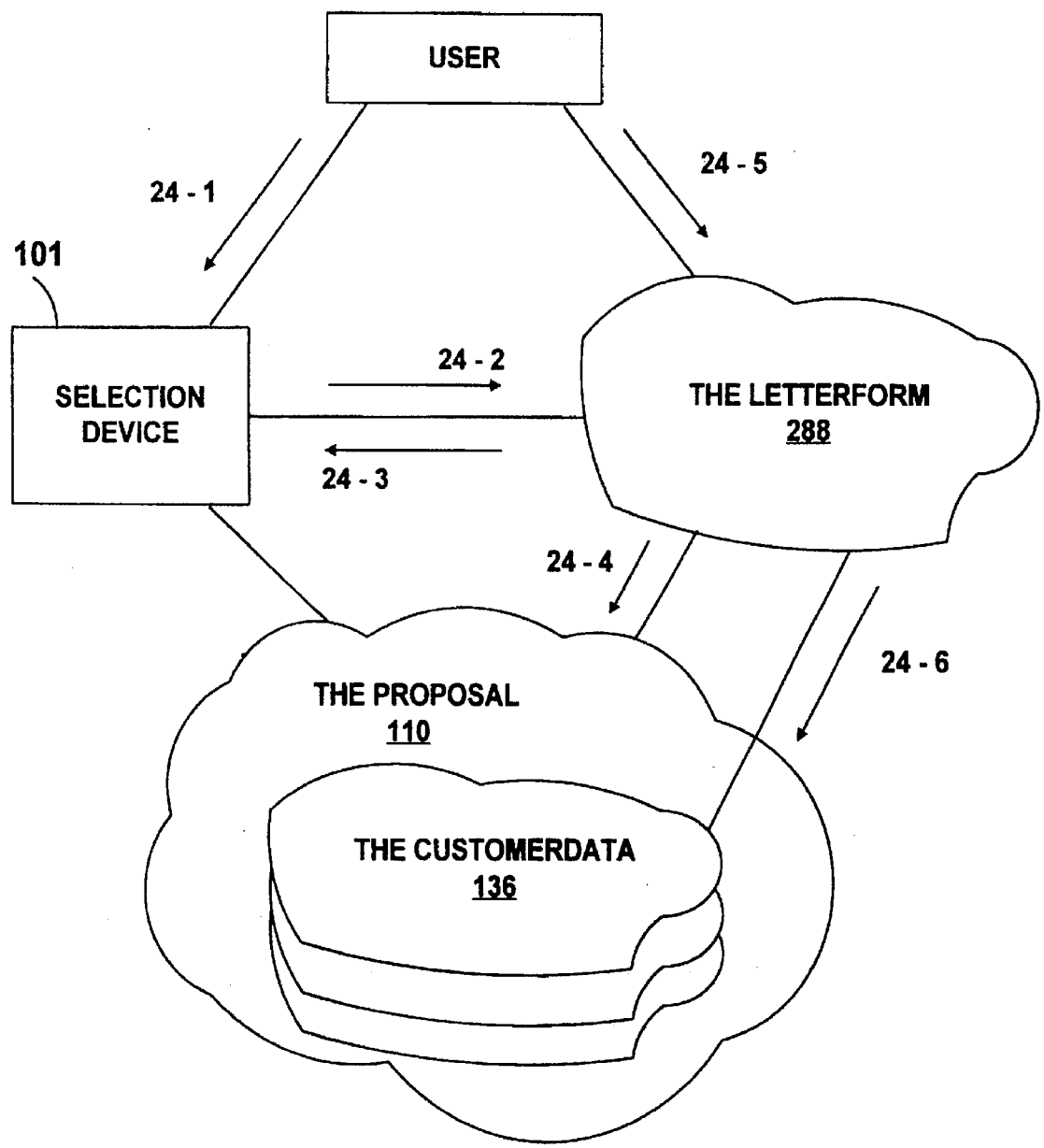
FIG. 24 is an object diagram illustrating a preferred flow of control involved when entering letter information.

The user may select "Customer Information" 176 from the main menu 170 of the selection device 101, as shown by step 24-1 in FIG. 24. The user further selects "Letter" 202 from the "Customer Information" menu 176. In response, the selection device 101 preferably sends a load message to the LetterForm object 288, as shown by step 24-2 in FIG. 24. On receipt of the load message, the LetterForm object 288 displays itself in a window within the main window of the selection device 101. Upon loading itself, the LetterForm object 288 may obtain a pointer to a proposal object 110, as shown by step 24-3 in FIG. 24. The LetterForm object 288 then obtains a pointer from the proposal object 110 to a LetterData object 138, as shown by step 24-4 in FIG. 24.

The LetterForm object 288 preferably presents a user interface 102 to the user comprising text entry fields and predetermined questions for the user, as shown by step 24-5 in FIG. 24. This user interface 102 is a means for inputting individualized answers to the predetermined queries, the individualized answers relating to writing a personalized letter 254 regarding a product configuration that is of particular interest to the individual customer who is to receive the proposal. The predetermined questions allow the user to fill in the text entry fields with predetermined answers that correspond to the customer who is to receive the proposal. The personalized letter 254 information gathered by the letterForm object 288 may then be stored in the LetterData object 138 which is attached to the current proposal object 110, as shown by step 24-6 in FIG. 24.

The user may decide to generate a customized, printed proposal that includes one or more pages comprising the personalized letter 254. To include these personalized letter 254 pages, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired Personalized letter 254 page from a list of pages that are available for inclusion in the printed proposal, as shown by step 18-5 of FIG. 18. The selected pages may be stored as PageDescriptionRecord 314 in a TableOfContentsData object 130, as shown by step 18-6 of FIG. 18. These PageDescriptionRecord 314 include a field that contains an identifier that indicates which page layout 120 may be used to format each personalized letter 254 page. The page layout 120 typically determines the content and appearance of the final printed page. The page layouts 120 may be stored in the report database 106.

Figure 25:
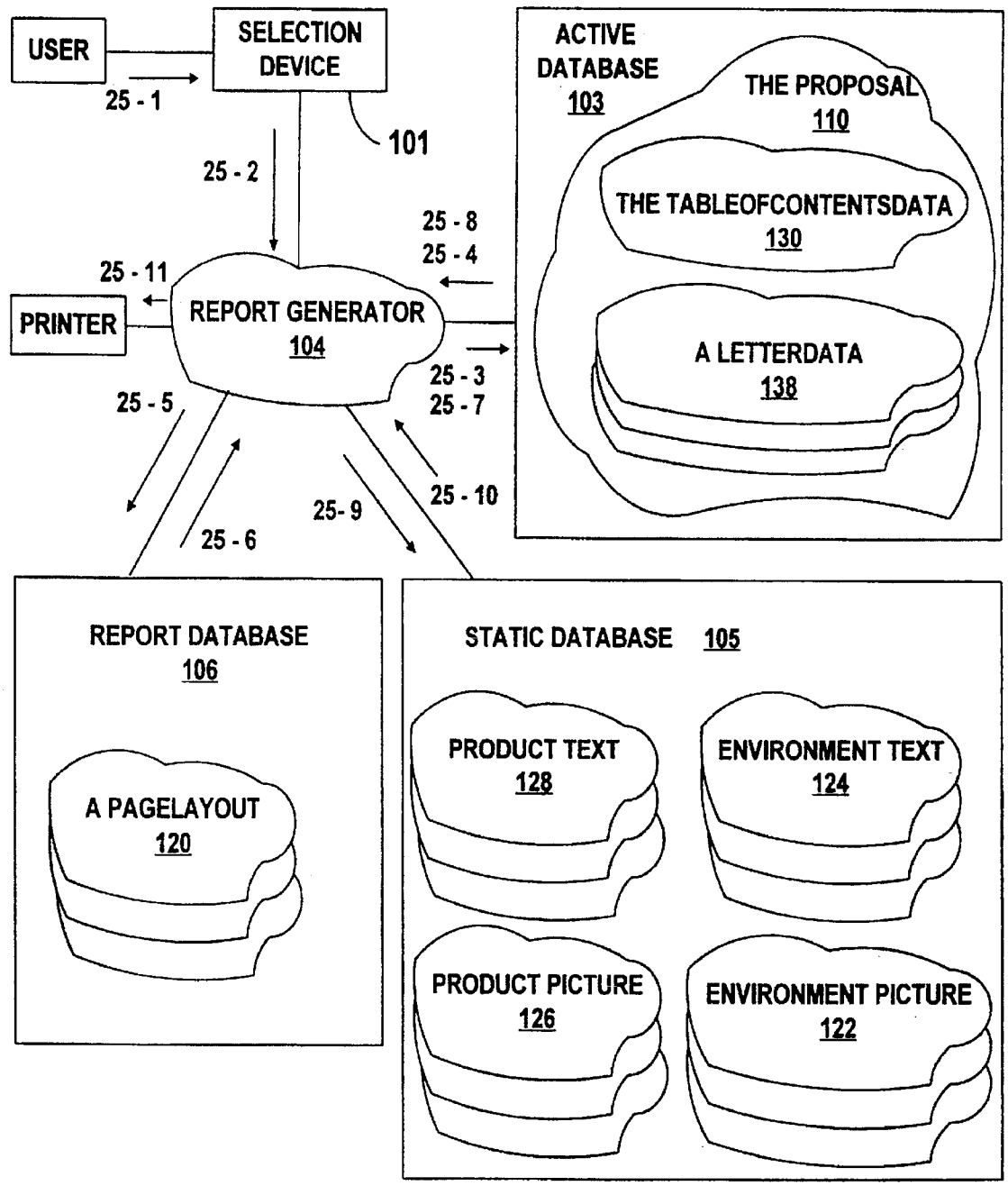
FIG. 25 is an object diagram illustrating a preferred flow of control involved when generating a personalized letter.

To initiate the printing of the personalized letter, the user may select "Print" 178 from the main menu 170 of the selection device 101, as shown by step 25-1 of FIG. 25. In response, the selection device 101 preferably sends a print request to the report generator 104, as shown by step 25-2 of FIG. 25. The report generator 104 queries the active database 103 for successive page description records that describe the pages of the printed proposal, as shown by step 25-3 of FIG. 25. The active database 103 typically processes the request by searching the TableOfContentsData object 130 located in the current proposal. If the proposal is to include one or more pages comprising the personalized letter 254, the active database 103 typically queries the TableOfContentsData object 130 for the applicable PageDescriptionRecord 314. The TableOfContentsData object 130 returns the relevant PageDescriptionRecord 314 to the active database 103. The Active Database 103 may then send the relevant PageDescriptionRecord 314 to the report generator 104, as shown by step 25-4 in FIG. 25. These PageDescriptionRecord 314 may include a field that contains an identifier that indicates which page layouts 120 may be used to format these particular letter 254 pages. The report generator 104 queries the report database 106 for the applicable page layouts 120, as shown by step 25-5 in FIG. 25. The report database 106 returns the relevant page layouts 120 to the report generator 104, as shown by step 25-6 in FIG. 25.

Each page layout 120 contains formatting specifications that indicate where specific Personalized letter 254 information may appear on the printed page. The report generator 104 typically reads each format specification to determine the data required at that location on the page.

If the format specifications require data relating to the personalized letter 254, the report generator 104 preferably queries the active database 103, as shown by step 25-7 in FIG. 25. The active database 103 queries the LetterData object 138, locates and retrieves the applicable personalized letter 254 information from the LetterData object 138, and returns this personalized letter 254 information to the report generator 104, as shown by step 25-8 in FIG. 25.

If the format specifications require static pictures or text segments, then the report generator 104 preferably retrieves the applicable information from the static database 105 object, as shown by step 25-9 in FIG. 25. The static database 105 returns this information to the report generator 164 as shown in step 25-10 in FIG. 25. The report generator 104 typically repeats this process for each format specification on the page layout 120, which builds a personalized letter 254 page that is then sent to the printer, as shown by step 25-11 in FIG. 25.

In this fashion, the report generator 104 may print one or more customized and individualized letter 254 pages, along with the predetermined text segments and pictures that correspond with the personalized letter 254 information related to a particular product configuration.

The personalized letter 254 page layouts 120 may specify that the name, address and telephone number or other identification data of the customer appear on the letter 254 pages. The customer information may be initially entered via the CustomerForm object 286. (See FIG. 20). The customer information may be stored in the CustomerData object 136 attached to the proposal.

The report generator 104 preferably reads format specifications from the page layout 120 via the report database 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 may obtain the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The letter 254 page layouts 120 may specify that the name, address and telephone number of the salesperson appear on the letter 254 pages. The salesperson information may be initially entered by the employer in the ListOfSalesPersonsData object 158 and is stored in the individual salesperson's SalesPersonData object 134 attached to the proposal. (See FIG. 22). The report generator 104 may read format specifications from the page layout 120 via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 preferably builds the page using this salesperson information and sends the page to the printer, as shown by step 23-4 in FIG. 23.

Proposal: Product Description Pages

When the user begins a deal with a customer, the user may want to include in the customized, printed proposal one or more product description pages each comprising predetermined pictures and text relating to features, benefits and environments of interest to the customer.

The user interface 102 provides a means for presenting a series of predetermined queries related to features, benefits and environments of particular items of standard and optional equipment that may be included in the product. This product description information may be of interest to different potential customers who may purchase the product. The user interface 102 is also a means for selecting particular items of standard and optional equipment about which product description information should appear in the printed proposal.

Figure 26:
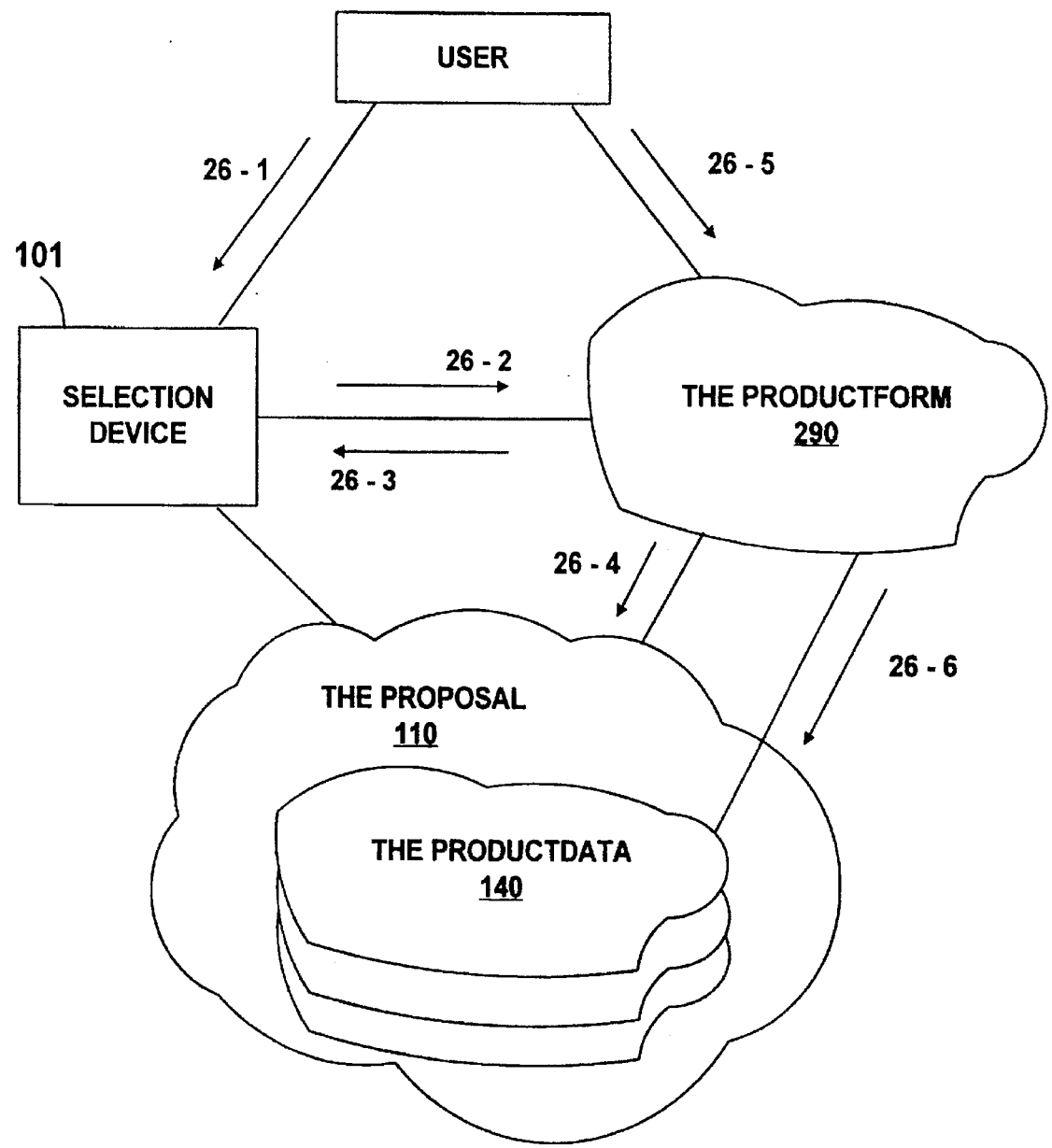
FIG. 26 is an object diagram illustrating a preferred flow of control involved when selecting product descriptions.

The user may select "Customer Information" 176 from the main menu 170 of the selection device 101, as shown by step 26-1 in FIG. 26. The user further selects "Standard and Optional Equipment" from the "Customer Information" 176 menu. In response, the selection device 101 preferably sends a load message to the ProductForm object 290, as shown by step 26-2 in FIG. 26. On receipt of the load message, the ProductForm object 290 may display itself in a window within the main window of the selection device 101. Upon loading itself, the ProductForm object 290 obtains a pointer to a proposal object 110, as shown by step 26-3 in FIG. 26. The ProductForm object 290 may then obtain a pointer from the proposal object 110 to a ProductData object 140, as shown by step 26-4 in FIG. 26.

The ProductForm object 290 presents a user interface 102 to the user typically comprising text entry fields and predetermined questions for the user, as shown by step 26-5 in FIG. 26. The predetermined questions allow the user to specify those items of standard and optional equipment about which features and benefits information is of particular interest to the customer who is to receive the proposal. The product description information gathered by the ProductForm object 290 may then be stored in the ProductData object 140 which is attached to the current proposal object 110, as shown by step 26-6 in FIG. 26.

The user may decide to generate a customized, printed proposal that includes one or more product description pages. To include these product description pages, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 123, as shown by step 18-4 of FIG. 18. The user may then select the desired product description pages from a list of pages that are available for inclusion in the printed proposal, as shown by step 18-5 of FIG. 18. The selected pages may be stored as PageDescriptionRecord 314 in a TableOfContentsData object 123, as shown by step 18-6 of FIG. 18. These PageDescriptionRecord 314 typically include a field that contains an identifier that indicates which page layout 120 may be used to format each product description page. The page layout 120 preferably determines the content and appearance of the final printed page. The page layouts 120 are stored in the report database 106.

Figure 27:
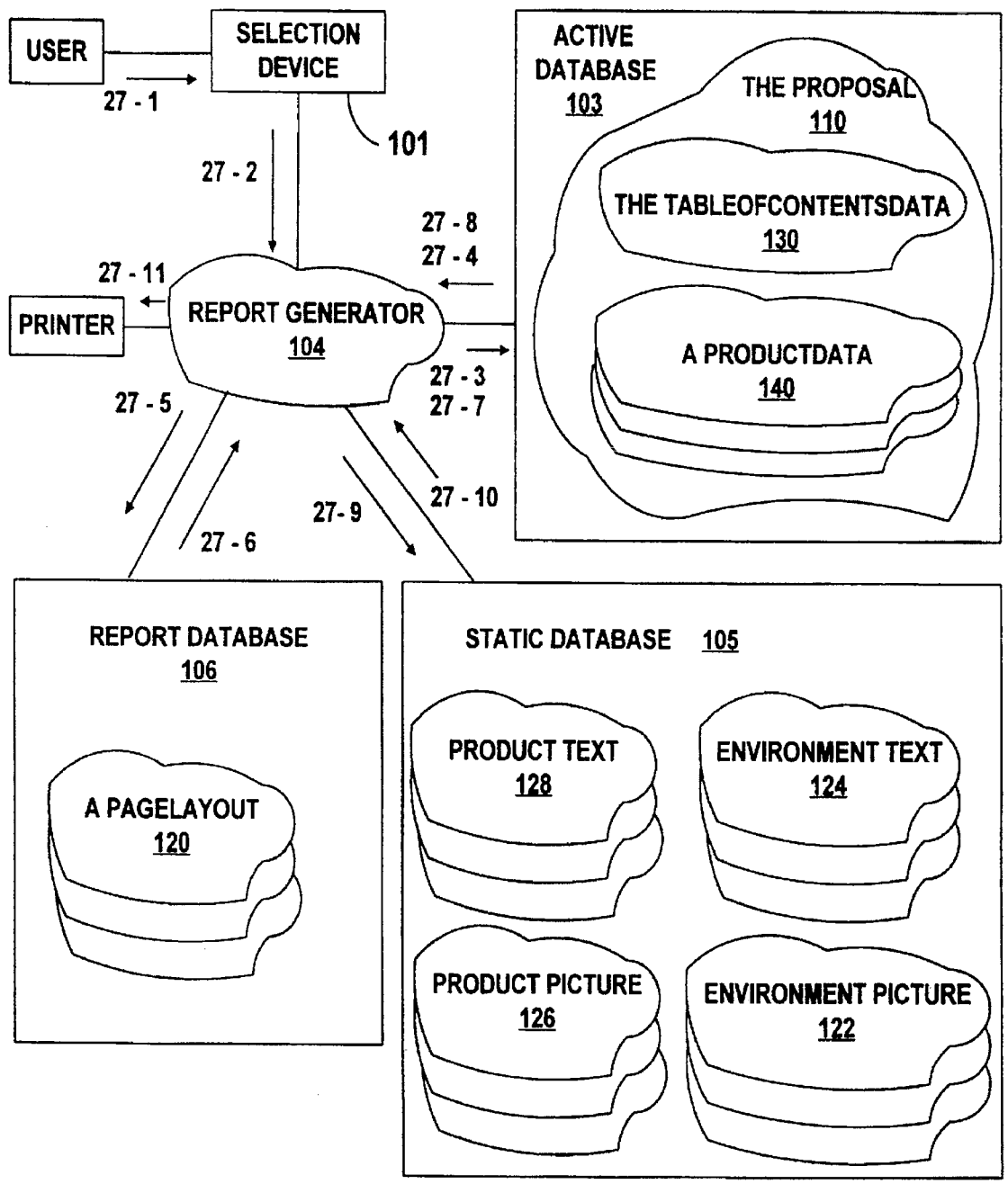
FIG. 27 is an object diagram illustrating a preferred flow of control involved when generating product description pages.

To initiate the printing of the product description pages, the user may select "Print" 178 from the main menu 170 of the selection device 101, as shown by step 27-1 of FIG. 27. In response, the selection device 131 preferably sends a print request to the report generator 104, as shown by step 27-2 of FIG. 27. The report generator 104 may query the active database 103 for successive page description records that describe the pages of the printed proposal, as shown by step 27-3 of FIG. 27. The active database 103 typically processes the request by searching the TableOfContentsData object 130 located in the current proposal. If the proposal is to include one or more product description pages comprising predetermined pictures and text related to features, benefits and environments of interest to the customer, the active database 103 preferably queries the TableOfContentsData object 130 for the applicable PageDescriptionRecord 314. The TableOfContentsData object 130 returns the relevant PageDescriptionRecord 314 to the active database 103. The active database 103 may then send the relevant PageDescriptionRecord 314 to the report generator 104, as shown by step 27-4 in FIG. 27. These PageDescriptionRecord 314 may include a field that contains an identifier that indicates which page layouts 120 may be used to format these particular product description pages. The report generator 104 queries the report database 106 for the applicable page layouts 120, as shown by step 275 in FIG. 27. The report database 106 returns the relevant page layouts 120 to the report generator 104, as shown by step 27-6 in FIG. 27.

Each page layout 120 preferably contains formatting specifications that indicate where specific product description information may appear on the printed page. The report generator 104 reads each format specification to determine the data required at that location on the page.

If the format specifications require data relating to the features, benefits and environments of interest to a customer, the report generator 104 preferably queries the active database 103 for the standard and optional equipment product description information, as shown by step 27-7 in FIG. 27. The active database 103 queries the ProductData object 140, locates and retrieves the selected items of standard and optional equipment from the ProductData object 140, and returns this information to the report generator 104, as shown by step 27-8 in FIG. 27.

The report generator 104 typically retrieves the text and pictures relating to features, benefits and environments for items of standard and optional equipment selected for inclusion in the printed proposal from the static database 105 object, as shown by step 27-9 in FIG. 27. The static database 105 may return this information to the report generator 104, as shown by step 27-10 in FIG. 27. The report generator 104 preferably repeats this process for each format specification on the page layout 120, which builds a product description page that is then sent to the printer, as shown by step 27-11 in FIG. 27. In this fashion, the Report Generator 104 may print one or more customized and individualized product description pages.

The product description page layout 120 may specify that the name, address and telephone number or other identification data of the customer appear on the product description pages. The customer information may be initially entered via the CustomerForm object 286. (See FIG. 20). The customer information may be stored in the CustomerData object 136 attached to the proposal.

The report generator 104 reads format specifications from the page layout 120 via the report database 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 may obtain the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The product description page layout 120 may specify that the name, address and telephone number of the salesperson appear on the product description pages. The salesperson information may be initially entered by the employer, for example, in the ListOfSalesPersonsData object 158 and may be stored in the individual salesperson's SalesPersonData object 134 attached to the proposal. (See FIG. 22). The report generator 104 reads format specifications from the page layout 120 via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Product Specification Pages

When the user begins a deal with a customer, the user may want to include in the customized, printed proposal one or more individualized pages comprising the product specification which is of particular interest to the customer who is to receive the proposal.

The user interface 102 provides a means for presenting a series of predetermined queries related to the particular items of standard and optional equipment that may be included in the product specification of particular interest to a customer. The user interface 102 also provides a means for selecting particular items of standard and optional equipment to be included in the product specification of a particular product.

Figure 28:
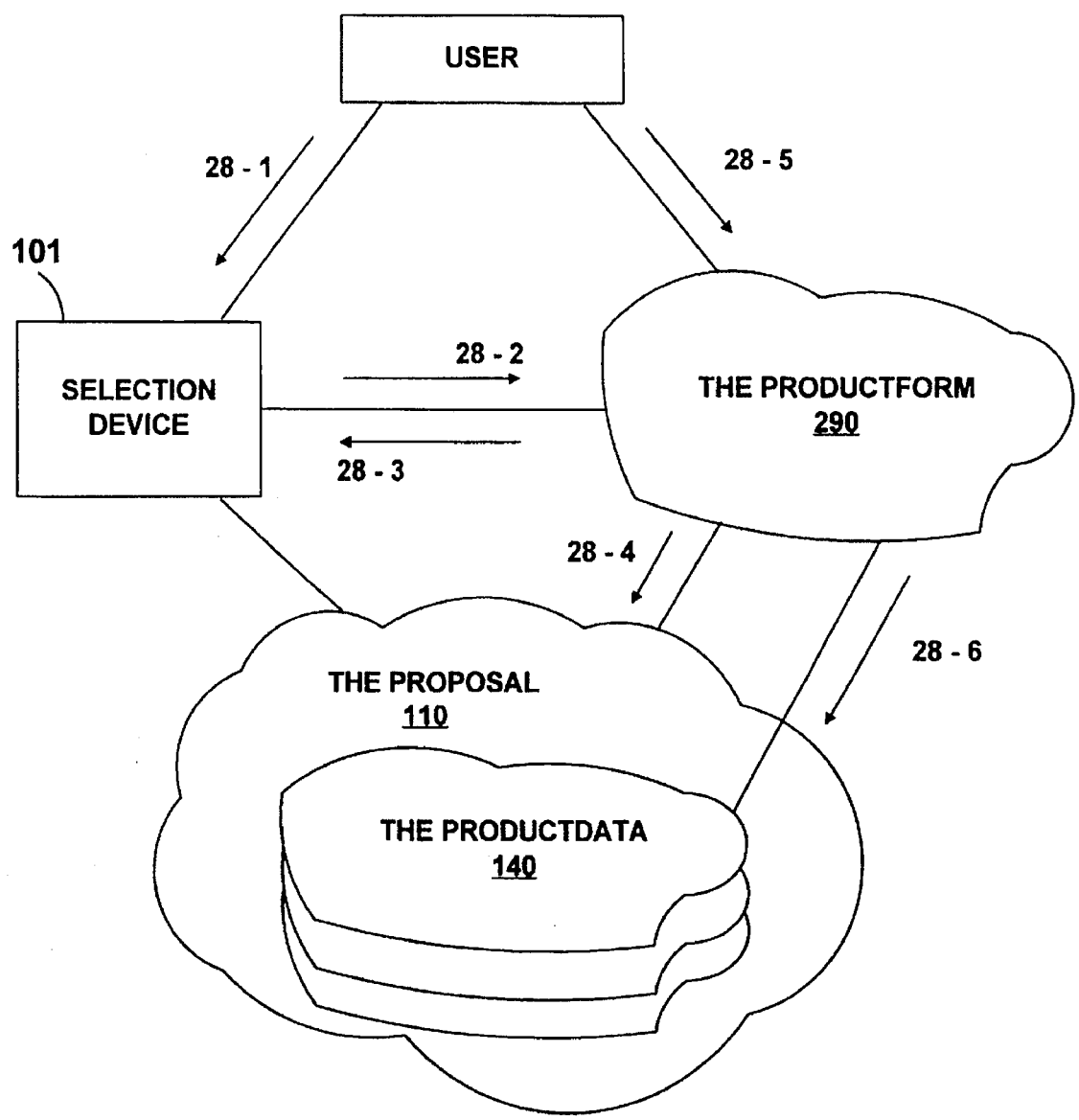
FIG. 28 is an object diagram illustrating a preferred flow of control involved when entering product specification information.

The user may select "Customer Information" 176 from the main menu 170 of the selection device 101, as shown by step 28-1 in FIG. 28. The user may further select "Standard and Optional Equipment" from the "Customer Information" 176 menu. In response, the selection device 101 preferably sends a load message to the ProductForm object 290, as shown by step 28-2 in FIG. 28. On receipt of the load message, the ProductForm object 290 may display itself in a window within the main window of the selection device 101. Upon loading itself, the ProductForm object 290 obtains a pointer to a proposal object 110, as shown by step 28-3 in FIG. 28. The ProductForm object 290 then obtains a pointer from the proposal object 110 to a ProductData object 140, as shown by step 28-4 in FIG. 28.

The ProductForm object 290 presents a user interface 102 to the user typically comprising text entry fields and predetermined questions for the user, as shown by step 28-5 in FIG. 28. The predetermined questions allow the user to specify those items of standard and optional equipment to be included in the product specification of particular interest to the customer who is to receive the proposal. The product specification gathered by the ProductForm object 290 may then be stored in the ProductData object 140 which is attached to the current proposal object 110, as shown by step 28-6 in FIG. 28.

The user may decide to generate a customized, printed proposal that includes one or more product specification pages. To include these product specification pages, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired product specification pages from a list of pages that are available for inclusion in the printed proposal, as shown by step 18-5 of FIG. 18. The selected pages may be stored as PageDescriptionRecord 314 in a TableOfContentsData object 130, as shown by step 18-6 of FIG. 18. These PageDescriptionRecord 314 typically include a field that contains an identifier that indicates which page layout 120 may be used to format each product specification page. The page layout 120 preferably determines the content and appearance of the final printed page. The page layout 120 may be stored in the report database 106.

Figure 29:
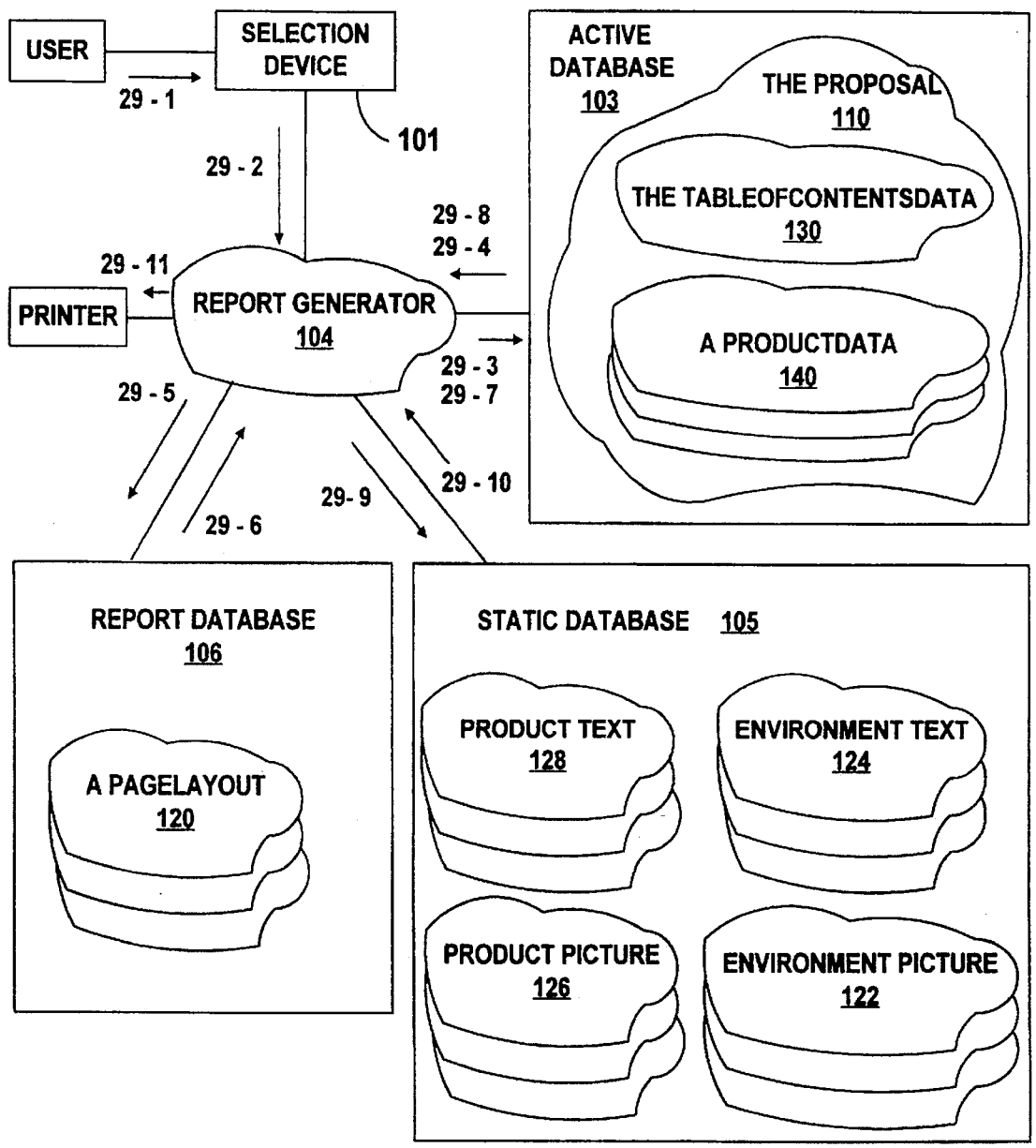
FIG. 29 is an object diagram illustrating a preferred flow of control involved when generating product specification pages.

To initiate the printing of the product specification pages, the user may select "Print" 178 from the main menu 170 of the selection device 101, as shown by step 29-1 of FIG. 29. In response, the selection device 101 preferably sends a print request to the report generator 104, as shown by step 29-2 of FIG. 29. The report generator 104 may query the Active Database 103 for successive page description records that describe the pages of the printed proposal, as shown by step 29-3 of FIG. 29. The active database 103 preferably processes the request by searching the TableOfContentsData object 130 located in the current proposal. If the proposal is to include one or more product specification pages, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 29-4 in FIG. 29. These PageDescriptionRecord 314 may include a field that contains an identifier that indicates which page layout 120 may be used to format these particular product specification pages. The report generator 104 queries the report database 106 for the applicable page layout 120, as shown by step 29-5 in FIG. 29. The report database 106 returns the relevant page layout 120 to the report generator 104, as shown by step 29-6 in FIG. 29.

Each page layout 120 preferably contains formatting specifications that indicate where specific product specification information may appear on the printed page. The report generator 104 reads each format specification to determine the data required at that location on the page.

If the format specifications require data relating to the product specification of interest to a customer, the report generator 104 queries the active database 103 for the product specification information, as shown by step 29-7 in FIG. 29. The active database 103 queries the ProductData object 140, locates and retrieves the product specification information from the ProductData object 140, and returns this information to the report generator 104, as shown by step 29-8 in FIG. 29.

The product specification information stored in the active database 103 may be linked to additional product specification information stored in the static database 105. The additional product specification information may include weights and prices of the individual items of standard and optional equipment included in the product of interest to the customer.

The report generator 104 retrieves the additional product specification information for items of standard and optional equipment selected for inclusion in the printed proposal from the static database 105, as shown by step 29-9 in FIG. 29. The static database 105 may return this information to the report generator 104, as shown by step 29-10 in FIG. 29. The report generator 104 preferably repeats this process for each format specification on the page layout 120, which builds a product specification page that is then sent to the printer, as shown by step 29-11 in FIG. 29. In this fashion, the report generator 104 may print one or more customized and individualized product specification pages.

The product specification page layout 120 may specify that the name, address and telephone number or other identification data of the customer appear on the product specification pages. The customer information may be initially entered via the CustomerForm object 286. (See FIG. 20). The Customer information may be stored in the CustomerData object 136 attached to the proposal.

The report generator 104 may read format specifications from the page layout 120 via the report database 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The product specification page layout 120 may specify that the name, address and telephone number of the salesperson appear on the product specification pages. The salesperson information may be initially entered by the employer, for example, in the ListOfSalesPersonsData object 158 and may be stored in the individual salesperson's SalesPerson-Data object 134 attached to the proposal. (See FIG. 22). The report generator 104 reads format specifications from the page layout 120 via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Performance Specification Pages

When the user begins a deal with a customer, the user may want to include in the customized, printed proposal one or more individualized pages comprising the performance specifications that are of particular interest to the customer who is to receive the proposal.

The user may decide to generate a customized, printed proposal that includes one or more performance specification pages 240. To include these performance specification pages 240, the user may select "Contents" 174 from the main menu 170 of the selection device 101, as shown by step 18-1 of FIG. 18. In response, the selection device 101 preferably sends a load message to the TableOfContents-Form object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user then selects the desired performance specification pages 240 from a list of pages that are available for inclusion in the printed proposal, as shown by step 18-5 of FIG. 18. The selected pages are stored as PageDescriptionRecord 314 in a TableOfContentsData object 130, as shown by step 18-6 of FIG. 18. These PageDescriptionRecord 314 include a field that contains an identifier that indicates which page layout 120 may be used to format each performance specification page 240. The page layout 120 preferably determines the content and appearance, of the final printed page. The page layout 120 may be stored in the report database 106.

Figure 30:
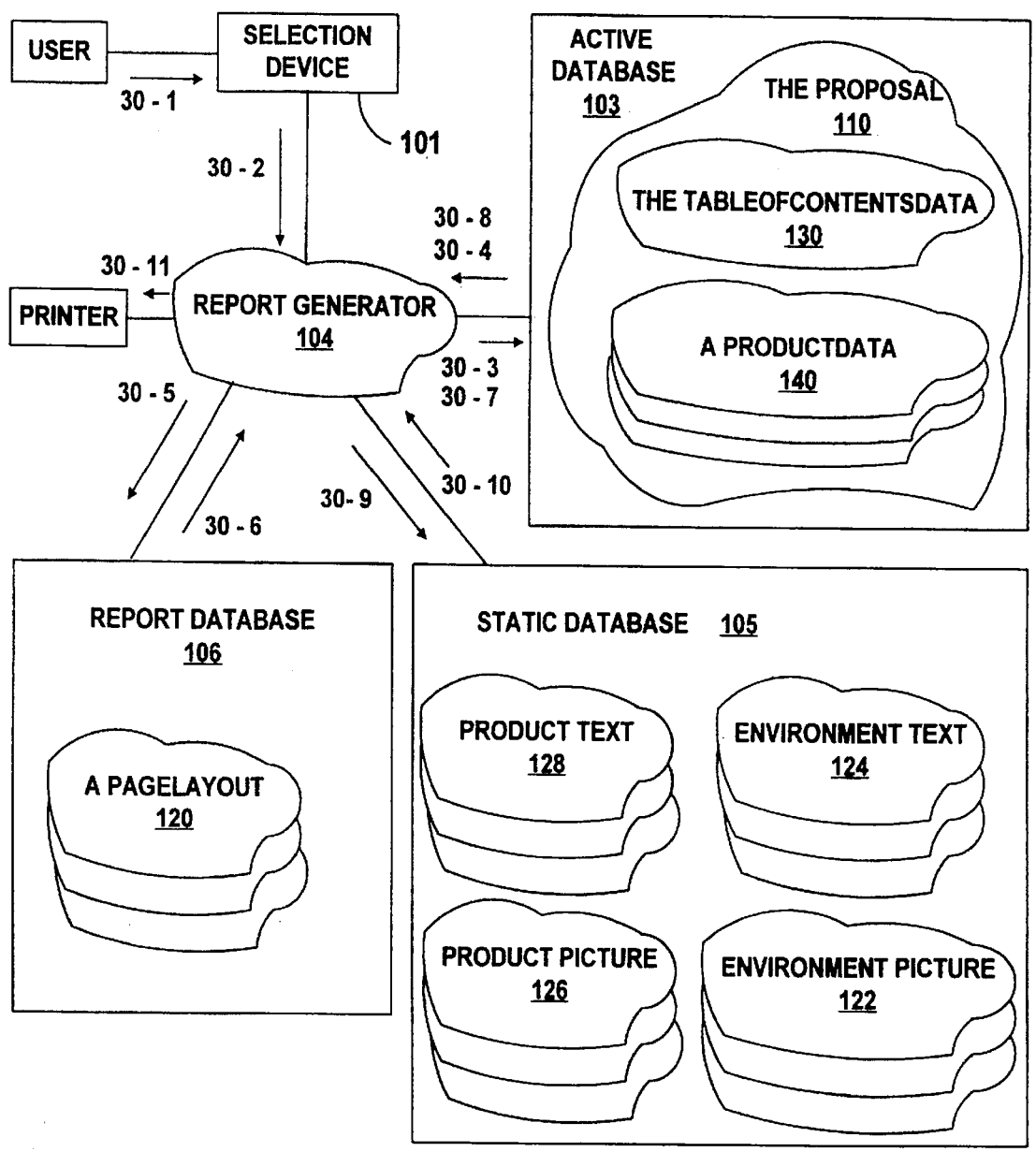
FIG. 30 is an object diagram illustrating a preferred flow of control involved when generating performance specification pages.

To initiate the printing of the performance specification pages 240, the user may select "Print" 178 from the main menu 170 of the selection device 101, as shown by step 30-1 of FIG. 30. In response, the selection device 101 preferably sends a print request to the report generator 104, as shown by step 30-2 of FIG. 30. The report generator 104 queries the active database 103 for successive page description records that describe the pages of the printed proposal, as shown by step 30-3 of FIG. 30. The active database 103 processes the request by searching the TableOfContentsData object 130 located in the current proposal. If the proposal is to include one or more performance specification pages 240, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 30-4 in FIG. 30. These PageDescriptionRecord 314 may include a field that contains an identifier that indicates which page layout 120 may be used to format these particular performance specification pages 240. The report generator 104 queries the report database 106 for the applicable page layout 120, as shown by step 30-5 in FIG. 30. The report database 106 returns the relevant page layout 120 to the report generator 104, as shown by step 30-6 in FIG. 30.

Each page layout 120 typically contains formatting specifications that indicate where specific performance specification information may appear on the printed page. The report generator 104 may read each format specification to determine the data required at that location on the page.

If the format specifications require data relating to the performance specification of interest to a customer, the report generator 104 queries the active database 103 for the performance specification information, as shown by step 30-7 in FIG. 30. The active database 103 will preferably handle the process of calculating the desired performance specification information based on the product specification stored within itself and additional performance information linked to this product information 238 and stored in the static database 105. The active database 103 may return this information to the report generator 104, as shown by step 30-8 in FIG. 30.

If the format specifications require static pictures or text segments, then the report generator 104 typically retrieves the applicable information from the static database 105 object, as shown by step 30-9 in FIG. 30. The report generator 104 may repeat this process for each format specification on the page layout, which builds a performance specification page 240 that is then sent to the printer, as shown by step 30-11 in FIG. 30. In this fashion, the report generator 104 may print one or more customized and individualized performance specification pages 240.

The performance specification page layout 120 may specify that the name, address and telephone number or other identification data of the customer appear on the performance specification pages 240. The customer information may be initially entered via the CustomerForm object 286. (See FIG. 20). The customer information may be stored in the CustomerData object 136 attached to the proposal.

The report generator 104 typically reads format specifications from the page layout 120 via the report database 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the customerData object 136 stored within the current proposal object 110. The active database 103 then returns this information to the report generator 104, as shown by step 21-3 in FIG. 21. The report generator 104 may then build the page using this information and sends it to the printer, as shown by step 21-4 in FIG. 21.

The performance specification page layout 120 may specify that the name, address and telephone number of the salesperson appear on the performance specification pages 240. The salesperson information may be initially entered by the employer in the ListOfSalesPersonsData object 158 and is stored in the individual salesperson's SalesPersonData object 134 attached to the proposal. (See FIG. 22). The report generator 104 reads format specifications from the page layout via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Trade-in Pages

When the user begins a deal with a customer, the customer may want to trade in a product, in which case, the user will typically want to include individualized trade-in product information pages 242 in the customized, printed proposal that will be prepared for the customer.

The user interface 102 provides means for presenting a series of predetermined queries related to the description and appraised value of a trade-in product to be traded in by the individual customer who is to receive the proposal. The user interface 102 also provides means for inputting individualized answers to the predetermined queries, the individualized answers relating to the description and appraised value of a trade-in product to be traded in by the individual customer who is to receive the proposal.

Figure 31:
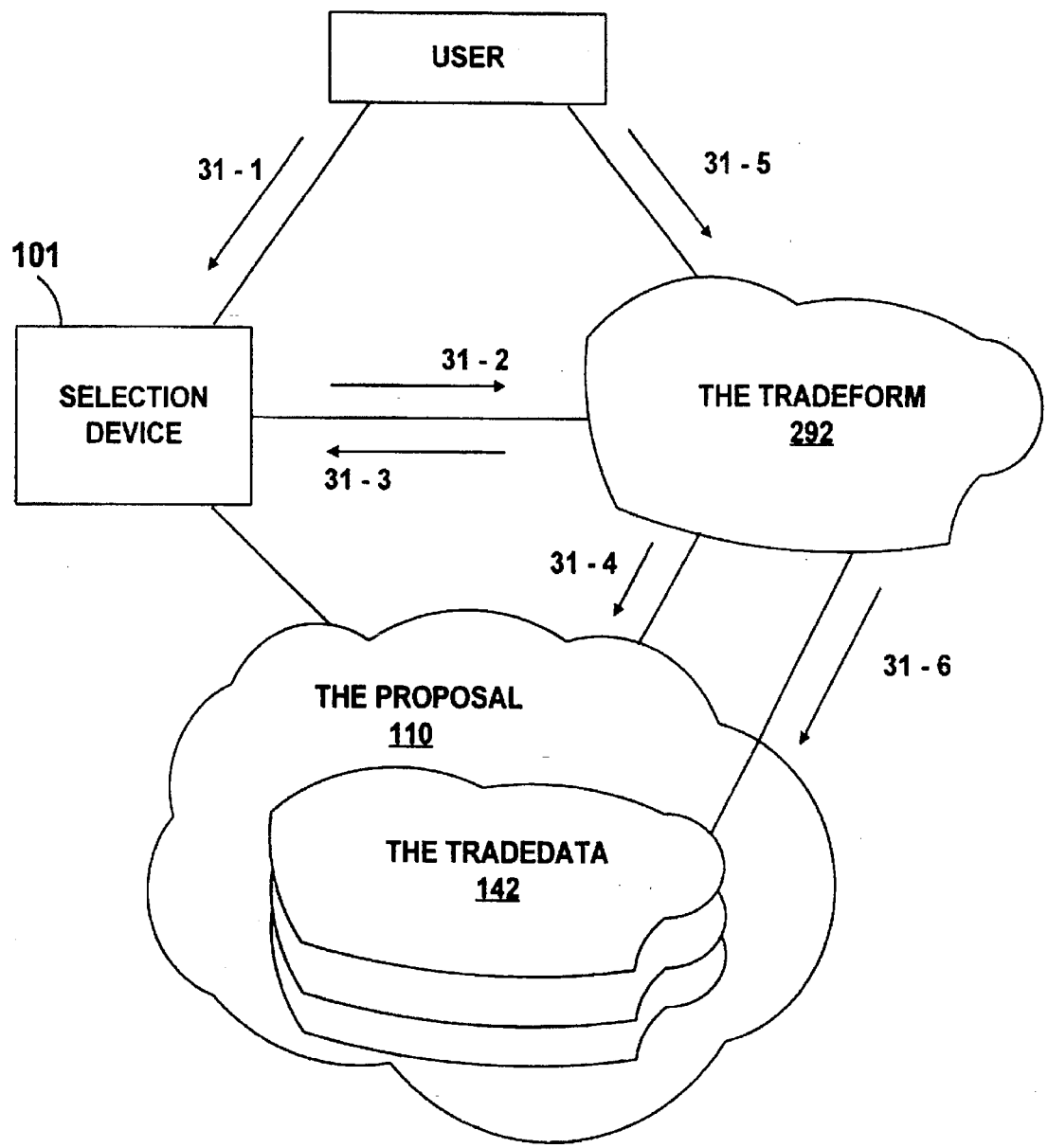
FIG. 31 is an object diagram illustrating a preferred flow of control involved when entering trade-in product information.

The user may select "Customer Information" 176 from the main menu 170 of the selection device 101, as shown by step 31-1 in FIG. 31. The user further selects "Trade" 206 from the customer information menu. In response, the selection device 101 preferably sends a load message to the TradeForm object 292, as shown by step 31-2 in FIG. 31. On receipt of the load message, the TradeForm object 292 may display itself in a window within the main window of the selection device 101. Upon loading itself, the TradeForm object 292 obtains a pointer to a proposal object 110, as shown by step 31-3 in FIG. 31. The TradeForm object 292 then obtains a pointer from the proposal object 110 to a TradeData object 142, as shown by step 31-4 in FIG. 31.

The TradeForm object 292 presents a user interface 102 to the user typically comprising text entry fields and predetermined questions for the user, as shown by step 31-5 in FIG. 31. This user interface 102 allows the user to enter information regarding a trade-in product to be traded in by the individual customer who is to receive the proposal. The user may fill in various data fields with information comprising a description and appraised value for the trade-in product. The predetermined questions allow the user to select one of a list of predetermined answers that correspond to the trade-in product of the customer who is to receive the proposal. The trade-in information gathered by the Trade-Form object 292 may be stored in the TradeData object 142 which is attached to the current proposal object 110, as shown by step 31-6 in FIG. 31.

The user may decide to generate a customized, printed proposal that includes one or more pages comprising the description and appraised value of a trade-in product. To include these trade-in pages, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired trade-in pages from a list of pages that are available for inclusion in the printed proposal, as shown by step 18-5 of FIG. 18. The selected pages may be stored as PageDescriptionRecord 314 in TableOfContentsData object 130, as shown by step 18-6 of FIG. 18. These PageDescriptionRecord 314 include a field that contains an identifier that indicates which page layout 120 may be used to format each trade-in page 242. The page layout 120 preferably determines the content and appearance of the final printed page. The page layouts 120 may be stored in the report database 106.

Figure 32:
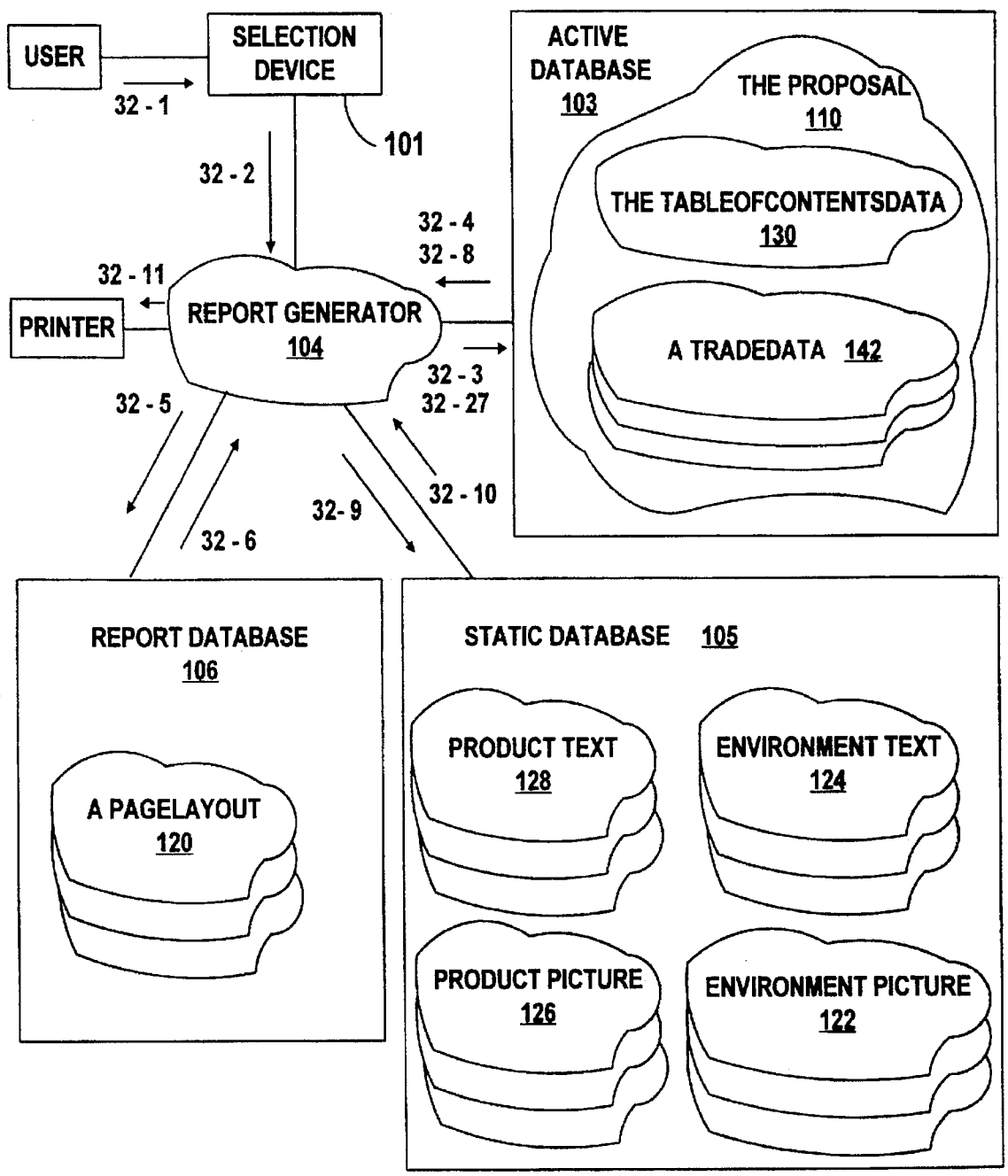
FIG. 32 is an object diagram illustrating a preferred flow of control involved when generating trade-in product pages.

To initiate the printing of the trade-in pages 242 comprising the description and appraised value of the trade-in product, the user may select "Print" 178 from the main menu 170 of the selection device 101, as shown by step 32-1 of FIG. 32. In response, the selection device 101 preferably sends a print request to the report generator 104, as shown by step 32-2 of FIG. 32. The report generator 104 queries the active database 103 for successive page description records that describe the pages of the printed proposal, as shown by step 32-3 of FIG. 32. The active database 103 typically processes the request by searching the TableOfContentsData object 130 located in the current proposal. If the proposal is to include one or more pages comprising the description and appraised value of a trade-in product, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 32-4 in FIG. 32. These PageDescriptionRecord 314 may include a field that contains an identifier that indicates which page layout may be used to format these particular trade-in pages 242. The report generator 104 queries the report database 106 for the applicable page layout, as shown by step 32-5 in FIG. 32. The report database 106 returns the relevant page layout to the report generator 104, as shown by step 32-6 in FIG. 32.

Each page layout may contain formatting specifications that indicate where specific information regarding the description and appraised value of the trade-in product may appear on the printed page. The report generator 104 may read each format specification to determine the data required at that location on the page.

If the format specifications require data relating to the description and appraised value of the trade-in product, the report generator 104 preferably queries the active database 103, as shown by step 32-7 in FIG. 32. The active database 103 queries the TradeData object 142, locates and retrieves the applicable description and appraised value information from the TradeData object 142, and returns this trade-in information to the report generator 104, as shown by step 32-8 in FIG. 32.

If the format specifications require static pictures or text segments, then the report generator 104 may retrieve the applicable information from the static database 105 object, as shown by step 32-9 in FIG. 32. The static database 105 may return this information to the report generator 104, as shown by step 32-10 in FIG. 32. The report generator 104 typically repeats this process for each format specification on the page layout, which builds a trade-in page 242 that may then be sent to the printer, as shown by step 32-11 in FIG. 32.

In this fashion, the report generator 104 may print one or more customized and individualized trade-in product pages 242 which comprise the description and appraised value of a trade-in product, along with the predetermined text segments and pictures that correspond with this specified trade-in product.

The trade-in page layout 120 may specify that the name, address and telephone number or other identification data of the customer appear on the trade-in pages. The customer information may be initially entered via the CustomerForm object 286. (See FIG. 20). The customer information may be stored in the CustomerData object 136 attached to the proposal.

The report generator 104 may read format specifications from the page layout via the report database 106, as shown by step 21-1 in FIG. 21. When the particular formatting specification in the page layout requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The trade-in page layout may specify that the name, address and telephone number of the salesperson appear on the trade-in pages. The salesperson information may be initially entered by the employer in the ListOfSalesPersonsData object 158 and may be stored in the individual salesperson's SalesPersonData object 134 attached to the proposal. (See FIG. 22). The report generator 104 may read format specifications from the page layout via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Product Price Quotation Pages

The user interface 102 provides means for presenting a series of predetermined queries related to the product price quotation for a product of interest to a potential customer. The user interface 102 also provides means for inputting individualized answers to the predetermined queries, the individualized answers relating to the product price quotation of a particular product configuration that is of particular interest to the individual customer who is to receive the proposal.

Figure 33:
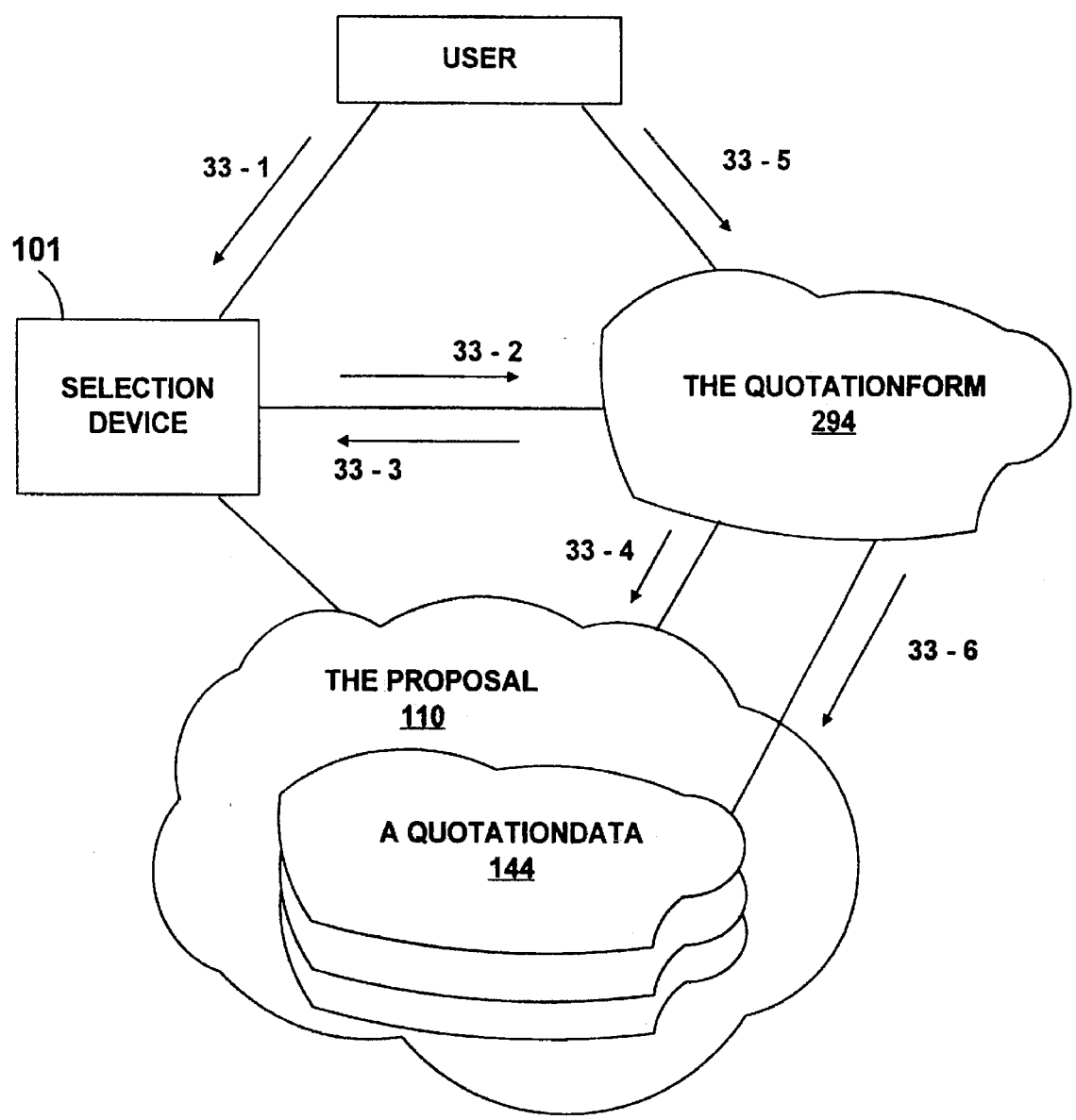
FIG. 33 is an object diagram illustrating a preferred flow of control involved when entering product price quotation information.

The user may select "Customer Information" 176 from the main menu 170 of the selection device 101, as shown by step 33-1 in FIG. 33. The user may further select "Quotation" from the "Customer Information" 176 menu. In response, the selection device 101 preferably sends a load message to the QuotationForm object 294, as shown by step 33-2 in FIG. 33. On receipt of the load message, the QuotationForm object 294 may display itself in a window within the main window of the selection device 101. Upon loading itself, the QuotationForm object 294 obtains a pointer to a proposal object 110, as shown by step 33-3 in FIG. 33. The QuotationForm object 294 then obtains a pointer from the proposal object 110 to a QuotationData object 144, as shown by step 33-4 in FIG. 33.

The QuotationForm object 294 presents a user interface 102 to the user typically comprising text entry fields and predetermined questions for the user, as shown by step 33-5 in FIG. 33. The user interface 102 provides means for inputting individualized answers to the predetermined queries, the individualized answers relating to the price quotation for a product configuration that is of particular interest to the individual customer who is to receive the proposal. The predetermined questions may allow the user to modify the price quotation for to a product configuration that is of particular interest to the customer who is to receive the proposal. The price quotation information gathered by the QuotationForm object 294 may then be stored in the QuotationData object 144 which is attached to the current proposal object 110, as shown by step 33-6 in FIG. 33. The user may wish to compare the product price quotations of different product configurations. This comparison may be accomplished by repeating the process described above and in FIG. 33 to create multiple QuotationData objects 144.

When the user begins a deal with a customer, the user may want to include in the proposal one or more individualized pages comprising the product price quotation which is of particular interest to the customer who is to receive the proposal. To include the product price quotation pages, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired price quotation pages from a list of pages that are available for inclusion in the printed proposal, as shown by step 18-5 of FIG. 18. The selected pages may be stored as PageDescriptionRecord 314 in a TableOfContentsData object 130, as shown by step 18-6 of FIG. 18. These PageDescriptionRecord 314 typically include a field that contains an identifier that indicates which page layout may be used to format each price quotation page. The page layout may determine the content and appearance of the final printed page. The page layout may be stored in the report database 106.

Figure 34:
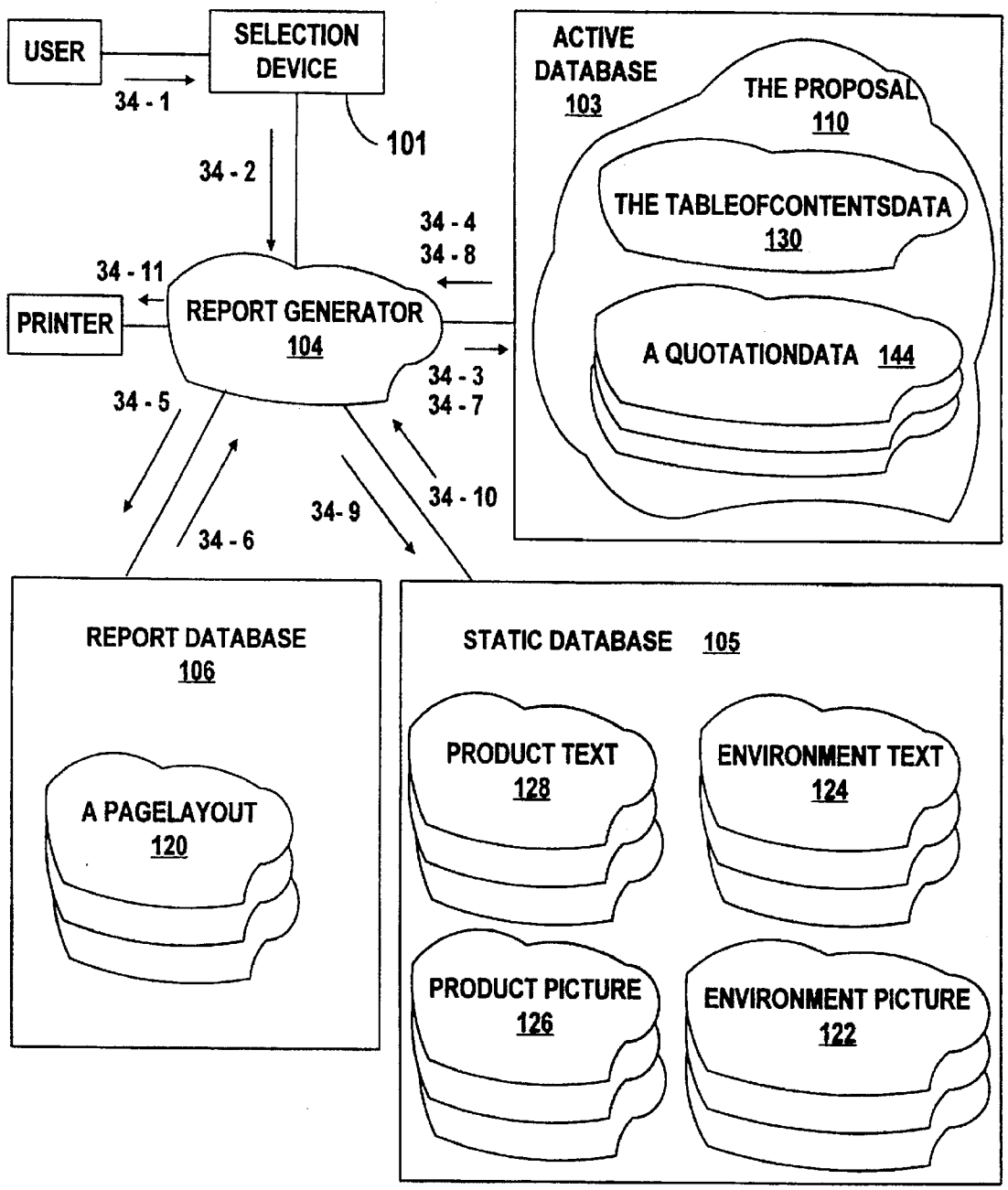
FIG. 34 is an object diagram illustrating a preferred flow of control involved when generating product price quotation pages.

To initiate the printing of the product price quotation pages, the user may select "Print" 178 from the main menu 170 of the selection device 101, as shown by step 34-1 of FIG. 34. In response, the selection device 101 preferably sends a print request to the report generator 104, as shown by step 34-2 of FIG. 34. The report generator 104 queries the active database 103 for successive page description records that describe the pages of the printed proposal, as shown by step 34-3 of FIG. 34. The active database 103 typically processes the request by searching the TableOfContentsData object 130 located in the current proposal. If the proposal is to include one or more product price quotation pages, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 34-4 in FIG. 34. These PageDescriptionRecord 314 may include a field that contains an identifier that indicates which page layout may be used to format these particular product price quotation pages. The report generator 104 queries the report database 106 for the applicable page layout, as shown by step 34-5 in FIG. 34. The report database 106 returns the relevant page layout to the report generator 104, as shown by step 34-6 in FIG. 34.

Each page layout preferably contains formatting specifications that indicate where specific product price quotation information may appear on the printed page. The report generator 104 may read each format specification to determine the data required at that location on the page.

If the format specifications require data relating to the product price quotation of interest to a customer, the report generator 104 queries the active database 103 for the product price quotation information, as shown by step 34-7 in FIG. 34. The active database 103 will preferably handle the process of calculating the desired product price quotation based on the product specification stored within itself and on additional price information stored in the static database 105 and linked to this product information 238. The active database 103 may return this information to the report generator 104, as shown by step 34-8 in FIG. 34.

If the format specifications require static pictures or text segments, then the report generator 104 preferably retrieves the applicable information from the static database 105 object, as shown by step 34-9 in FIG. 34. The static database 105 may return this information to the report generator 104, as shown by step 34-10 in FIG. 34. The report generator 104 typically repeats this process for each format specification on the page layout, which builds a product price quotation page that is then sent to the printer, as shown by step 34-11 in FIG. 34. In this fashion, the report generator 104 may print one or more customized and individualized product price quotation pages.

The product price quotation page layout may specify that the name, address and telephone number or other identification data of the customer appear on the product price quotation pages. The customer information was initially entered via the CustomerForm object 286. (See FIG. 20). The customer information may be stored in the CustomerData object 136 attached to the proposal.

The report generator 104 reads format specifications from the page layout via the report database 106, as shown by step :21-1 in FIG. 21. When the particular formatting specification in the page layout requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The product price quotation page layout may specify that the name, address and telephone number of the salesperson appear on the product price quotation pages. The salesperson information may be initially entered by the employer in the ListOfSalesPersonsData object 158 and is stored in the individual salesperson's SalesPersonData object 134 attached to the proposal. (See FIG. 22). The report generator 104 reads format specifications from the product price quotation page layout via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Finance Pages

When the user begins a deal with a customer, the user may want to include one or more individualized pages which comprise the financing information to be included in the customized, printed proposal that will be prepared for the customer.

The user interface 102 provides means for presenting a series of predetermined queries related to financing a product of interest to different potential customers who may purchase the product. The user interface 102 also provides means for inputting individualized answers to the predetermined queries, the individualized answers relating to the finance cost of product configurations that are of particular interest to the individual customer who is to receive the proposal.

Figure 35:
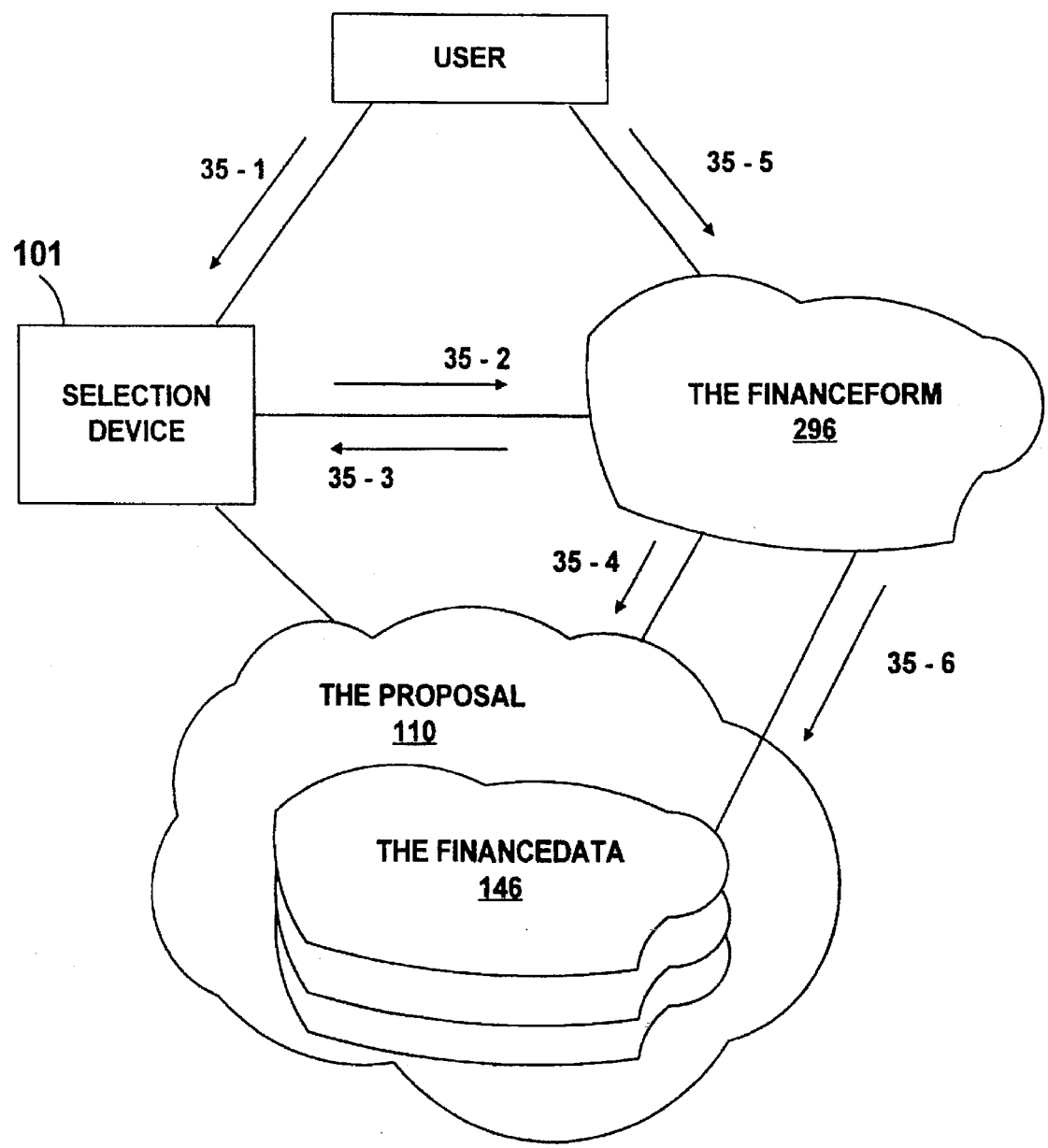
FIG. 35 is an object diagram illustrating a preferred flow of control involved when entering product financing information.

The user may select "Customer Information" 176 from the main menu 170 of the selection device 101, as shown by step 35-1 in FIG. 35. The user may further select "Payment Schedule & Terms" from the "Customer Information" 176 menu. In response, the selection device 101 preferably sends a load message to the FinanceForm object 296, as shown by step 35-2 in FIG. 35. Oft receipt of the load message, the FinanceForm object 296 may display itself in a window within the main window of the selection device 101. Upon loading itself, the FinanceForm object 296 obtains a pointer to a proposal object 110, as shown by step 35-3 in FIG. 35. The FinanceForm object 296 then obtains a pointer from the proposal object 110 to a FinanceData object 146, as shown by step 35-4 in FIG. 35.

The FinanceForm object 296 presents a user interface 102 to the user typically comprising text entry fields and predetermined questions for the user, as shown by step 35-5 in FIG. 35. This user interface 102 provides means for inputting individualized answers to the predetermined queries, the individualized answers relating to financing a product configuration that is of particular interest to the individual customer who is to receive the proposal. The predetermined questions allow the user to select one of a list of predetermined answers that correspond to the financing of a product configuration that is of particular interest to the customer who is to receive the proposal. The finance cost information gathered by the FinanceForm object 296 is then stored in the FinanceData object 146 which is attached to the current proposal object 110, as shown by step 35-6 in FIG. 35. The user may wish to compare the finance cost of different finance plans. This comparison may be accomplished by repeating the process described above and in FIG. 35 to create multiple FinanceData objects 146.

The user may decide to generate a customized, printed proposal that includes one or more pages comprising the financing information. To include these finance pages, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired finance pages from a list of pages that are available for inclusion in the printed proposal, as shown by step 18-5 of FIG. 18. The selected pages may be stored as PageDescriptionRecord 314 in a TableOfContentsData object 130, as shown by step 18-6 of FIG. 18. These PageDescriptionRecord 314 include a field that contains an identifier that indicates which page layout may be used to format each finance page. The page layout may determine the content and appearance of the final printed page. The page layout may be stored in the report database 106.

Figure 36:
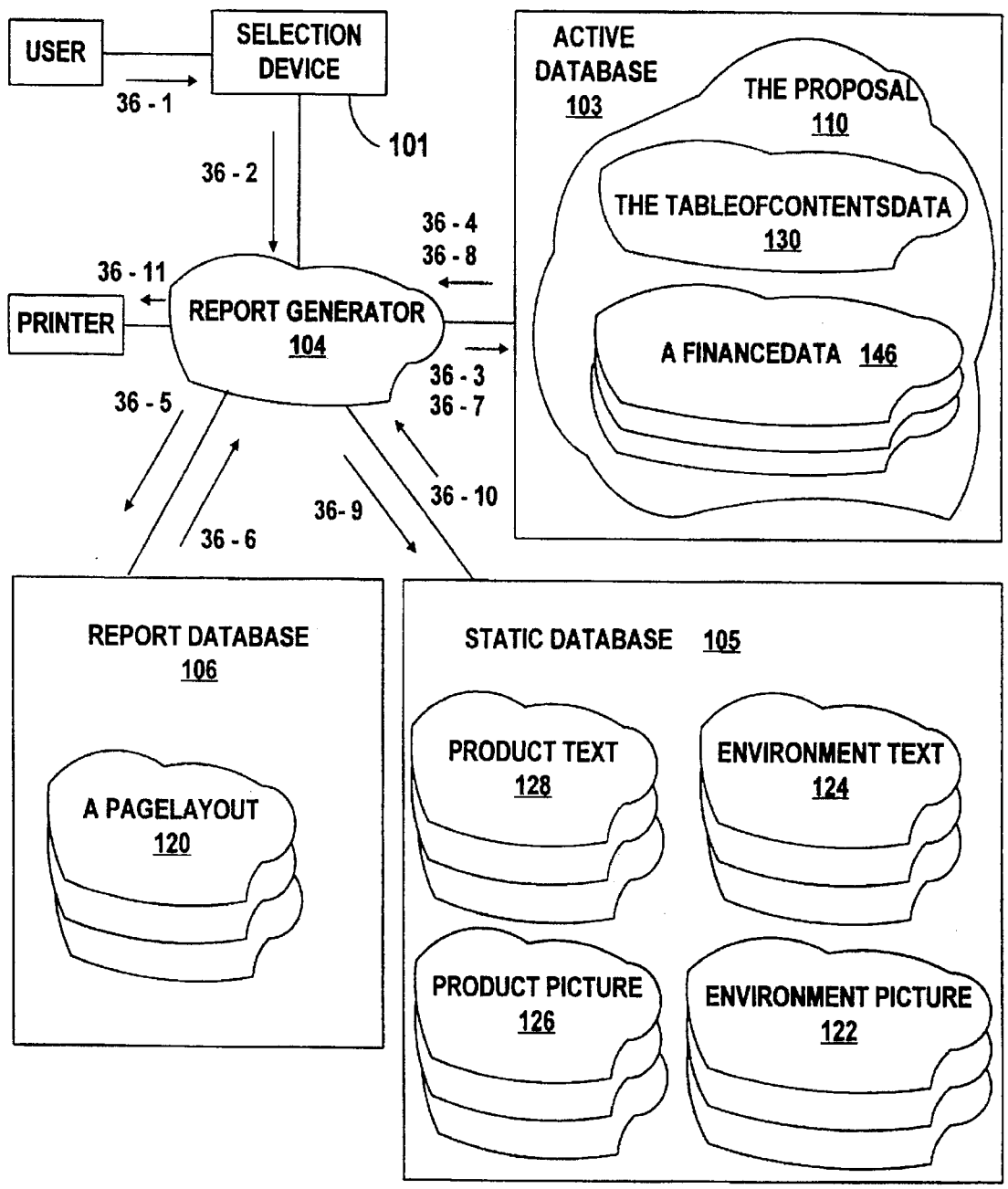
FIG. 36 is an object diagram illustrating a preferred flow of control involved when entering product financing pages.

To initiate the printing of the Finance pages, the user may select "Print" 178 from the main menu 170 of the selection device 101, as shown by step 36-1 of FIG. 36. In response, the selection device 101 preferably sends a print request to the report generator 104, as shown by step 36-2 of FIG. 36. The report generator 104 queries the active database 103 for successive page description records that describe the pages of the printed proposal, as shown by step 36-3 of FIG. 36. The active database 103 typically processes the request by searching the TableOfContentsData object 130 located in the current proposal. If the proposal is to include one or more pages comprising the financing information of a product configuration, the active database 103 may query the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 36-4 in FIG. 36. These PageDescriptionRecord 314 may include a field that contains an identifier that indicates which page layout may be used to format these particular finance pages. The report generator 104 queries the report database 106 for the applicable page layouts 120, as shown by step 36-5 in FIG. 36. The report database 106 returns the relevant page layouts 120 to the report generator 104, as shown by step 36-6 in FIG. 36.

Each page layout preferably contains formatting specifications that indicate where specific finance information may appear on the printed page. The report generator 104 reads each format specification to determine the data required at that location on the page.

If the format specifications require data relating to the financing of a product configuration, the report generator 104 queries the active database 103, as shown by step 36-7 in FIG. 36. The active database 103 queries the FinanceData object 146, locates and retrieves the applicable financing information from the FinanceData object 146, and returns this financing information to the report generator 104, as shown by step 36-8 in FIG. 36.

If the format specifications require static pictures or text segments, then the report generator 104 preferably retrieves the applicable information from the static database 105 object, as shown by step 36-9 in FIG. 36. The static database 105 will typically return this information to the report generator 104, as shown by step 36-10 in FIG. 36. The report generator 104 preferably repeats this process for each format specification on the page layout, which builds a finance page that is then sent to the printer, as shown by step 36-11 in FIG. 36.

In this fashion, the report generator 104 may print one or more customized and individualized finance pages, along with the predetermined text segments and pictures that correspond with the financing information related to a particular product configuration.

The finance page layouts 120 may specify that the name, address and telephone number or other identification data of the customer appear on the finance pages. The customer information may be initially entered via the CustomerForm object 286. (See FIG. 20). The customer information may be stored in the CustomerData object 136 attached to the proposal.

The report generator 104 reads format specifications from the page layout via the report database 106, as shown by step 21-1 in FIG. 21. When the particular formatting specification in the page layout requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The finance page layouts 120 may specify that the name, address and telephone number of the salesperson appear on the finance pages. The salesperson information may be initially entered by the employer in the ListOfSalesPersonsData object 158 and may be stored in the individual salesperson's SalesPersonData object 134 attached to the proposal. (See FIG. 22). The report generator 104 reads format specifications from the page layout via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Life cycle Pages

When the user begins a deal with a customer, the user may want to include one or more individualized Economics pages 248 which comprise the life cycle cost information to be included in the customized, printed proposal that will be prepared for the customer.

The user interface 102 provides means for presenting a series of predetermined queries related to the life cycle cost of product configurations that are of interest to different potential customers who may purchase the product. The user interface 102 also provides means for inputting individualized answers to the predetermined queries, the individualized answers relating to the life cycle cost of product configurations that are of particular interest to the individual customer who is to receive the proposal.

Figure 37:
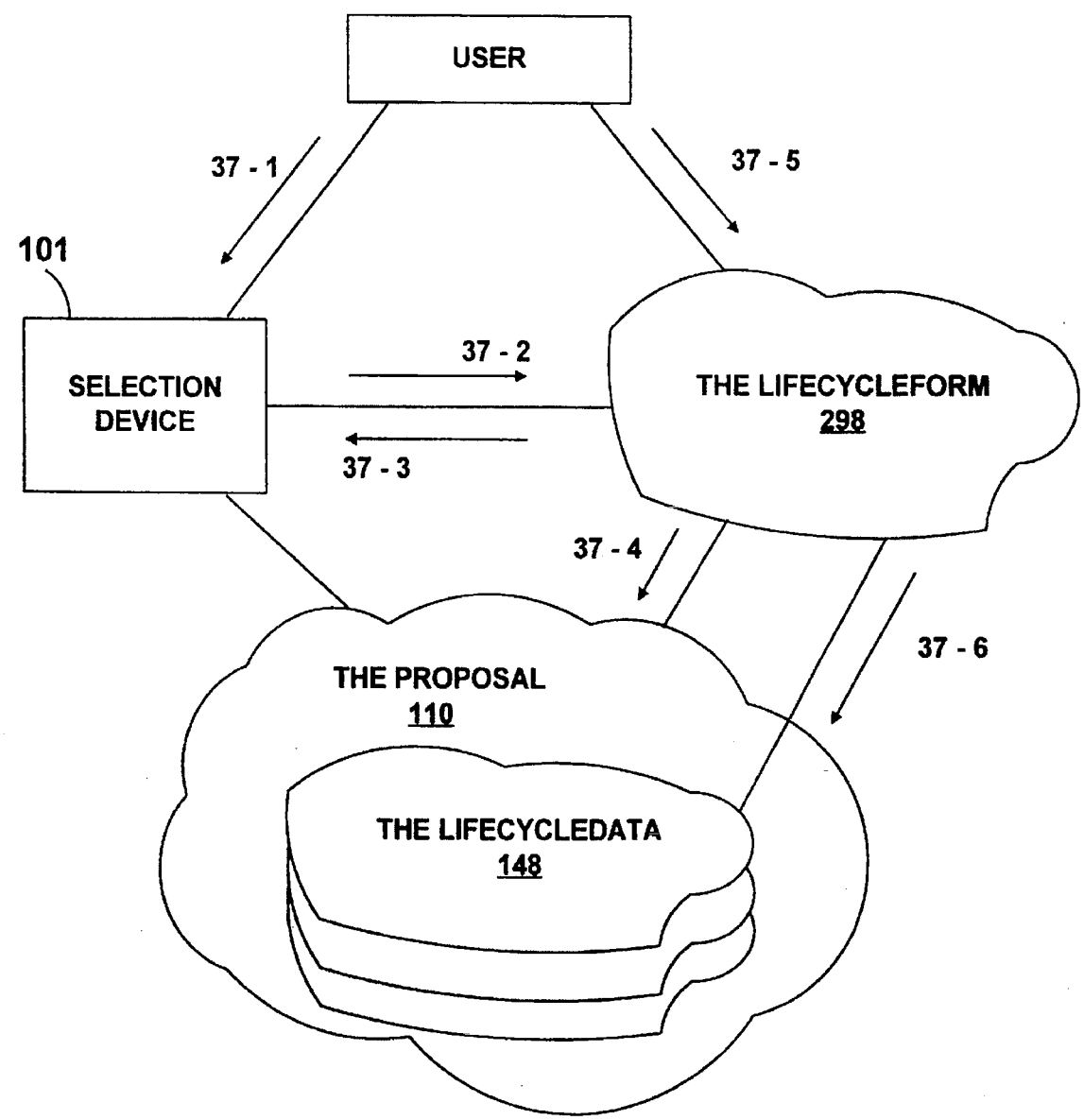
FIG. 37 is an object diagram illustrating a preferred flow of control involved when entering life cycle cost information.

The user may select "Customer Information" 176 from the main menu 170 of the selection device 101, as shown by step 37-1 in FIG. 37. The user may further select "Economics" 212 from the "Customer Information" 176 menu. In response, the selection device 101 preferably sends a load message to the LifeCycleForm object 298, as shown by step 37-2 in FIG. 37. On receipt of the load message, the LifeCycleForm object 298 may display itself in a window within the main window of the selection device 101. Upon loading itself, the LifeCycleForm object 298 obtains a pointer to a proposal object 110, as shown by step 37-3 in FIG. 37. The LifeCycleForm object 298 then obtains a pointer from the proposal object 110 to a LifeCycleData object 148, as shown by step 37-4 in FIG. 37.

The LifeCycleForm object 298 presents a user interface 102 to the user typically comprising text entry fields and predetermined questions for the user, as shown by step 37-5 in FIG. 37. This user interface 102 provides means for inputting individualized answers to the predetermined queries, the individualized answers relating to the life cycle cost of a product configuration that is of particular interest to the individual customer who is to receive the proposal. The predetermined questions allow the user to select one of a list of predetermined answers that correspond to the life cycle cost relating to a product configuration that is of particular interest to the customer who is to receive the proposal. The life cycle cost information gathered by the LifeCycleForm object 298 is then stored in the LifeCycleData object 148 which is attached to the current proposal object 110, as shown by step 37-6 in FIG. 37. The user may wish to compare the life cycle costs of different product configurations. This comparison may be accomplished by repeating the process described above and in FIG. 37 to create multiple LifeCycleData objects 148.

The user may decide to generate a customized, printed proposal that includes one or more Economics pages 248 comprising the life cycle cost. To include these life cycle Economics pages 248, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user then selects the desired life cycle pages, Economics 248, from a list of pages that are available for inclusion in the printed proposal, as shown by step 18-5 of FIG. 18. The selected pages may be stored as PageDescriptionRecord 314 in a TableOfContentsData object 130, as shown by step 18-6 of FIG. 18. These PageDescriptionRecord 314 typically include a field that contains an identifier that indicates which page layout may be used to format each Economics 248 page. The page layout may determine the content and appearance of the final printed page. The page layouts 120 may be stored in the report database 106.

Figure 38:
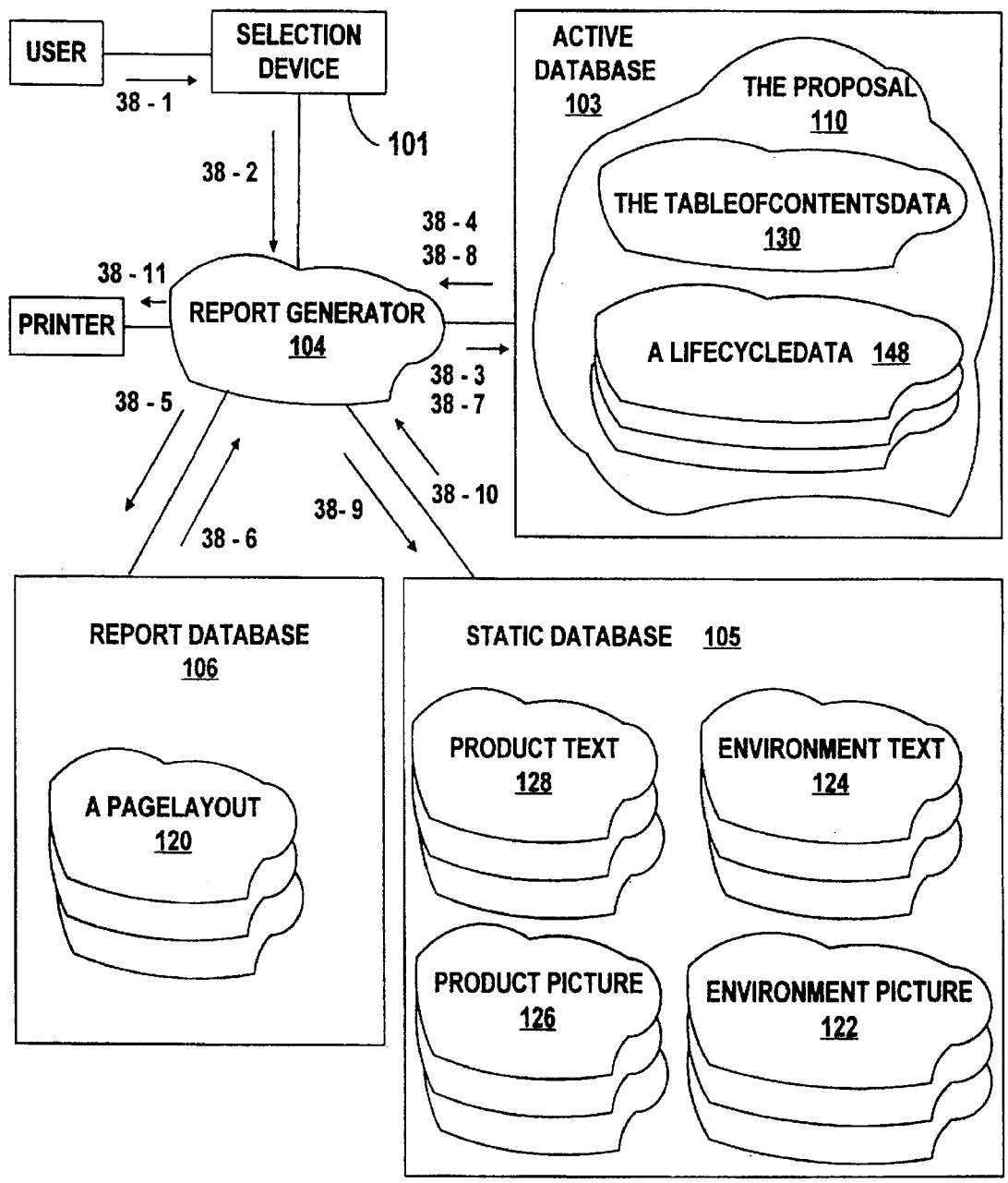
FIG. 38 is an object diagram illustrating a preferred flow of control involved when generating life cycle cost pages.

To initiate the printing of the life cycle economics pages 248, the user may select "Print" 178 from the main menu 170 of the selection device 101, as shown by step 38-1 of FIG. 38. In response, the selection device 101 preferably sends a print request to the report generator 104, as shown by step 38-2 of FIG. 38. The report generator 104 queries the active database 103 for successive page description records that describe the pages of the printed proposal, as shown by step 38-3 of FIG. 38. The active database 103 typically processes the request by searching the TableOfContentsData object 130 located in the current proposal. If the proposal is to include one or more pages comprising the life cycle cost of a product configuration, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 38-4 in FIG. 38. These PageDescriptionRecord 314 may include a field that contains an identifier that indicates which page layouts 120 may be used to format these particular life cycle pages. The report generator 104 queries the report database 106 for the applicable page layouts 120, as shown by step 38-5 in FIG. 38. The report database 106 returns the relevant page layouts 120 to the report generator 104, as shown by step 38-6 in FIG. 38.

Each page layout preferably contains formatting specifications that indicate where specific life cycle information may appear on the printed page. The report generator 104 may read each format specification to determine the data required at that location on the page.

If the format specifications require data relating to the life cycle of a product configuration, the report generator 104 preferably queries the active database 103, as shown by step 38-7 in FIG. 38. The active database 103 queries the LifeCycleData object 148, locates and retrieves the applicable life cycle information from the LifeCycleData object 148, and returns this life cycle information to the report generator 104, as shown by step 38-8 in FIG. 38.

If the format specifications require static pictures or text segments, then the report generator 104 preferably retrieves the applicable information from the static database 105 object, as shown by step 38-9 in FIG. 38. The static database 105 may return this information to the report generator 104, as shown by step 38-10 in FIG. 38. The report generator 104 typically repeats this process for each format specification on the page layout, which builds a life cycle page that is then sent to the printer, as shown by step 38-11 in FIG. 38.

In this fashion, the report generator 104 may print one or more customized and individualized life cycle pages, along with the predetermined text segments and pictures that correspond with this specified life cycle cost of a product configuration.

The life cycle page layouts 120 may specify that the name, address and telephone number or other identification data of the customer appear on the life cycle pages. The customer information may be initially entered via the CustomerForm object 286. (See FIG. 20). The customer information may be stored in the CustomerData object 136 attached to the proposal.

The report generator 104 reads format specifications from the page layouts 120 via the report database 106, as shown by step 21-1 in FIG. 21. When the particular formatting specification in the page layout requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 110. The active database 103 then returns this information to the report generator 104, as shown by step 21-3 in FIG. 21. The report generator 104 typically builds the page using this information and sends it to the printer, as shown by step 21-4 in FIG. 21.

The life cycle page layouts 120 may specify that the name, address and telephone number of the salesperson appear on the life cycle pages. The salesperson information may be initially entered by the employer in the ListOfSalesPersonsData object 158 and may be stored in the individual salesperson's SalesPersonData object 134 attached to the proposal. (See FIG. 22). The report generator 104 reads format specifications from the page layout via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Table of Contents Page

When the user begins a deal with a customer, the user may want to include in the proposal a Table of Contents 252 page as part of the proposal. To include the Table of Contents 252 page, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the "Table of Contents" page from a list of pages that are available for inclusion in the printed proposal, as shown by step 18-5 of FIG. 18. The selected page may be stored as a PageDescriptionRecord 314 in a TableOfContentsData object 130, as shown by step 18-6 of FIG. 18. In other words, the PageDescription record for the "Table Of Contents" page is stored in the TableOfContentsData object 130, as it is one of the pages to be printed in the proposal. These PageDescriptionRecord 314 typically include a field that contains an identifier that indicates which page layout may be used to format each price quotation page. The page layout may determine the content and appearance of the final printed page. The page layout may be stored in the report database 106.

Figure 39:
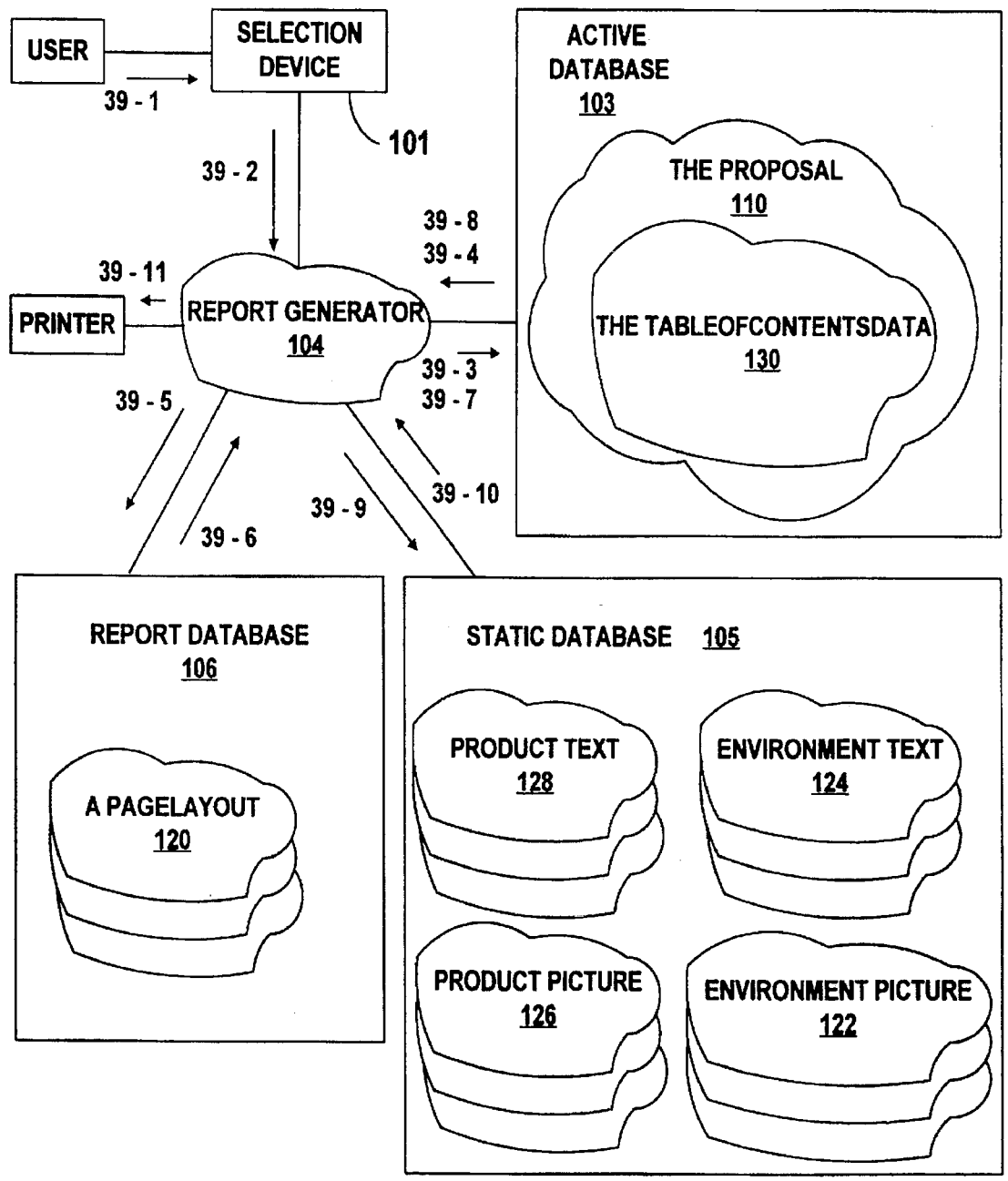
FIG. 39 is an object diagram illustrating a preferred flow of control involved when generating a table of contents page.
Figure 40:
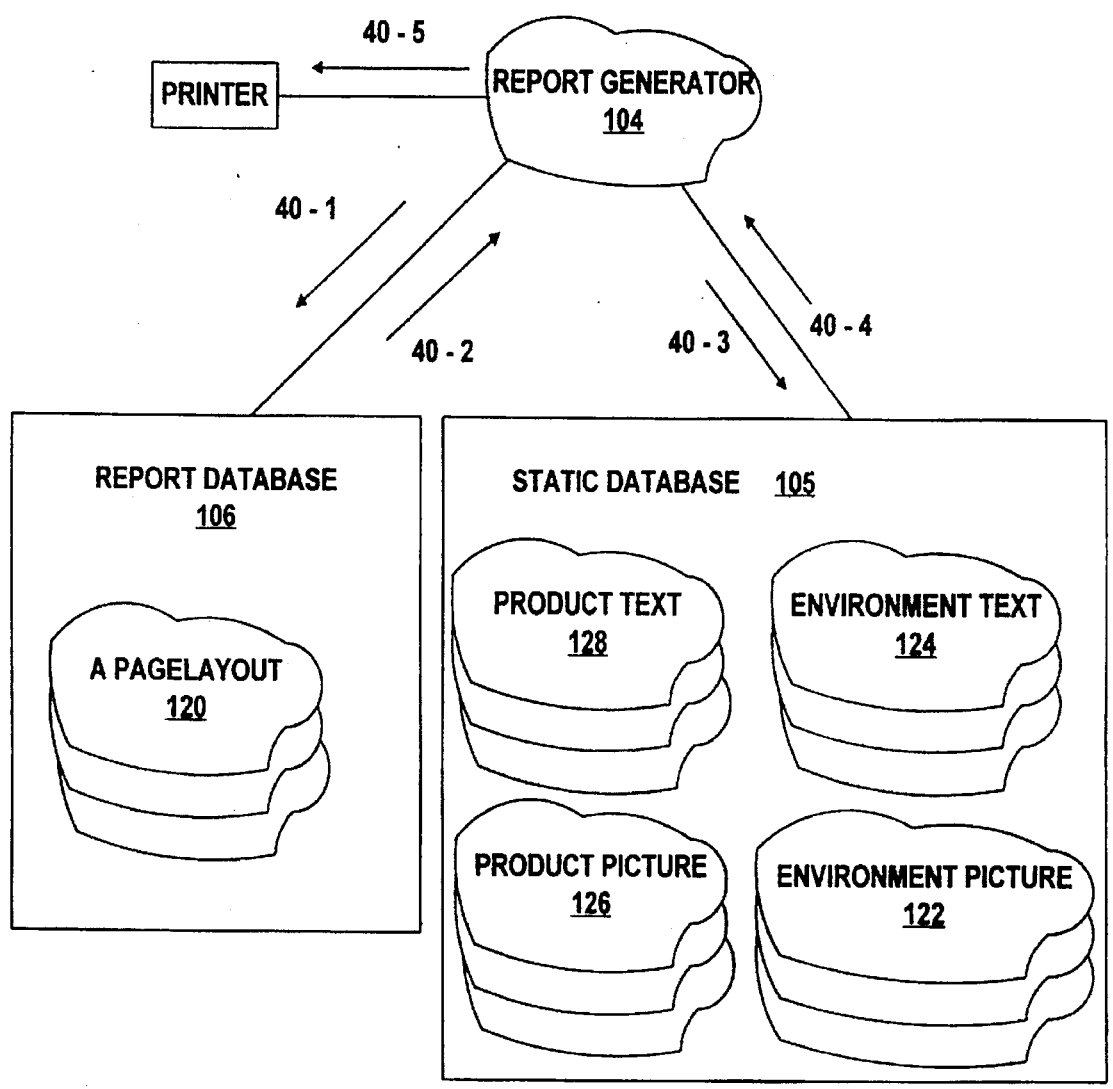
FIG. 40 is an object diagram illustrating a preferred flow of control involved when printing a trademark.

To initiate the printing of the Table of Contents 252 page, the user may select "Print" 178 from the main menu 170 of the selection device 101, as shown by step 39-1 of FIG. 39. In response, the selection device 101 preferably sends a print request to the report generator 104, as shown by step 39-2 of FIG. 39. The report generator 104 queries the active database 103 for successive page description records that describe the pages of the printed proposal, as shown by step 39-3 of FIG. 39. The active database 103 processes the request by searching the TableOfContentsData object 130 located in the current proposal. If the proposal is to include a Table of Contents 252 page, the active database 103 queries the TableOfContentsData object 130 for the applicable PageDescriptionRecord 314. The TableOfContentsData object 130 returns the relevant PageDescriptionRecord 314 to the active database 103. The active database 103 then sends the relevant PageDescriptionRecord 314 to the report generator 104, as shown by step 39-4 in FIG. 39. These PageDescriptionRecord 314 may include a field that contains an identifier that indicates which page layout may be used to format the Table of Contents 252 page. The report generator 104 queries the report database 106 for the applicable page layouts 120, as shown by step 39-5 in FIG. 39. The report database 106 returns the relevant page layouts 120 to the report generator 104, as shown by step 39-6 in FIG. 39.

Each page layout preferably contains formatting specifications that indicate where specific Table of Contents 252 information may appear on the printed page. The report generator 104 reads each format specification to determine the data required at that location on the page.

If the format specifications require data relating to the Table of Contents 196 of the proposal, the report generator 104 queries the active database 103 for the Table of Contents 196 information, as shown by step 39-7 in FIG. 39. The active database 103 preferably retrieves the Table of Contents 196 information from the TableOfContentsData object 130 and return this information to the report generator 104, as shown by step 39-8 in FIG. 39.

If the format specifications require static pictures or text segments, then the report generator 104 preferably retrieves the applicable information from the static database 105 object, as shown by step 39-9 in FIG. 39. The static database 105 may return this information to the report generator 104, as shown by step 39-10 in FIG. 39. The report generator 104 typically repeats this process for each format specification on the page layout 120, which builds a Table of Contents 252 page that is then sent to the printer, as shown by step 39-11 in FIG. 39. In this fashion, the report generator 104 may print one or more customized and individualized Table of Contents 252 pages.

The Table of Contents 252 page layouts 120 may specify that the name, address and telephone number or other identification data of the customer appear on the Table of Contents 252 pages. The customer information may be initially entered via the CustomerForm object 286. (See FIG. 20). The customer information may be stored in the CustomerData object 136 attached to the proposal.

The report generator 104 reads format specifications from the page layout 120 via the report database 106, as shown by step 21-1 in FIG. 21. When the particular formatting specification in the page layout 120 requires the customer's name, address, or telephone number or other identification data to be included on a printed page, the report generator 104 preferably sends a request to the active database 103 for the specified customer information, as shown by step 21-2 in FIG. 21. The active database 103 obtains the specified customer information from the CustomerData object 136 stored within the current proposal object 116. The active database 103 then returns this information to the report generator 104, as shown by step 21-3 in FIG. 21. The report generator 104 typically builds the page using this information and sends it to the printer, as shown by step 21-4 in FIG. 21.

The Table of Contents 252 page layouts may specify that the name, address and telephone number of the salesperson appear on the Table of Contents 252 pages. The salesperson information may be initially entered by the employer in the ListOfSalesPersonsData object 158 and stored in the individual salesperson's SalesPersonData object 134 attached to the proposal. (See FIG. 22). The report generator 104 reads format specifications from the Table of Contents 252 page layout 120 via the report database 106, as shown by step 23-1 in FIG. 23. When the particular format specifiers require the salesperson's name, address and telephone number to be included on a page format, the report generator 104 preferably sends a request to the active database 103 for the specified salesperson information, as shown by step 23-2 in FIG. 23. The active database 103 obtains this salesperson information from the SalesPersonData object 134 in the proposal and returns this salesperson information to the report generator 104, as shown by step 23-3 in FIG. 23. The report generator 104 typically builds the page using this salesperson information and sends the page to the printer, as shown by step 23-4 in FIG. 23.

Proposal: Trademark

The system may also print a trademark identifying the product on at least one of the pages of the customized printed proposal. If a trademark is to appear on a page, the page layout 120 for that page will preferably contain a format specification that specifies the trademark and its location on the page. The report generator 104 queries the report database 106 for each page layout 120, as shown by step 40-1 in FIG. 40. The report database 106 returns each page layout 120, as shown by step 40-2 in FIG. 40. If the page layout 120 contains a format specification requiring a trademark picture, then the report generator 104 may retrieve the trademark picture from the static database 105 object, as shown by step 40-3 in FIG. 40. The static database 105 may return this picture to the report generator 104, as shown by step 40-4 in FIG. 40. The report generator 104 may include the trademark picture when it builds the page to be printed. The report generator 104 typically builds the page using this information and sends it to the printer, as shown by step 40-5 in FIG. 40.

Proposal: Printing Language

The user interface 102 provides means for presenting a series of predetermined queries related to the language in which the user interface 102 should be presented. In addition, the user interface 102 provides means for presenting a series of predetermined queries related to the language in which the proposal should be printed. The user interface 102 is also a means for inputting individualized answers to the predetermined queries, the individualized answers relating to the language of choice for the user interface 102 presentation and for the printed proposal.

Figure 41:
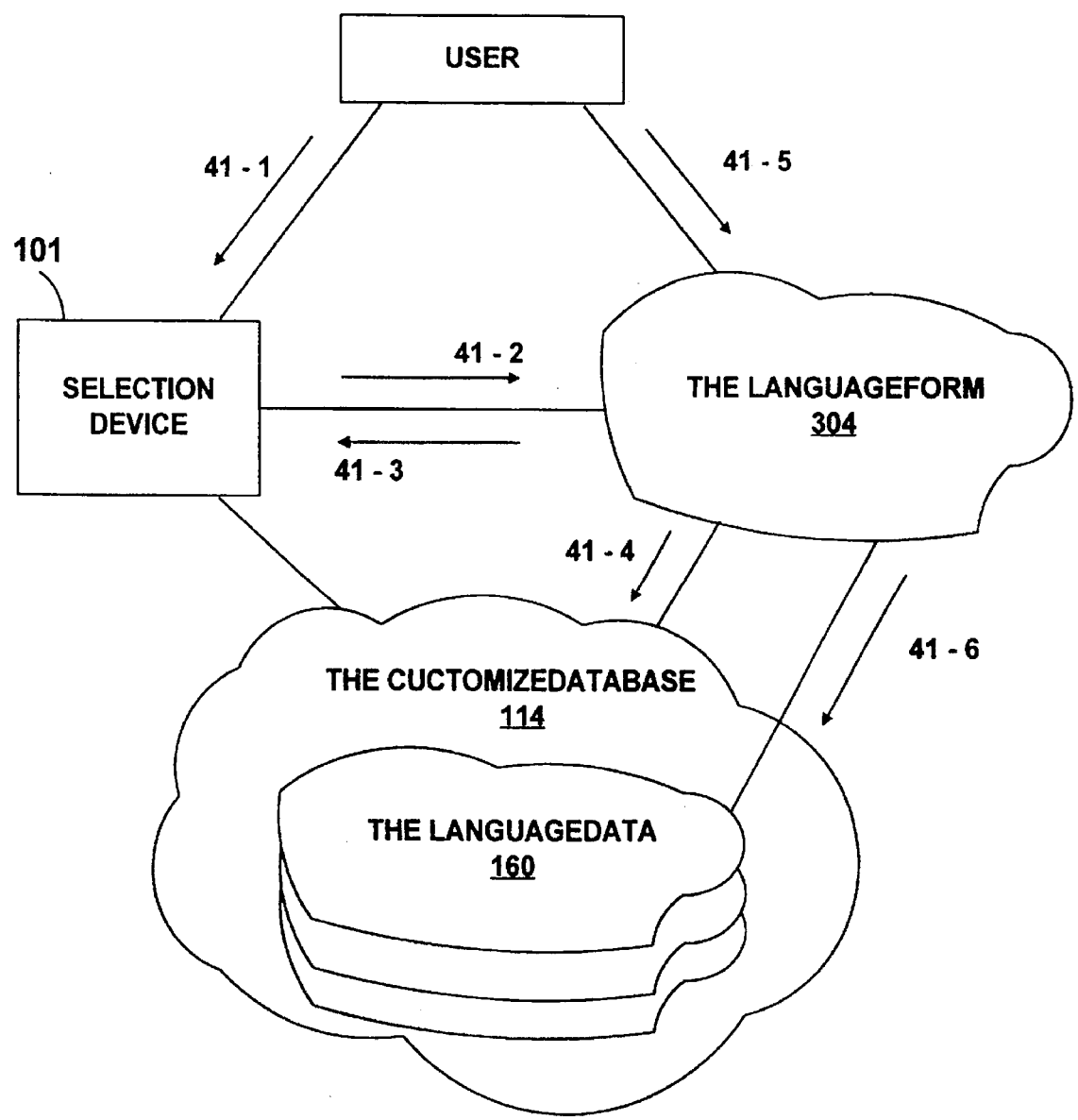
FIG. 41 is an object diagram illustrating a preferred flow of control involved when choosing a language.

The user may select customized menu selection 177 from the main menu 170 of the selection device 101, as shown by step 41-1 in FIG. 41. The user may further select "International" from the customized menu selection 177. In response, the selection device 101 preferably sends a load message to the LanguageForm object 304, as shown by step 41-2 in FIG. 41. On receipt of the load message, the LanguageForm object 304 may display itself in a window within the main window of the selection device 101. Upon loading itself, the LanguageForm object 304 obtains a pointer to a customized database 114, as shown by step 41-3 in FIG. 41. The LanguageForm object 304 then obtains a pointer from the customized database 114 to a LanguageData object 160, as shown by step 41-4 in FIG. 41.

The LanguageForm object 304 presents a user interface 102 to the user typically comprising text entry fields and predetermined questions for the user, as shown by step 41-5 in FIG. 41. This user interface 102 provides means for inputting individualized answers to the predetermined queries, the individualized answers relating to the language for presenting the user interface 102 and the language for printing the proposal. The language information gathered by the LanguageForm object 304 may then be stored in the LanguageData object 160 which is attached to the customized database 114, as shown by step 41-6 in FIG. 41.

The user interface 102 may further comprise means for displaying forms in any one of a plurality of languages. Upon receiving a load message, a form may query the LanguageData object 160 in the customized database 114 in the active database 103 to determine the language in which it should display itself. The form may then display itself in the specified language.

The system may also generate the printed proposal in any one of a plurality of languages. Upon receiving a print message, the report generator 104 may query the LanguageData object 160 in the customized database 114 in the active database 103 to determine the language in which it should print the proposal. The report generator 104 will then preferably query the static database 105 for pictures and text that are in the appropriate language. The report generator 104 typically builds each page using pictures and text in the specified language and sends it to the printer.

Proposal: Signature Page

The user may decide to generate a customized, printed proposal that includes a Signature page as part of the proposal. To include this Signature page, the user may select "Contents" 174 from the main menu 170 of the selection device 101, as shown by step 18-1 of FIG. 18. In response, the selection device 101 preferably sends a load message to the TableOfContentsForm object 284, as shown by step 18-2 of FIG. 18. On receipt of the load message, the TableOfContentsForm object 284 may display itself within the main window of the selection device 101. Upon loading itself, the TableOfContentsForm object 284 obtains a pointer to the proposal object 110, as shown by step 18-3 of FIG. 18. The TableOfContentsForm object 284 then obtains a pointer from the proposal object 110 to the TableOfContentsData object 130, as shown by step 18-4 of FIG. 18. The user may then select the desired Signature page from a list of pages that are available for inclusion in the printed proposal, as shown by step 18-5 of FIG. 18. The selected page may be stored as a PageDescription record in TableOfContentsData object 130, as shown by step 18-6 of FIG. 18. This PageDescription record preferably includes a field that contains an identifier that indicates which page layout 120 may be used to format the Signature page. The page layout 120 may determine the content and appearance of the final printed page. The page layouts 120 may be stored in the StaticData object, accessible through the report database 106.

Figure 42:
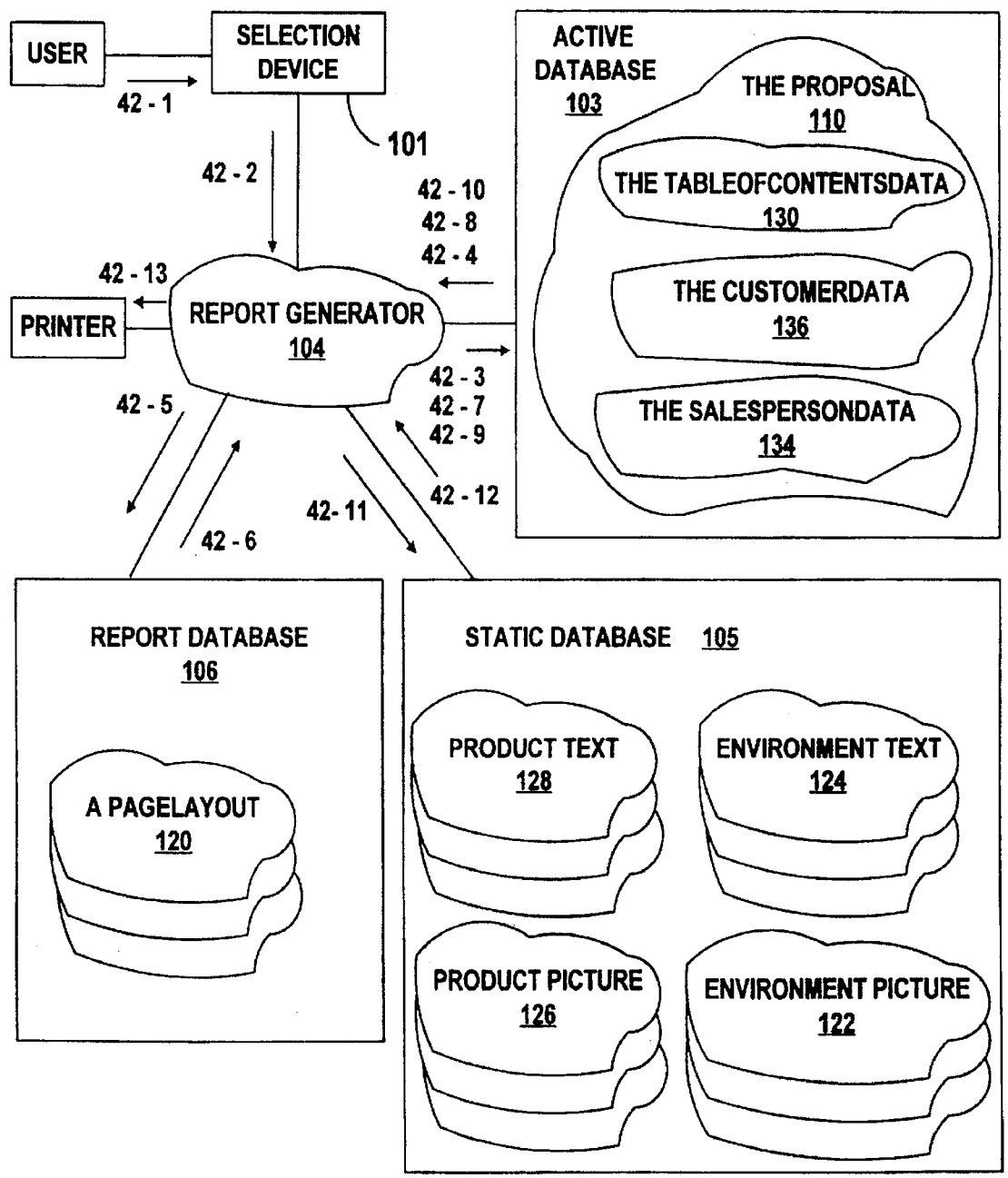
FIG. 42 is an object diagram illustrating a preferred flow of control involved when generating a signature page.

To initiate the printing of the Signature page, the user may select "Print" 178 from the main menu 170 of the selection device 101, as shown by step 42-1 of FIG. 42. In response, the selection device 101 preferably sends a print request to the report generator 104, as shown by step 42-2 of FIG. 42. The report generator 104 queries the active database 103 for successive page description records that describe the pages of the printed proposal, as shown by step 42-3 of FIG. 42. The active database 103 processes the request by searching the TableOfContentsData object 130 located in the current proposal.

If the proposal is to include a Signature page, the active database 103 queries the TableOfContentsData object 130 for the applicable PageDescription record. The TableOfContentsData object 130 returns the relevant PageDescription record to the active database 103. The active database 103 then sends the relevant PageDescription record to the report generator 104, as shown by step 42-4 in FIG. 42.

This PageDescription record may include a field that contains an identifier that indicates which page layout 120 may be used to format this particular Signature page. The report generator 104 queries the report database 106 for the applicable page layout 120, as shown by step 42-5 in FIG. 42. The report database 106 returns the relevant page layout 120 to the report generator 104, as shown by step 42-6 in FIG. 42.

The page layout 120 preferably contains formatting specifications that indicate where specific information may appear on the printed page. The report generator 104 reads each format specification to determine the data required at that location on the page. The report generator 104 typically repeats this process for each format specification in the page layout 120.

The Signature page layout 120 may specify that the customers name, address, telephone number or other identification data is to appear on the Signature page. If the format specification in the page layout 120 requires the customer's name, address, telephone number or other identification data, the report generator 104 sends a request to the active database 103 for the specified customer information, as shown by step 42-7 in FIG. 42. The active database 103 obtains the specified customer information from the CustomerData object 136 stored within the current proposal object 110. The active database 103 then returns this information to the report generator 104, as shown by step 42-8 in FIG. 42.

The Signature page layout 120 may specify that the name, address and telephone number or other identification data of the salesperson is to appear on the Signature page. If the format specification specifies the salesperson's name, address and telephone number, or other identification data, the report generator 104 sends a request to the active database 103 for the specified salesperson information, as shown by step 42-9 in FIG. 42. The active database 103 obtains this salesperson information from the SalesPersonData object 134 in the proposal and returns this salesperson information to the report generator 104, as shown by step 42-10 in FIG. 42.

If the format specifications require static pictures or text segments, then the report generator 104 preferably requests the applicable information from the static database 105, as shown by step 42-11 in FIG. 42. The static database 105 returns the requested information to the report generator 104, as shown in step 42-12 in FIG. 42. The report generator 104 repeats this process for each format specification on the page layout 120, which builds a signature page that is then sent to the printer, as shown by step 42-13 in FIG. 42.

In this fashion, the report generator 104 may print a customized and individualized signature page, along with any predetermined text segments and pictures that may relate to the product configuration that is of particular interest to the customer who is to receive the proposal.

While the present invention has been described in connection with the preferred embodiment thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. A computer-based system for generating a customized proposal for selling computer equipment to particular customers, the system comprising:
  a) input means for receiving information identifying a customer's desired features and uses of the computer equipment, the input means including
    i) means for presenting the customer with a plurality of questions relating to features and uses of the computer equipment, and
    ii) means for receiving a plurality of answers to the questions, the answers specifying the customer's desired computer equipment features and uses;
  b) receive means for electronically receiving computer equipment pictures, computer equipment environment pictures, and text segments;
  c) processing means for gathering computer equipment information for use in generating the customized proposal, the processing means including
    i) means for electronically selecting a particular computer equipment picture in response to at least one of the answers,
    ii) means for electronically selecting a particular computer equipment environment picture in response to at least one of the answers, and
    iii) means for electronically selecting a particular text segment in response to at least one of the answers; and
  d) output means, coupled to the receive means and the processing means, for receiving the gathered computer equipment information and for compiling the gathered computer equipment information into the customized proposal.

2. The system of claim 1 wherein:
  (a) the receive means further comprises environment text database means for receiving a plurality of predetermined environment text segments related to distinctive environments in which the computer equipment may be used, the plurality of predetermined environment text segments being of varying interest to different potential customers who may purchase the computer equipment; and (b) the processing means further comprises means for electronically associating at least one of the answers with one of the environment text segments.

3. The system of claim 1 wherein:
   (a) the input means further comprises means for receiving a name and address of the customer who is to receive the proposal; and
   (b) the processing means further comprises means for generating the customized proposal with a cover sheet comprising the name and address of the customer who is to receive the proposal.

4. The system of claim 1 wherein the processing means further comprises means for generating the customized proposal with a cover sheet comprising predetermined pictures and text related to at least one of the features and uses which are of particular interest to the customer who is to receive the proposal.

5. The system of claim 1 wherein:
   (a) the input means further comprises means for receiving customer identification data of the customer who is to receive the proposal; and
   (b) the processing means further comprises means for generating the customized proposal with a personalized letter to the customer who is to receive the proposal so that the personalized letter comprises the customer identification data of the customer who is to receive the proposal and so that the personalized letter further comprises portions of predetermined standard text related to at least one of the individualized features and uses which are of particular interest to the customer who is to receive the proposal.

6. The system of claim 1 wherein the processing means further comprises means for generating the customized proposal with one or more individualized computer equipment description pages each comprising predetermined pictures and text related to at least one of the individualized features and uses which are of particular interest to the customer who is to receive the proposal.

7. The system of claim 6 wherein:
   (a) the input means further comprises means for receiving customer identification data of the customer who is to receive the proposal; and
   (b) the processing means further comprises means for generating the customized proposal with one or more individualized pages so that each individualized page comprises the customer identification data of the customer who is to receive the proposal.

8. The system of claim 6 wherein:
   (a) the input means further comprises means for receiving salesperson identification data of a salesperson who is dealing with the customer; and
   (b) the processing means further comprises means for generating the customized proposal with one or more individualized pages so that each individualized page comprises the salesperson identification data of the salesperson who is dealing with the customer.

9. The system of claim 1 wherein:
   (a) the receive means comprises means for receiving a plurality of computer equipment specifications related to producing the computer equipment in a variety of configurations which are of varying interest to different potential customers who may purchase the computer equipment; and
   (b) the processing means comprises:
      (i) means for electronically associating at least one of the answers with one of the computer equipment specifications which is of particular interest to the customer who is to receive the proposal; and
      (ii) means for generating the customized proposal with one or more individualized pages comprising the computer equipment specification which is of particular interest to the customer who is to receive the proposal.

10. The system of claim 9 wherein:
    (a) the input means further comprises means for receiving customer identification data of the customer who is to receive the proposal; and
    (b) the processing means further comprises means for generating the customized proposal so that each individualized page which comprises the computer equipment specification which is of particular interest to the customer who is to receive the proposal also comprises the customer identification data of the customer who is to receive the proposal.

11. The system of claim 9 wherein:
    (a) the input means further comprises means for receiving salesperson identification data of a salesperson who is dealing with the customer; and
    (b) the processing means further comprises means for generating the customized proposal so that each individualized page which comprises the computer equipment specification which is of particular interest to the customer who is to receive the proposal also comprises the salesperson identification data of the salesperson who is dealing with the customer.

12. The system of claim 1 wherein:
    (a) the receive means comprises means for receiving a plurality of performance specifications related to performance of the computer equipment in a variety of configurations which are of varying interest to different potential customers who may purchase the computer equipment; and
    (b) the processing means comprises:
       (i) means for electronically associating at least one of the answers with one of the performance specification which is of particular interest to the customer who is to receive the proposal; and
       (ii) means for generating the customized proposal with one or more individualized pages comprising the performance specification which is of particular interest to the customer who is to receive the proposal.

13. The system of claim 12 wherein:
    (a) the input means further comprises means for receiving customer identification data of the customer who is to receive the proposal; and
    (b) the processing means further comprises means for generating the customized proposal so that each individualized page which comprises the performance specification which is of particular interest to the customer who is to receive the proposal also comprises the customer identification data of the customer who is to receive the proposal.

14. The system of claim 12 wherein:
    (a) the input means further comprises means for receiving salesperson identification data of a salesperson who is dealing with the customer; and
    (b) the processing means further comprises means for generating the customized proposal so that each individualized page which comprises the performance specification which is of particular interest to the customer who is to receive the proposal also comprises the salesperson identification data of the salesperson who is dealing with the customer.

15. The system of claim 1 wherein:

(a) the input means further comprises means for receiving a description and appraised value of trade-in computer equipment to be traded in by the customer who is to receive the proposal; and (b) the processing means further comprises means for generating the customized proposal with one or more individualized pages which comprise the description and appraised value of the trade-in computer equipment to be traded in by the customer who is to receive the proposal.

16. The system of claim 15 wherein:

(a) the input means further comprises means for receiving the customer identification data of the customer who is to receive the proposal; and (b) the processing means further comprises means for generating the customized proposal so that each individualized page which comprises the description and appraised value of trade-in computer equipment to be traded in by the customer who is to receive the proposal also comprises at least one of the customer identification data of the customer who is to receive the proposal.

17. The system of claim 15 wherein:

(a) the input means further comprises means for receiving salesperson identification data of a salesperson who is dealing with the customer; and (b) the processing means further comprises means for generating the customized proposal so that each individualized page which comprises the description and appraised value of trade-in computer equipment to be traded in by the customer who is to receive the proposal also comprises the salesperson identification data of the salesperson who is dealing with the customer.

18. The system of claim 1 wherein:

(a) the receive means comprises means for receiving a plurality of computer equipment price quotations related to a variety of computer equipment configurations which are of varying interest to different potential customers who may purchase the computer equipment; and (b) the processing means comprises:
  (i) means for electronically associating at least one of the answers with one of the computer equipment price quotations for a computer equipment configuration which is of particular interest to the customer who is to receive the proposal; and
  (ii) means for generating the customized proposal with one or more individualized pages comprising the computer equipment price quotation for the computer equipment configuration which is of particular interest to the customer who is to receive the proposal.

19. The system of claim 18 wherein:

(a) the input means further comprises means for receiving user-defined computer equipment price quotations; and (b) the processing means further comprises means for calculating a computer equipment price based upon the computer equipment price quotations that are related to the answers and for generating the customized proposal with one or more individualized pages comprising the computer equipment price.

20. The system of claim 18 wherein:

(a) the input means further comprises means for receiving customer identification data of the customer who is to receive the proposal; and (b) the processing means further comprises means for generating the customized proposal so that each individualized page which comprises the computer equipment price quotation for the computer equipment configuration which is of particular interest to the customer who is to receive the proposal also comprises at least one of the customer identification data of the customer who is to receive the proposal.

21. The system of claim 1 wherein:

(a) the input means further comprises means for presenting a series of predetermined queries related to financing computer equipment of interest to different potential customers who may purchase the computer equipment, the input means further comprising means for receiving individualized answers to the predetermined queries, the individualized answers relating to financing the computer equipment configuration of particular interest to the customer who is to receive the proposal; and (b) the processing means further comprises means for generating the customized proposal with one or more individualized pages comprising the financing information related to the computer equipment configuration which is of particular interest to the customer who is to receive the proposal.

22. The system of claim 21 wherein:

(a) the input means further comprises means for receiving customer identification data of the customer who is to receive the proposal; and (b) the processing means further comprises means for generating the customized proposal so that each individualized page which comprises the financing information related to the computer equipment configuration which is of particular interest to the customer who is to receive the proposal also comprises the customer identification data of the customer who is to receive the proposal.

23. The system of claim 21 wherein:

(a) the input means further comprises means for receiving salesperson identification data of a salesperson who is dealing with the customer; and (b) the processing means further comprises means for generating the customized proposal so that each individualized page which comprises the financing information related to the computer equipment configuration which is of particular interest to the customer who is to receive the proposal also comprises the salesperson identification data of the salesperson who is dealing with the customer.

24. The system of claim 1 wherein:

(a) the input means further comprises means for presenting a series of predetermined queries related to the life cycle cost of computer equipment configurations of interest to different potential customers who may purchase the computer equipment, the input means further comprising means for receiving individualized answers to the queries, the individualized answers related to the life cycle of a computer equipment configuration which is of particular interest to the customer who is to receive the proposal; and (b) the processing means further comprises means for generating the customized proposal with one or more individualized pages comprising life cycle cost information related to the computer equipment configuration which is of particular interest to the customer who is to receive the proposal.

25. The system of claim 24 wherein:
(a) the input means further comprises means for receiving a name, address and telephone number of the customer who is to receive the proposal and for receiving a name, address and telephone number of a salesperson who is dealing with the customer; and
(b) the processing means comprises means for generating the customized proposal so that each individualized page which comprises the life cycle cost information related to the computer equipment configuration which is of particular interest to the customer who is to receive the proposal also comprises at least one of the name, address and telephone number of the customer who is to receive the proposal and the salesperson who is dealing with the customer.

26. The system of claim 1 wherein:
(a) the input means further comprises means for receiving user-selected items to be included within the customized proposal; and
(b) the processing means further comprises means for arranging the user-selected items into a table of contents and for generating the table of contents within the customized proposal.

27. The system of claim 1 wherein the processing means further comprises means for including a trademark identifying the computer equipment on at least one of the pages of the customized proposal.

28. The system of claim 1 wherein:
(a) the input means further comprises means for presenting the predetermined queries in any one of a plurality of languages; and
(b) the processing means comprises means for generating the customized proposal in any one of the plurality of languages.

29. The system of claim 1 wherein the processing means further comprises means for generating the customized proposal with a signature page as a part of the proposal.

30. The system of claim 1 wherein the output means comprises means for generating the customized proposal in a printed format.

31. A computer-based system for generating a customized proposal for selling copy equipment to particular customers, comprising:
a) input means for receiving information identifying a customer's desired features and uses of the copy equipment, the input means including
i) means for presenting the customer with a plurality of questions relating to features and uses of the copy equipment, and
ii) means for receiving a plurality of answers to the questions, the answers specifying the customer's desired copy equipment features and uses;
b) receive means for electronically receiving copy equipment pictures, copy equipment environment pictures, and text segments;
c) processing means for gathering copy equipment information for use in generating the customized proposal, the processing means including
i) means for electronically selecting a particular copy equipment picture in response to at least one of the answers,
ii) means for electronically selecting a particular copy equipment environment picture in response to at least one of the answers, and
iii) means for electronically selecting a particular text segment in response to at least one of the answers; and
d) output means, coupled to the receive means and the processing means, for receiving the gathered copy equipment information and for compiling the gathered copy equipment information into the customized proposal.

32. The system of claim 31 wherein:
(a) the receive means further comprises environment text database means for receiving a plurality of predetermined environment text segments related to distinctive environments in which the copy machine may be used, the plurality of predetermined environment text segments being of varying interest to different potential customers who may purchase the copy machine; and
(b) the processing means further comprises means for electronically associating at least one of the answers with one of the environment text segments.

33. The system of claim 31 wherein:
(a) the input means further comprises means for receiving a name and address of the customer who is to receive the proposal; and
(b) the processing means further comprises means for generating the customized proposal with a cover sheet comprising the name and address of the customer who is to receive the proposal.

34. The system of claim 31 wherein the processing means further comprises means for generating the customized proposal with a cover sheet comprising predetermined pictures and text related to at least one of the features and uses which are of particular interest to the customer who is to receive the proposal.

35. The system of claim 31 wherein:
(a) the input means further comprises means for receiving customer identification data of the customer who is to receive the proposal; and
(b) the processing means further comprises means for generating the customized proposal with a personalized letter to the customer who is to receive the proposal so that the personalized letter comprises the customer identification data of the customer who is to receive the proposal and so that the personalized letter further comprises portions of predetermined standard text related to at least one of the individualized features and uses which are of particular interest to the customer who is to receive the proposal.

36. The system of claim 31 wherein the processing means further comprises means for generating the customized proposal with one or more individualized copy machine description pages each comprising predetermined pictures and text related to at least one of the individualized features and uses which are of particular interest to the customer who is to receive the proposal.

37. The system of claim 36 wherein:
(a) the input means further comprises means for receiving customer identification data of the customer who is to receive the proposal; and
(b) the processing means further comprises means for generating the customized proposal with one or more individualized pages so that each individualized page comprises the customer identification data of the customer who is to receive the proposal.

38. The system of claim 36 wherein:
(a) the input means further comprises means for receiving salesperson identification data of a salesperson who is dealing with the customer; and (b) the processing means further comprises means for generating the customized proposal with one or more individualized pages so that each individualized page comprises the salesperson identification data of the salesperson who is dealing with the customer.

39. The system of claim 31 wherein:
(a) the receive means comprises means for receiving a plurality of copy machine specifications related to producing the copy machine in a variety of configurations which are of varying interest to different potential customers who may purchase the copy machine; and
(b) the processing means comprises:
(i) means for electronically associating at least one of the answers with one of the copy machine specifications which is of particular interest to the customer who is to receive the proposal; and
(ii) means for generating the customized proposal with one or more individualized pages comprising the copy machine specification which is of particular interest to the customer who is to receive the proposal.

40. The system of claim 39 wherein:
(a) the input means further comprises means for receiving customer identification data of the customer who is to receive the proposal; and
(b) the processing means further comprises means for generating the customized proposal so that each individualized page which comprises the copy machine specification which is of particular interest to the customer who is to receive the proposal also comprises the customer identification data of the customer who is to receive the proposal.

41. The system of claim 39 wherein:
(a) the input means further comprises means for receiving salesperson identification data of a salesperson who is dealing with the customer; and
(b) the processing means further comprises means for generating the customized proposal so that each individualized page which comprises the copy machine specification which is of particular interest to the customer who is to receive the proposal also comprises The salesperson identification data of the salesperson who is dealing with the customer.

42. The system of claim 31 wherein:
(a) the receive means comprises means for receiving a plurality of performance specifications related to performance of the copy machine in a variety of configurations which are of varying interest to different potential customers who may purchase the copy machine; and
(b) the processing means comprises:
(i) means for electronically associating at least one of the answers with one of the performance specification which is of particular interest to the customer who is to receive the proposal; and
(ii) means for generating the customized proposal with one or more individualized pages comprising the performance specification which is of particular interest to the customer who is to receive the proposal.

43. The system of claim 42 wherein:
(a) the input means further comprises means for receiving customer identification data of the customer who is to receive the proposal; and
(b) the processing means further comprises means for generating the customized proposal so that each individualized page which comprises the performance specification which is of particular interest to the customer who is to receive the proposal also comprises the customer identification data of the customer who is to receive the proposal.

44. The system of claim 42 wherein:
(a) the input means further comprises means for receiving salesperson identification data of a salesperson who is dealing with the customer; and
(b) the processing means further comprises means for generating the customized proposal so that each individualized page which comprises the performance specification which is of particular interest to the customer who is to receive the proposal also comprises the salesperson identification data of the salesperson who is dealing with the customer.

45. The system of claim 31 wherein:
(a) the input means further comprises means for receiving a description and appraised value of a trade-in copy machine to be traded in by the customer who is to receive the proposal; and
(b) the processing means further comprises means for generating the customized proposal with one or more individualized pages which comprise the description and appraised value of the trade-in copy machine to be traded in by the customer who is to receive the proposal.

46. The system of claim 45 wherein:
(a) the input means further comprises means for receiving the customer identification data of the customer who is to receive the proposal; and
(b) the processing means further comprises means for generating the customized proposal so that each individualized page which comprises the description and appraised value of trade-in copy machine to be traded in by the customer who is to receive the proposal also comprises at least one of the customer identification data of the customer who is to receive the proposal.

47. The system of claim 45 wherein:
(a) the input means further comprises means for receiving salesperson identification data of a salesperson who is dealing with the customer; and
(b) the processing means further comprises means for generating the customized proposal so that each individualized page which comprises the description and appraised value of the trade-in copy machine to be traded in by the customer who is to receive the proposal also comprises the salesperson identification data of the salesperson who is dealing with the customer.

48. The system of claim 31 wherein:
(a) the receive means comprises means for receiving a plurality of copy machine price quotations related to a variety of copy machine configurations which are of varying interest to different potential customers who may purchase the copy machine; and
(b) the processing means comprises:
(i) means for electronically associating at least one of the answers with one of the copy machine price quotations for a copy machine configuration which is of particular interest to the customer who is to receive the proposal; and
(ii) means for generating the customized proposal with one or more individualized pages comprising the copy machine price quotation for the copy machine configuration which is of particular interest to the customer who is to receive the proposal.

49. The system of claim 48 wherein:
(a) the input means further comprises means for receiving user-defined copy machine price quotations; and
(b) the processing means further comprises means for calculating a copy machine price based upon the copy machine price quotations that are related to the answers and for generating the customized proposal with one or more individualized pages comprising the copy machine price.

50. The system of claim 48 wherein:
(a) the input means further comprises means for receiving customer identification data of the customer who is to receive the proposal; and
(b) the processing means further comprises means for generating the customized proposal so that each individualized page which comprises the copy machine price quotation for the copy machine configuration which is of particular interest to the customer who is to receive the proposal also comprises at least one of the customer identification data of the customer who is to receive the proposal.

51. The system of claim 31 wherein:
(a) the input means further comprises means for presenting a series of predetermined queries related to a financing copy machine of interest to different potential customers who may purchase the copy machine, the input means further comprising means for receiving individualized answers to the predetermined queries, the individualized answers relating to financing the copy machine configuration of particular interest to the customer who is to receive the proposal; and
(b) the processing means further comprises means for generating the customized proposal with one or more individualized pages comprising the financing information related to the copy machine configuration which is of particular interest to the customer who is to receive the proposal.

52. The system of claim 51 wherein:
(a) the input means further comprises means for receiving customer identification data of the customer who is to receive the proposal; and
(b) the processing means further comprises means for generating the customized proposal so that each individualized page which comprises the financing information related to the copy machine configuration which is of particular interest to the customer who is to receive the proposal also comprises the customer identification data of the customer who is to receive the proposal.

53. The system of claim 51 wherein:
(a) the input means further comprises means for receiving salesperson identification data of a salesperson who is dealing with the customer; and
(b) the processing means further comprises means for generating the customized proposal so that each individualized page which comprises the financing information related to the copy machine configuration which is of particular interest to the customer who is to receive the proposal also comprises the salesperson identification data of the salesperson who is dealing with the customer.

54. The system of claim 31 wherein:
(a) the input means further comprises means for presenting a series of predetermined queries related to the life cycle cost of copy machine configurations of interest to different potential customers who may purchase the copy machine, the input means further comprising means for receiving individualized answers to the queries, the individualized answers related to the life cycle of a copy machine configuration which is of particular interest to the customer who is to receive the proposal; and
(b) the processing means further comprises means for generating the customized proposal with one or more individualized pages comprising life cycle cost information related to the copy machine configuration which is of particular interest to the customer who is to receive the proposal.

55. The system of claim 54 wherein:
(a) the input means further comprises means for receiving a name, address and telephone number of the customer who is to receive the proposal and for receiving a name, address and telephone number of a salesperson who is dealing with the customer; and
(b) the processing means comprises means for generating the customized proposal so that each individualized page which comprises the life cycle cost information related to the copy machine configuration which is of particular interest to the customer who is to receive the proposal also comprises at least one of the name, address and telephone number of the customer who is to receive the proposal and the salesperson who is dealing with the customer.

56. The system of claim 31 wherein:
a) the input means further comprises means for receiving user-selected items to be included within the customized proposal; and
b) the processing means further comprises means for arranging the user-selected items into a table of contents and for generating the table of contents within the customized proposal.

57. The system of claim 31 wherein the processing means further comprises means for including a trademark identifying the copy machine on at least one of the pages of the customized proposal.

58. The system of claim 31 wherein:
a) the input means further comprises means for presenting the predetermined queries in any one of a plurality of languages; and
b) the processing means comprises means for generating the customized proposal in any one of the plurality of languages.

59. The system of claim 31 wherein the processing means further comprises means for generating the customized proposal with a signature page as a part of the proposal.

60. The system of claim 31 wherein the output means comprises means for generating the customized proposal in a printed format.

61. A computer implemented method of generating a customized proposal for selling equipment to particular customers, the method comprising the steps of:
a) receiving in the conjurer information identifying a customer's desired equipment features and uses, by
i) presenting the customer with a plurality of questions relating to features and uses of the equipment, and
ii) receiving in the computer a plurality of answers to the questions, the answers specifying the customer's desired equipment features and uses;
b) storing equipment pictures, equipment environment pictures, and text segments in the computer;
c) retrieving equipment information for use in generating the customized proposal, by i) electronically selecting in the computer a particular equipment picture in response to at least one of the answers, ii) electronically selecting in the computer a particular equipment environment picture in response to at least one of the answers, and iii) electronically selecting in the computer a particular text segment in response to at least one of the answers; and d) automatically compiling the gathered equipment information in the computer into the customized proposal.

62. A method as recited in claim 61, wherein the equipment is copy equipment.

63. A method as recited in claim 61, wherein the equipment is computer equipment.

* * * * *